United States Patent
Chen et al.

(10) Patent No.: US 10,536,319 B2
(45) Date of Patent: Jan. 14, 2020

(54) MODULATION METHOD, DEMODULATION METHOD, RELATED DEVICE, AND SYSTEM

(71) Applicant: HUAWEI TECHNOLOGIES CO., LTD., Shenzhen, Guangdong (CN)

(72) Inventors: Qingyong Chen, Chengdu (CN); Bo Wang, Shenzhen (CN); Xingxin Zhang, Chengdu (CN); Chunhui Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/358,207

(22) Filed: Mar. 19, 2019

(65) Prior Publication Data

US 2019/0215223 A1    Jul. 11, 2019

Related U.S. Application Data

(63) Continuation of application No. PCT/CN2017/102117, filed on Sep. 18, 2017.

(30) Foreign Application Priority Data

Sep. 19, 2016    (CN) .......................... 2016 1 0832261

(51) Int. Cl.
*H04L 27/36* (2006.01)
*H04L 27/38* (2006.01)

(52) U.S. Cl.
CPC ............ *H04L 27/362* (2013.01); *H04L 27/36* (2013.01); *H04L 27/38* (2013.01)

(58) Field of Classification Search
CPC ....... H04L 27/362; H04L 27/36; H04L 27/38; H04L 27/12; H04L 27/18; H04L 27/20;
(Continued)

(56) References Cited

U.S. PATENT DOCUMENTS

2003/0202460 A1 * 10/2003 Jung ................... H04L 27/2621
                                                        370/208
2014/0016452 A1 *  1/2014 Hasegawa ........... H04L 27/2621
                                                        370/210
(Continued)

FOREIGN PATENT DOCUMENTS

CN    101753502 A    6/2010
CN    103763298 A    4/2014
(Continued)

OTHER PUBLICATIONS

Extended European Search Report issued in European Application No. 17850318.1 dated Jul. 12, 2019, 9 pages.
(Continued)

*Primary Examiner* — Siu M Lee
(74) *Attorney, Agent, or Firm* — Fish & Richardson P.C.

(57) ABSTRACT

Embodiments of the present application disclose a modulation method, including: performing coding processing on raw data to obtain a coded sequence; performing constellation mapping on the coded sequence based on a preset constellation diagram, to obtain M symbols; dividing the M symbols into N segments; obtaining a constellation phase of each symbol in the N segments; adjusting a constellation phase of a symbol in each of the N segments according to a preset phase adjustment rule, where the N segments are concurrently adjusted; and modulating M symbols obtained through phase adjustment, to obtain a modulated signal, and sending the modulated signal. Correspondingly, this application further provides a demodulation method, a sending device, a receiving device, and a communications system.

20 Claims, 8 Drawing Sheets

(58) Field of Classification Search
CPC ............ H04L 27/2003; H04L 27/2007; H04L 27/2014; H04L 27/2017; H04L 27/2021; H04L 27/2025; H04L 27/2028; H04L 27/2092
See application file for complete search history.

(56) References Cited

U.S. PATENT DOCUMENTS

| | | | |
|---|---|---|---|
| 2014/0169501 A1* | 6/2014 | Nazarathy | H03H 17/0266 |
| | | | 375/316 |
| 2017/0163458 A1* | 6/2017 | Tanahashi | H04B 1/04 |
| 2017/0163459 A1 | 6/2017 | Tanahashi et al. | |

FOREIGN PATENT DOCUMENTS

| | | |
|---|---|---|
| CN | 106713213 A | 5/2017 |
| WO | 1995004439 A1 | 2/1995 |
| WO | 2016098733 A1 | 6/2016 |
| WO | 2016136096 A1 | 9/2016 |

OTHER PUBLICATIONS

IEEE Std 802.11ad™-2012, Part 11: Wireless LAN Medium Access Control (MAC) and Physical Layer (PHY) Specifications, Amendment 3: Enhancements for Very High Throughput in the 60 GHz Band. 628 pages.

International Search Report and Written Opinion issued in International Application No. PCT/CN2017/102117 dated Nov. 23, 2017, 21 pages.

* cited by examiner

Segment 1    Segment 3
Segment 2    Segment 4

Segment 1    Segment 3
Segment 2    Segment 4

☒ Segment 1   ☐ Segment 3
☒ Segment 2   ■ Segment 4

☒ Segment 1   ☐ Segment 3
☒ Segment 2   ■ Segment 4

☒ Segment 1   ☐ Segment 3
☒ Segment 2   ■ Segment 4

☒ Segment 1   ☐ Segment 3
☒ Segment 2   ■ Segment 4

⊠ Segment 1    ⊞ Segment 3
▨ Segment 2

⊠ Segment 1    ⊞ Segment 3
▨ Segment 2

⊠ Segment 1    ⊞ Segment 3
▨ Segment 2

⊠ Segment 1    ⊞ Segment 3
▨ Segment 2

Segment 1    Segment 3

Segment 2

Segment 1    Segment 3

Segment 2

MODULATION METHOD, DEMODULATION METHOD, RELATED DEVICE, AND SYSTEM

CROSS-REFERENCE TO RELATED APPLICATIONS

This application is a continuation of International Application No. PCT/CN2017/102117, filed on Sep. 18, 2017, which claims priority to Chinese Patent Application No. 201610832261.9, filed on Sep. 19, 2016. The disclosures of the aforementioned applications are hereby incorporated by reference in their entireties.

TECHNICAL FIELD

The present application relates to the communications field, and in particular, to a modulation method, a demodulation method, a related device, and a system.

BACKGROUND

A modulation method that needs to be used for a nonlinear channel has relatively small envelope fluctuation. To improve spectral bandwidth utilization, signal transmission generally uses a higher-order modulation method combining an amplitude and a phase. When a frequency of a carrier and a modulation order are relatively high, phase noise has relatively great impact on the modulation method.

For example, in the IEEE (Institute of Electrical and Electronics Engineers) 802.11ad communication protocol, an operating band of a carrier is 60 GHz (Gigahertz). An SC PHY (single carrier physical layer) and an OFDM PHY (orthogonal frequency division multiplexing physical layer) are defined in the IEEE 802.11ad communication protocol. Due to a relatively high PAPR (peak-to-average power ratio), the OFDM PHY has a high requirement on a power amplifier and is not industrialized. To lower the requirement on the power amplifier, the SC PHY supports only a modulation method of a maximum of 16QAM (quadrature amplitude modulation). If a modulation order is improved, phase noise may cause great interference, and after decoding, a bit error rate may fail to meet a data transmission requirement.

In the prior art, in order to suppress phase noise introduced in a transmission process, phase adjustment is further performed on a data symbol by using a pilot estimation phase noise control algorithm, for example, a linear PNC (phase noise cancellation) algorithm, to enhance a phase noise suppression capability of a modulated signal. However, in such a manner, a phase noise suppression capability is limited, and a higher-order modulation requirement cannot be met.

SUMMARY

Embodiments of the present application disclose a modulation method, a demodulation method, a related device, and a system, to improve a modulation processing speed.

According to a first aspect, this application provides a modulation method, including: generating, by a signal source, raw data, where the raw data may be a digital signal or an analog signal; performing bit conversion on the raw data, to generate a binary bit sequence; and performing, by a sending device, coding processing on the generated bit sequence, where the coding processing includes but is not limited to: source coding, channel coding processing, interleaving coding, or the like, and a coded sequence is obtained through the coding processing. The sending device in this application includes but is not limited to a base station, a mobile station, a router, a gateway, or another network device. The sending device groups the coded sequence based on a modulation order, to obtain M groups, where a bit in each group is a symbol, and a quantity of bits in each group is equal to a modulation order. The sending device performs constellation mapping on each group on a preset constellation diagram, where the constellation diagram represents a mapping relationship between a bit group and an amplitude and a mapping relationship between a bit group and a phase. For example, the constellation diagram may be a 64QAM constellation diagram, a 128APSK constellation diagram, or the like. Constellation phases and amplitudes of M symbols obtained through the constellation mapping are all known. The sending device divides the M symbols obtained through the constellation mapping into N segments, where N is an integer greater than 1, and quantities of symbols in all the segments may be the same. Then, the sending device determines an in-segment reference symbol corresponding to each segment, where each segment corresponds to one in-segment reference symbol. For example, the in-segment reference symbol is the first symbol, the last symbol, or an intermediate symbol in the segment. The sending device adjusts a constellation phase of a symbol in each segment according to a preset phase adjustment rule based on a result of the foregoing constellation mapping. The phase adjustment rule is used to enhance a phase noise suppression capability. Phase adjustment is concurrently performed on the N segments. For example, if there are four segments, the sending device starts four threads simultaneously to concurrently perform phase adjustment on the four segments. After completing phase adjustment, the sending device may load the M symbols onto a high-frequency carrier, and send the M symbols to a receiving device. According to the foregoing embodiment, when a phase noise suppression capability of a signal of the sending device needs to be improved, the sending device divides the symbols obtained through the constellation mapping into the segments. Phases of the symbols are concurrently adjusted for the segments, thereby improving modulation efficiency of the sending device and reducing a processing time.

In a possible implementation, the sending device determines an in-segment reference symbol in each of the N segments. The in-segment reference symbol may be a symbol in any position in the segment. For example, the first symbol in the segment is used as the in-segment reference symbol, an intermediate symbol in the segment is used as the in-segment reference symbol, or the last symbol in the segment is used as the in-segment reference symbol. For any one of the N segments, the sending device needs to adjust a constellation phase of a symbol in the segment according to a preset phase adjustment rule. An adjustment method is: keeping a constellation phase of an in-segment reference symbol in the segment unchanged; dividing symbols in the segment into two parts: symbols before the in-segment reference symbol and symbols after the in-segment reference symbol; for a symbol before the in-segment reference symbol, adding up constellation phases of all symbols from the symbol to the in-segment reference symbol, to obtain a new phase of the symbol; and for a symbol after the in-segment reference symbol, adding up constellation phases of all symbols from the symbol to the in-segment reference symbol, to obtain a new phase of the symbol. For example, a segment has five symbols: S1, S2, S3, S4, and S5, and constellation phases of the five symbols obtained through the constellation mapping by the sending device are θ1, θ2, θ3, θ4, and θ5. Assuming that the sending device determines that the symbol S3 is an in-segment reference symbol, a constellation phase of the symbol S3 remains unchanged. For the symbol S4 and the symbol S5 after the symbol S3, the sending device adjusts a constellation phase of the symbol S4 to a new phase $\varphi_4=\theta_4+\theta_3$, and the sending device adjusts a constellation phase of the symbol S5 to a new phase $\varphi_5=\theta_5+\theta_4+\theta_3$. For the symbol S2 and the symbol S1 before the symbol S3, the sending device adjusts a constellation phase of the symbol S2 to a new phase $\varphi_2=\theta_2+\theta_3$, and the sending device adjusts a constellation phase of the symbol S1 to a new phase $\varphi_1=\theta_1+\theta_2+\theta_3$. It should be noted that, the sending device may concurrently perform phase adjustment on the symbols before the in-segment reference symbol and the symbols after the in-segment reference symbol. It may be understood that, when the in-segment reference symbol is the first symbol in the segment, the sending device merely needs to adjust phases of symbols after the first symbol; or when the in-segment reference symbol is the last symbol in the segment, the sending device merely needs to adjust phases of symbols before the last symbol. The foregoing phase adjustment rule is also applicable to the two special cases. According to the foregoing embodiment, when a quantity of segments is relatively large, impact on phase noise suppression performance of a modulated signal is small.

In a possible implementation of this application, the sending device determines an in-segment reference symbol in each of the N segments. The in-segment reference symbol may be located in any position in the segment. For example, the in-segment reference symbol is the first symbol, an intermediate symbol, or the last symbol in the segment. For any one of the N segments, the sending device needs to adjust a constellation phase of a symbol in the segment according to a preset phase adjustment rule. An adjustment method is: keeping a constellation phase of an in-segment reference symbol in the segment unchanged; and for a symbol different from the in-segment reference symbol, adding up a constellation phase of the symbol and a constellation phase of the in-segment reference symbol, to obtain a new phase of the symbol. For example, a segment includes five symbols: S1, S2, S3, S4, and S5, and constellation phases of the five symbols obtained through the constellation mapping by the sending device are $\theta1$, $\theta2$, $\theta3$, $\theta4$, and $\theta5$, respectively. Assuming that the sending device determines that S3 is an in-segment reference symbol, for other symbols S1, S2, S4, and S5 different from the in-segment reference symbol S3, the sending device adjusts a constellation phase of the symbol S1 to a new phase $\varphi_1=\theta_1+\theta_3$, the sending device adjusts a constellation phase of S2 to a new phase $\varphi_2=\theta_2+\theta_3$, the sending device adjusts a constellation phase of the symbol S4 to a new phase $\varphi_4=\theta_4+\theta_3$, and the sending device adjusts a constellation phase of the symbol S5 to a new phase $\varphi_5=\theta_5+\theta_3$. It should be noted that, the sending device may concurrently adjust the phases of the symbols different from the in-segment reference symbol in the segment by using a symbol as a granularity. According to the foregoing embodiment, the sending device concurrently adjusts the constellation phases of the symbols in the segments by using a segment as a granularity, and adjusts the constellation phases of the symbols in each segment by using a symbol as a granularity, to further improve a processing speed and processing efficiency.

In a possible implementation of this application, that the sending device adjusts a constellation phase of a symbol in each segment according to a preset phase adjustment rule includes: The sending device determines an in-segment reference symbol in each of the N segments. The in-segment reference symbol may be the first symbol, an intermediate symbol, or the last symbol in the segment. The sending device needs to first adjust a phase of the in-segment reference symbol in each of the N segments. A method for adjusting the phase of the in-segment reference symbol is: keeping a constellation phase of the first in-segment reference symbol unchanged; and for another in-segment reference symbol after the first in-segment reference symbol, adding up, by the sending device, a constellation phase of the another in-segment reference symbol and constellation phases of in-segment reference symbols before the another in-segment reference symbol, and using a sum as a new phase. After phase adjustment on the in-segment reference symbol, the sending device adjusts a constellation phase of another symbol that is in each segment and that is different from the in-segment reference symbol. Using any one of the N segments as an example, a method for adjusting phases of other symbols that are in the segment and that are different from an in-segment reference symbol is: dividing the symbols in the segment into two parts: a first part including symbols after the in-segment reference symbol, and a second part including symbols before the in-segment reference symbol, where there is a special case in which the in-segment reference symbol is the first symbol or the last symbol in the segment, which is equivalent to that a quantity of the symbols before the in-segment reference symbol is 0 or a quantity of the symbols after the in-segment reference symbol is 0; for a symbol in the first part, adding up, by the sending device, constellation phases of all symbols from the symbol to the in-segment reference symbol, to obtain a new phase of the symbol; and for a symbol in the second part, adding up, by the sending device, constellation phases of all symbols from the symbol to the in-segment reference symbol, to obtain a new phase of the symbol. For example, the sending device divides 16 symbols into four segments, where each segment includes four symbols; a segment 1 includes S11, S12, S13, and S14, and constellation phases of the symbols are $\theta_{11}$, $\theta_{12}$, $\theta_{13}$, and $\theta_{14}$ respectively; a segment 2 includes S21, S22, S23, and S24, and constellation phases of the symbols are $\theta_{21}$, $\theta_{22}$, $\theta_{23}$, and $\theta_{24}$ respectively; a segment 3 includes S31, S32, S33, and S34, and constellation phases of the symbols are $\theta_{31}$, $\theta_{32}$, $\theta_{33}$, and $\theta_{34}$ respectively; and a segment 4 includes S41, S42, S43, and S44, and constellation phases of the symbols are $\theta_{41}$, $\theta_{42}$, $\theta_{43}$, and $\theta_{44}$ respectively. The sending device determines that an in-segment reference symbol in each of the four segments is the second symbol. To be specific, an in-segment reference symbol in the segment 1 is S12, an in-segment reference symbol in the segment 2 is S22, an in-segment reference symbol in the segment 3 is S32, and an in-segment reference symbol in the segment 4 is S42. The sending device first adjusts the constellation phases of the four in-segment reference symbols, where the constellation phase $\theta_{12}$ of the first in-segment reference symbol S12 remains unchanged, that is, $\varphi_{12}=\theta_{12}$; a new phase of the second in-segment reference symbol S22 after phase adjustment is $\varphi_{22}=\theta_{22}+\theta_{12}$; a new phase of the third in-segment reference symbol S32 after phase adjustment is $\varphi_{32}=\theta_{32}+\theta_{22}+\theta_{12}$; and a new phase of the fourth in-segment reference symbol S42 after phase adjustment is $\varphi_{42}=\theta_{42}+\theta_{32}+\theta_{22}+\theta_{12}$. Then, the sending device adjusts phases of other symbols based on the new phases of the in-segment reference symbols, where the segment 1 is adjusted according to $\varphi_{11}=\theta_{11}+\varphi_{12}$, $\varphi_{13}=\theta_{13}+\varphi_{12}$, and $\varphi_{14}=\theta_{14}+\theta_{13}+\varphi_{12}$; the segment 2 is adjusted according to $\varphi_{12}=\theta_{21}+\varphi_{22}$, $\varphi_{23}=\theta_{23}+\varphi_{22}$, and $\varphi_{24}=\theta_{24}+\theta_{23}+\varphi_{22}$; the segment 3 is adjusted according to $\varphi_{31}=\theta_{31}+\varphi_{32}$, $\varphi_{33}=\theta_{33}+\varphi_{32}$, and $\varphi_{34}=\theta_{34}+\theta_{33}+\varphi_{32}$; the segment 4 is adjusted according to $\varphi_{41}=\theta_{41}+\varphi_{42}$, $\varphi_{43}=\theta_{43}+\varphi_{42}$, and $\varphi_{44}=\theta_{44}+\varphi_{43}+\varphi_{42}$; and phase adjustment may be concurrently performed on the segment 1, the segment 2, the segment 3, and the segment 4. According to the foregoing embodiment, the phases of the in-segment reference symbols are added up, and phase adjustment is concurrently performed on the segments. A phase noise suppression capability for a modulated signal is further improved while efficiency is considered.

In a possible implementation of this application, that the sending device adjusts a constellation phase of a symbol in each segment according to a preset phase adjustment rule includes: determining an in-segment reference symbol in each of the N segments, where the in-segment reference symbol may be a symbol in any position in the segment, for example, the first symbol, an intermediate symbol, or the last symbol in the segment, and positions of in-segment reference symbols in all the segments may be the same or different. No limitation is imposed in this application. The sending device first needs to adjust a constellation phase of the in-segment reference symbol in each of the N segments. An adjustment method is: keeping a constellation phase of the first in-segment reference symbol unchanged; and for another in-segment reference symbol different from the first in-segment reference symbol, adding up constellation phases of all in-segment reference symbols from the in-segment reference symbol to the first in-segment reference symbol, to obtain a new phase of the in-segment reference symbol. After adjusting the constellation phase of the in-segment reference symbol, the sending device adjusts, based on the adjusted new phase, a constellation phase of another symbol that is in the segment and that is different from the in-segment reference symbol. Using any segment as an example for description, the adjustment method may be: for a symbol, adding up a constellation phase of the symbol and the phase of the in-segment reference symbol, to obtain a new phase of the symbol, where phase adjustment is concurrently performed on the segments, and phase adjustment is also concurrently performed on symbols in the segments. For example, the sending device divides 12 symbols into three segments, where each segment includes four symbols; a segment 1 includes S11, S12, S13, and S14, and constellation phases of the symbols are $\theta_{11}$, $\theta_{12}$, $\theta_{13}$, and $\theta_{14}$ respectively; a segment 2 includes S21, S22, S23, and S24, and constellation phases of the symbols are $\theta_{21}$, $\theta_{22}$, $\theta_{23}$, and $\theta_{24}$ respectively; and a segment 3 includes symbols S31, S32, S33, and S34. The sending device determines that an in-segment reference symbol in the segment 1 is S11, an in-segment reference symbol in the segment 2 is S22, and an in-segment reference symbol in the segment 3 is S33. The sending device first adjusts constellation phases of the in-segment reference symbols. An adjustment method is: keeping a constellation phase of the first in-segment reference symbol unchanged, that is, $\varphi_{11}=\theta_{11}$; and performing, by the sending device, phase adjustment on the second in-segment reference symbol S22 to obtain a new phase $\varphi_{22}=\theta_{22}+\theta_{11}$; and performing, by the sending device, phase adjustment on the third in-segment reference symbol S33 to obtain a new phase $\varphi_{33}=\theta_{33}+\theta_{22}+\theta_{11}$. Based on the new phases of the in-segment reference symbols, the sending device then performs phase adjustment on other symbols in the segments, where the segment 1 is adjusted according to $\varphi_{12}=\theta_{12}+\varphi_{11}$, $\varphi_{13}=\theta_{13}+\varphi_{11}$, and $\varphi_{14}=\theta_{14}+\varphi_{11}$; the segment 2 is adjusted according to $\varphi_{21}=\theta_{21}+\varphi_{22}$, $\varphi_{23}=\theta_{23}+\varphi_{22}$, and $\varphi_{24}=\theta_{24}+\varphi_{22}$; and the segment 3 is adjusted according to $\varphi_{32}=\theta_{32}+\varphi_{33}$ and $\varphi_{31}=\theta_{31}+\varphi_{33}$. According to the foregoing embodiment, the sending device performs phase adjustment on the in-segment reference symbol, to further improve a phase noise suppression capability of an adjusted signal. In addition, phase adjustment can be concurrently performed on the segments, and phase adjustment can also be concurrently performed on the symbols in the segment. Both the phase noise suppression capability and a modulation speed are considered.

In a possible implementation of this application, the in-segment reference symbol in each of the N segments is the first symbol. In other words, a symbol sequence number of the in-segment reference symbol in the segment is 1.

In a possible implementation of this application, the in-segment reference symbol is a pilot symbol. Therefore, impact on phase noise suppression performance can be mitigated.

In a possible implementation, the adjusting a constellation phase of a symbol in each segment according to a preset phase adjustment rule includes:

determining an in-segment reference symbol in each of the N segments, where the in-segment reference symbol meets $R_i=M_i$;

for a symbol meeting $1 \leq i \leq N$ and $1 \leq j \leq M_i$ in the N segments, adjusting a constellation phase of the symbol according to $\varphi_{ij}=\theta_{ij}+\theta_{i(j+1)}+ \ldots \theta_{i(r_i+1)}+\theta_{iR_i}$, where i represents a sequence number of a segment, j represents a sequence number of a symbol in each of the N segments, $M_i$ represents a quantity of symbols in an $i^{th}$ segment, that is, $M_1+M_2+ \ldots M_N=M$ is met, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 2$; and for a symbol meeting $1 \leq i \leq N$ and $j=M_i$ in the N segments, adjusting a constellation phase of the symbol according to $\varphi_{ij}=\theta_{ij}$.

In a possible implementation of this application, the adjusting a constellation phase of a symbol in each segment according to a preset phase adjustment rule includes:

determining an in-segment reference symbol in each of the N segments, where the in-segment reference symbol meets $R_i=M_i$;

for a symbol meeting $1 \leq i \leq N$ and $1 \leq j < M_i$ in the N segments, adjusting a constellation phase of the symbol according to $\varphi_{ij}=\theta_{ij}+\theta_{iR_i}$, where N represents a quantity of segments, i represents a sequence number of a segment, $M_i$ represents a quantity of symbols in an $i^{th}$ segment, $M_1+M_2+ \ldots M_N=M$, M represents a total quantity of symbols in the N segments, $R_i$ represents a sequence number of an in-segment reference symbol in the $i^{th}$ segment, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 2$; and for a symbol meeting $1 \leq i \leq N$ and $j=R_i$ in the N segments, adjusting a constellation phase of the symbol according to $\varphi_{ij}=\theta_{ij}$.

In a possible implementation of this application, the adjusting a constellation phase of a symbol in each segment according to a preset phase adjustment rule includes: determining an in-segment reference symbol in each of the N segments, where the in-segment reference symbol meets $R_i=M_i$;

for an in-segment reference symbol meeting $1 \leq i \leq N$ in the N segments, adjusting a constellation phase of the in-segment reference symbol according to $\varphi_{iR_i}=\theta_{iR_i}+\theta_{(i-1)(R_{i-1})}+ \ldots \theta_{2R_2}+\theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $1 \leq J < M_i$ in the N segments, adjusting a constellation phase of the symbol according to a formula $\varphi_{ij} = \theta_{ij} + \theta_{i(j+1)} + \ldots + \varphi_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$; and for a symbol meeting $1 \leq i \leq N$ and $j \leq R_i$ in the N segments, adjusting a phase of the symbol according to $\varphi_{ij} = \theta_{ij}$.

In a possible implementation of this application, the adjusting a constellation phase of a symbol in each segment according to a preset phase adjustment rule includes: determining an in-segment reference symbol in each symbol in the N segments, where the in-segment reference symbol meets $R_i = M_i$;

for an in-segment reference symbol meeting $1 \leq i \leq N$ in the N segments, adjusting a constellation phase of the in-segment reference symbol according to $\varphi_{iR_i} = \theta_{iR_i} + \theta_{(i-1)(R_{i-1})} + \ldots \theta_{2R_2} + \theta_{1R_1}$, where N represents a quantity of segments, i represents a sequence number of a segment, $R_i$ represents a sequence number of an in-segment reference symbol in an $i^{th}$ segment, $\theta_{iR_i}$ a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $1 \leq j < M_i$ in the N segments, adjusting a constellation phase of the symbol according to $\varphi_{ij} = \theta_{ij} + \varphi_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$; and for a symbol meeting $1 \leq i \leq N$ and $j = M_i$ in the N segments, adjusting a phase of the symbol according to $\varphi_{ij} = \theta_{ij}$.

According to a second aspect, this application provides a demodulation method, including: receiving, by a receiving device, a modulated signal sent by a sending device, where in a transmission process of the modulated signal on a channel, noise interference may be caused by a phase of a symbol; parsing, by the receiving device, the modulated signal to obtain phases of M symbols, where the receiving device may divide the M symbols into N segments according to a predefined rule, and the predefined rule is the same as that of the sending device; performing, by the receiving device, phase differentiation on a phase of a symbol in each segment according to a preset phase inverse-adjustment rule, where phase differentiation is concurrently performed on the N segments; performing, by the receiving device, constellation demapping on the M symbols obtained through phase differentiation, to obtain a coded sequence, where a quantity of bits corresponding to each symbol is equal to a constellation diagram order; and performing, by the receiving device, decoding processing on the coded sequence to obtain raw data. According to the foregoing embodiment, a processing delay is reduced in a manner of concurrently processing the segments, and impact of phase noise is suppressed by using a phase differentiation method.

In a possible implementation, the performing, by the receiving device, phase differentiation on a phase of a symbol in each segment according to a preset phase inverse-adjustment rule includes: determining an in-segment reference symbol in each of the N segments, where a position of the in-segment reference symbol may be defined according to a rule on which the sending device and the receiving device pre-agree, and the in-segment reference symbol may be the first symbol, an intermediate symbol, or the last symbol in the segment. For any one of the N segments, a method for performing phase adjustment on a symbol in the segment is: keeping a phase of the in-segment reference symbol unchanged; for a symbol after the in-segment reference symbol, subtracting, by the receiving device, a phase of the symbol from a phase of a previous and adjacent symbol, to obtain a new phase of the symbol; and for a symbol before the in-segment reference symbol, subtracting, by the receiving device, a phase of the symbol from a phase of a subsequent and adjacent symbol, to obtain a new phase of the symbol. For example, a first divided segment includes four symbols: S11, S12, S13, and S14, and phases of the symbols are $\varphi_{11}$, $\varphi_{12}$, $\varphi_{13}$, and $\varphi_{14}$ respectively. Assuming that an in-segment reference symbol in the segment 1 is S12, a phase of S12 remains unchanged, that is, $\theta_{12} = \varphi_{12}$; and the sending device performs phase differentiation on S11 to obtain a new phase $\theta_{11} = \varphi_{11} - \varphi_{12}$, performs phase differentiation on a phase of S13 to obtain a new phase $\theta_{13} = \varphi_{13} - \varphi_{12}$, and performs phase differentiation on a phase of S14 to obtain a new phase $\theta_{14} = \varphi_{14} - \varphi_{13}$. According to the foregoing embodiment, a phase noise suppression capability of the signal is improved by using a phase differentiation method; in addition, phase adjustment is concurrently performed on the segments, thereby improving processing efficiency.

In a possible implementation of this application, the performing, by the receiving device, phase differentiation on a phase of a symbol in each segment according to a preset phase inverse-adjustment rule includes: determining, by the receiving device, an in-segment reference symbol in each of the N segments, where the receiving device may determine the in-segment reference symbol according to a rule on which the receiving device and the sending device pre-agree, and the in-segment reference symbol may be the first symbol, an intermediate symbol, or the last symbol in the segment. For a symbol in any one of the N segments, a phase differentiation method is: keeping a phase of an in-segment reference symbol in the segment unchanged; and for another symbol different from the in-segment reference symbol, using a phase difference between a phase of the symbol and a phase of the in-segment reference symbol as a new phase of the symbol. For example, the first segment divided by the receiving device includes four symbols: S11, S12, S13, and S14, and phases of the symbols are $\varphi_{11}$, $\varphi_{12}$, $\varphi_{13}$, and $\varphi_{14}$ respectively. Assuming that an in-segment reference symbol in the segment is S12, a phase of S12 remains unchanged, that is, $\theta_{12} = \varphi_{12}$; and the receiving device performs phase differentiation on a phase of S11 to obtain a new phase $\theta_{11} = \varphi_{11} - \varphi_{12}$, performs phase differentiation on a phase of S13 to obtain a new phase $\theta_{13} = \varphi_{13} - \varphi_{12}$, and performs phase differentiation on a phase of S14 to obtain a new phase $\theta_{14} = \varphi_{14} - \varphi_{12}$. According to the foregoing embodiment, phase adjustment is concurrently performed on the segments, and phase adjustment is also performed on the symbols, to further improve processing efficiency.

In a possible implementation of this application, the performing, by the receiving device, phase differentiation on a phase of a symbol in each segment according to a preset phase inverse-adjustment rule may include: determining, by the receiving device, an in-segment reference symbol in each of the N segments according to a predefined rule, where for each in-segment reference symbol, the receiving device first performs differentiation on phases of the in-segment reference symbols. A differentiation method is: keeping a phase of the first in-segment reference symbol unchanged; and for a subsequent in-segment reference symbol, performing phase differentiation on a phase of a current in-segment reference symbol and a phase of a previous in-segment reference symbol to obtain a new phase. Based on the foregoing phase differentiation on the in-segment reference symbols, the receiving device then performs phase differentiation on other symbols in the segments. A phase differentiation method for a symbol in any one of the N segments is: using an in-segment reference symbol as a boundary; for a symbol after the in-segment reference symbol, performing phase differentiation on a phase of the symbol and a phase of a previous and adjacent symbol to obtain a new phase of the symbol; and for a symbol before the in-segment reference symbol, performing phase differentiation on a phase of the symbol and a phase of a subsequent and adjacent symbol to obtain a new phase of the symbol. For example, the receiving device divides 12 symbols into four groups, where each group includes four symbols; a group 1 includes S11, S12, S13, and S14, and phases of the symbols are $\varphi_{11}$, $\varphi_{12}$, $\varphi_{13}$, and $\varphi_{14}$ respectively; a group 2 includes S21, S22, S23, and S24, and phases of the symbols are $\varphi_{21}$, $\varphi_{22}$, $\varphi_{23}$, and $\varphi_{24}$ respectively; a group 3 includes S31, S32, S33, and S34, and phases of the symbols are $\varphi_{31}$, $\varphi_{32}$, $\varphi_{33}$, and $\varphi_{34}$ respectively; and a group 4 includes S41, S42, S43, and S44, and phases of the symbols are $\varphi_{41}$, $\varphi_{42}$, $\varphi_{43}$, and $\varphi_{44}$ respectively. It is assumed that the in-segment reference symbol is the second symbol. To be specific, an in-segment reference symbol in the segment 1 is S12, an in-segment reference symbol in the segment 2 is S22, an in-segment reference symbol in the segment 3 is S32, and an in-segment reference symbol in the segment 4 is S42. Phase differentiation performed between the in-segment reference symbols by the receiving device is as follows: A new phase of the first in-segment reference symbol is $\theta_{12}=\varphi_{12}$, a new phase of the second in-segment reference symbol is $\theta_{22}=\varphi_{22}-\varphi_{12}$, a new phase of the third in-segment reference symbol is $\theta_{32}=\varphi_{32}-\varphi_{22}$, and a new phase of the fourth in-segment reference symbol is $\theta_{42}=\varphi_{42}-\varphi_{32}$. Based on the phases of the in-segment reference symbols obtained through phase differentiation, the receiving device adjusts phases of other symbols as follows: In the segment 1, a new phase of S11 is $\theta_{11}=\varphi_{11}-\theta_{12}$, a new phase of S13 is $\theta_{13}=\varphi_{13}-\theta_{12}$, and a new phase of S14 is $\theta_{14}=\varphi_{14}-\theta_{13}$; in the segment 2, a new phase of S21 is $\theta_{21}=\varphi_{21}-\theta_{22}$, a new phase of S23 is $\theta_{23}=\varphi_{23}-\theta_{22}$, and a new phase of S24 is $\theta_{24}=\varphi_{24}-\varphi_{23}$; and in the segment 4, a new phase of S41 is $\theta_{41}=\varphi_{41}-\theta_{42}$, a new phase of S43 is $\theta_{43}=\varphi_{43}-\theta_{42}$, and a new phase of S44 is $\theta_{44}=\varphi_{44}-\varphi_{43}$. Phase differentiation may be concurrently performed on the symbols in each segment. According to the foregoing embodiment, phase differentiation is performed on the in-segment reference symbols, to further improve a phase noise suppression capability.

In a possible implementation of this application, the performing, by the receiving device, phase differentiation on a phase of a symbol in each segment according to a preset phase inverse-adjustment rule includes: determining an in-segment reference symbol in each of the N segments, where determining, by the receiving device, an in-segment reference symbol in each of the N segments according to a predefined rule, and the in-segment reference symbol may be predefined as the first symbol, an intermediate symbol, or the last symbol in the segment. For each in-segment reference symbol, the receiving device first performs differentiation on phases of the in-segment reference symbols. A differentiation method is: keeping a phase of the first in-segment reference symbol unchanged; and for a subsequent in-segment reference symbol, performing phase differentiation on a phase of a current in-segment reference symbol and a phase of a previous in-segment reference symbol to obtain a new phase. Based on the foregoing phase differentiation on the in-segment reference symbols, the receiving device then performs phase differentiation on symbols other than the in-segment reference symbols in the segments. A phase differentiation method for a symbol in any one of the N segments is: performing differentiation between a phase of the symbol and a new phase of an in-segment reference symbol to obtain a new phase of the symbol. For example, the receiving device divides 12 symbols into four groups, where each group includes four symbols; a group 1 includes S11, S12, S13, and S14, and phases of the symbols are $\varphi_{11}$, $\varphi_{12}$, $\varphi_{13}$, and $\varphi_{14}$ respectively; a group 2 includes S21, S22, S23, and S24, and phases of the symbols are $\varphi_{21}$, $\varphi_{22}$, $\varphi_{23}$, and $\varphi_{24}$ respectively; a group 3 includes S31, S32, S33, and S34, and phases of the symbols are $\varphi_{31}$, $\varphi_{32}$, $\varphi_{33}$, and $\varphi_{34}$ respectively; and a group 4 includes S41, S42, S43, and S44, and phases of the symbols are $\varphi_{41}$, $\varphi_{42}$, $\varphi_{43}$, and $\varphi_{44}$ respectively. It is assumed that the in-segment reference symbol is the second symbol. To be specific, an in-segment reference symbol in the segment 1 is S12, an in-segment reference symbol in the segment 2 is S22, an in-segment reference symbol in the segment 3 is S32, and an in-segment reference symbol in the segment 4 is S42. Phase differentiation performed between the in-segment reference symbols by the receiving device is as follows: A new phase of the first in-segment reference symbol is $\theta_{12}=\varphi_{12}$, a new phase of the second in-segment reference symbol is $\theta_{22}=\varphi_{22}-\varphi_{12}$, a new phase of the third in-segment reference symbol is $\theta_{32}=\varphi_{32}-\varphi_{22}$, and a new phase of the fourth in-segment reference symbol is $\theta_{42}=\varphi_{42}-\varphi_{32}$. Based on the phases of the in-segment reference symbols obtained through phase differentiation, the receiving device adjusts phases of other symbols as follows: In the segment 1, a new phase of S11 is $\theta_{11}=\varphi_{11}-\theta_{12}$, a new phase of S13 is $\theta_{13}=\varphi_{13}-\theta_{12}$, and a new phase of S14 is $\theta_{14}=\varphi_{14}-\theta_{12}$; in the segment 2, a new phase of S21 is $\theta_{21}=\varphi_{21}-\theta_{22}$, a new phase of S23 is $\theta_{23}=\varphi_{23}-\theta_{22}$, and a new phase of S24 is $\theta_{24}=\varphi_{24}-\theta_{22}$; and in the segment 4, a new phase of S41 is $\theta_{41}=\varphi_{41}-\theta_{42}$, a new phase of S43 is $\theta_{43}=\varphi_{43}-\theta_{42}$, and a new phase of S44 is $\theta_{44}=\varphi_{44}-\theta_{42}$. Phase differentiation may be concurrently performed between the symbols in each segment. According to the foregoing embodiment, processing efficiency is further improved; in addition, phase differentiation is performed between the in-segment reference symbols, to further consider a phase noise suppression capability to some extent.

In a possible implementation of this application, an in-segment reference symbol in each of the N segments is the first symbol.

In a possible implementation of this application, the in-segment reference symbol is a pilot symbol.

In a possible implementation of this application, a preset constellation diagram includes but is not limited to QAM, APSK, or MASK, and a modulation order is not limited.

In a possible implementation of this application, the adjusting a phase of a symbol in each segment according to a preset phase inverse-adjustment rule includes:

determining an in-segment reference symbol in each of the N segments, where the in-segment reference symbol meets $2 \le R_t \le M_t - 1$.

for a symbol meeting $1 \leq i \leq N$ and $R_i < j \leq M_i$ in the N segments, adjusting a phase of the symbol according to $\theta_{ij} = \varphi_{ij} - \varphi_{i(j-1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \geq 3$;

for a symbol meeting $1 \leq i \leq N$ and $1 \leq j < R_i$ in the N segments, adjusting a phase of the symbol according to $\theta_{ij} = \varphi_{ij} - \varphi_{i(j+1)}$; and for a symbol meeting $1 \leq i \leq N$ and $j = R_i$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $R_i = M_i$;

for a symbol meeting $1 \leq i \leq N$ and $1 \leq j < M_i$ in the N segments, adjusting a phase of the symbol according to $\theta_{ij} = \varphi_{ij} - \varphi_{i(j+1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \geq 2$; and for a symbol meeting $1 \leq i \leq N$ and $j = M_i$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $R_i = 1$;

for a symbol meeting $1 \leq i \leq N$ and $1 < j \leq M_i$ in the N segments, adjusting a phase of the symbol according to $\theta_{ij} = \varphi_{ij} - \varphi_{i(j-1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \geq 2$; and for a symbol meeting $1 \leq i \leq N$ and $j = 1$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $2 \leq R_i \leq M_i - 1$;

for a symbol meeting $1 \leq i \leq N$, $1 \leq j \leq M_i$, and $j \neq R_i$ in the N segments, adjusting a phase of the symbol according to $\theta_{ij} = \varphi_{ij} - \varphi_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = R_i$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $R_i = M_i$;

for a symbol meeting $1 \leq i \leq N$ and $1 \leq j < M_i$ in the N segments, adjusting a phase of the symbol according to $\theta_{ij} = \varphi_{ij} - \varphi_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = M_i$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $R_i = 1$;

for a symbol meeting $1 \leq i \leq N$ and $1 < j \leq M_i$ in the N segments, adjusting a phase of the symbol according to $\theta_{ij} = \varphi_{ij} - \varphi_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = 1$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $2 \leq R_i \leq M_i - 1$;

for an in-segment reference symbol meeting $1 \leq i \leq N$ in the N segments, adjusting a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a phase of the reference symbol in the $i^{th}$ segment, and $\theta_{iR_i}$ represents a phase to which $\varphi_{iR_i}$ is adjusted;

for a symbol meeting $R_i + 1 < j \leq M_i$ in the N segments, adjusting a constellation phase of the symbol according to a formula $\theta_{ij} = \varphi_{ij} - \varphi_{i(j-)}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \geq 3$;

for a symbol meeting $1 \leq i \leq N$ and $j=R_i+1$ in the N segments, adjusting a phase of the symbol according to $\theta_{i(R_i+1)} = \varphi_{i(R_i+1)} - \theta_{iR_i}$;

for a symbol meeting $1 \leq i \leq N$ and $1 \leq j < R_i - 1$ in the N segments, adjusting a phase of the symbol according to $\theta_{ij} = \varphi_{ij} - \varphi_{i(j+1)}$;

for a symbol meeting $1 \leq i \leq N$ and $j=R_i-1$ in the N segments, adjusting a phase of the symbol according to $\theta_{i(R_i-1)} = \varphi_{i(R_i-1)} - \theta_{iR_i}$; and for a symbol meeting $1 \leq i \leq N$ and $j=R_i$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $R_i = M_i$;

for an in-segment reference symbol meeting $1 \leq i \leq N$ in the N segments, adjusting a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a phase of the reference symbol in the $i^{th}$ segment, and $\theta_{iR_i}$ represents a phase to which $\varphi_{iR_i}$ is adjusted;

for a symbol meeting $1 \leq i \leq N$ and $1 \leq j < M_i - 1$ in the N segments, adjusting a phase of the symbol according to $\theta_{ij} = \varphi_{ij} - \varphi_{i(j+1)}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \geq 3$;

for a symbol meeting $1 \leq i \leq N$ and $j=M_i-1$ in the N segments, adjusting a phase of the symbol according to $\theta_{i(R_i-1)} = \varphi_{i(R_i-1)} - \theta_{iR_i}$; and for a symbol meeting $1 \leq i \leq N$ and $j=M_i$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $R_i = 1$;

for an in-segment reference symbol meeting $1 \leq i \leq N$ in the N segments, adjusting a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a phase of the reference symbol in the $i^{th}$ segment, and $\theta_{iR_i}$ represents a phase to which $\varphi_{iR_i}$ is adjusted;

for a symbol meeting $2 < j \leq M_i$ in the N segments, adjusting a constellation phase of the symbol according to a formula $\theta_{ij} = \varphi_{ij} - \varphi_{i(j-1)}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \geq 3$;

for a symbol meeting $1 \leq i \leq N$ and $j=2$ in the N segments, adjusting a phase of the symbol according to $\theta_{i(R_i+1)} = \varphi_{i(R_i+1)} - \theta_{iR_i}$; and for a symbol meeting $1 \leq i = N$ and $j=1$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each symbol in the N segments, where the in-segment reference symbol meets $2 \leq R_i \leq M_i - 1$.

for an in-segment reference symbol meeting $1 \leq i \leq N$ in the N segments, adjusting a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $R_i$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$, $1 \leq j \leq M_i$, and $j \neq R_i$ in the N segments, adjusting a phase of the symbol according to $\theta_{ij} = \varphi_{ij} - \theta_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 3$; and for a symbol meeting $1 \leq i \leq N$ and $j=R_i$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each symbol in the N segments, where the in-segment reference symbol meets $R_i = M_i$;

for an in-segment reference symbol meeting $1 \leq i \leq N$ in the N segments, adjusting a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$ and $1 \leq j < M_i$ in the N segments, adjusting a phase of the symbol according to $\theta_{ij} = \varphi_{ij} - \theta_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j=M_i$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each symbol in the N segments, where the in-segment reference symbol meets $R_i = 1$;

for an in-segment reference symbol meeting $1 \leq i \leq N$ in the N segments, adjusting a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$ and $1 < j \leq M_i$ in the N segments, adjusting a phase of the symbol according to $\theta_{ij} = \varphi_{ij} - \theta_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j=1$ in the N segments, adjusting a phase of the symbol according to $\theta_{ij} = \varphi_{ij}$.

According to a third aspect, this application provides a sending device, including:

a coding module, configured to perform coding processing on raw data to obtain a coded sequence;

a mapping module, configured to perform constellation mapping on the coded sequence based on a preset constellation diagram, to obtain M symbols, where M is an integer greater than 1;

a grouping module, configured to divide the M symbols into N segments, where N is an integer greater than 1;

an obtaining module, configured to obtain a constellation phase of each symbol in the N segments;

an adjustment module, configured to adjust a constellation phase of a symbol in each segment according to a preset phase adjustment rule, where the N segments are concurrently adjusted; and a modulation module, configured to modulate M symbols obtained through phase adjustment, to obtain a modulated signal, and send the modulated signal.

In a possible implementation of this application, the adjustment module is configured to:

determine an in-segment reference symbol in each of the N segments, where the in-segment reference symbol meets $2 \leq R_i \leq M_i - 1$;

for a symbol meeting $1 \leq i \leq N$ and $R_i < j \leq M_i$ in the N segments, adjust a constellation phase of the symbol according to $\varphi_{ij} = \theta_{ij} + \theta_{i(j-1)} + \ldots \theta_{i(R_i-1)} + \theta_{iR_i}$, where i represents a sequence number of a segment, j represents a sequence number of a symbol in the N segments, $M_i$ represents a quantity of symbols in an $i^{th}$ segment, that is, $M_1 + M_2 + \ldots M_N = M$ is met, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 3$;

for a symbol meeting $1 \leq i \leq N$ and $1 \leq j < R_i$ in the N segments, adjust a constellation phase of the symbol according to $\varphi_{ij} = \theta_{ij} + \theta_{i(j+1)} + \ldots + \theta_{iR_i}$; and for a symbol meeting $1 \leq i \leq N$ and $j = R_i$ in the N segments, adjust a constellation phase of the symbol according to $\varphi_{ij} = \theta_{ij}$.

In a possible implementation of this application, the adjustment module is configured to: determine an in-segment reference symbol in each of the N segments, where the in-segment reference symbol meets $R_i = 1$;

for a symbol meeting $1 \leq i \leq N$ and $1 < j \leq M_i$ in the N segments, adjust a constellation phase of the symbol according to $\varphi_{ij} = \theta_{ij} + \theta_{i(j-1)} + \ldots \theta_{i(R_i-1)} + \theta_{iR_i}$, where i represents a sequence number of a segment, j represents a sequence number of a symbol in the N segments, $M_i$ represents a quantity of symbols in an $i^{th}$ segment, that is, $M_1 + M_2 + \ldots M_N = M$ is met, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 2$; and for a symbol meeting $1 \leq i \leq N$ and $j=1$ in the N segments, adjust a constellation phase of the symbol according to $\varphi_{ij} = \theta_{ij}$.

In a possible implementation of this application, the adjustment module is configured to:

determine an in-segment reference symbol in each of the N segments, where the in-segment reference symbol meets $2 \leq R_i \leq M_i - 1$;

for a symbol meeting $1 \leq i \leq N$, $1 \leq j \leq M_i$, and $j \neq R_i$ in the N segments, adjust a constellation phase of the symbol according to $\varphi_{ij} = \theta_{ij} + \theta_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 3$; and for a symbol meeting $1 \leq i \leq N$ and $j = R_i$ in the N segments, adjust a constellation phase of the symbol according to $\varphi_{ij} = \theta_{ij}$.

In a possible implementation of this application, the adjustment module is configured to:

determine an in-segment reference symbol in each of the N segments, where the in-segment reference symbol meets $R_i = 1$;

for a symbol meeting $1 \leq i \leq N$ and $1 < j \leq M_i$ in the N segments, adjust a constellation phase of the symbol according to $\varphi_{ij} = \theta_{ij} + \theta_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 2$; and for a symbol meeting $1 \leq i \leq N$ and $j = R_i$ in the N segments, adjust a constellation phase of the symbol according to $\varphi_{ij} = \theta_{ij}$.

In a possible implementation of this application, the adjustment module is configured to:

determine an in-segment reference symbol in each of the N segments, where the in-segment reference symbol meets $2 \leq R_i \leq M_i - 1$;

for an in-segment reference symbol meeting $1 \leq i \leq N$ in the N segments, adjust a constellation phase of the in-segment reference symbol according to $\varphi_{iR_i} = \theta_{iR_i} + \theta_{(i-1)(R_{i-1})} + \ldots \theta_{2R_2} + \theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $R_i < j \leq M_i$ in the N segments, adjust a constellation phase of the symbol according to $\varphi_{ij} = \theta_{ij} + \theta_{i(j-1)} + \ldots \theta_{i(R_i-1)} + \varphi_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$;

for a symbol meeting $1 \leq i \leq N$ and $1 \leq j < R_i$ in the N segments, adjust a constellation phase of the symbol according to a formula $\varphi_{ij} = \theta_{ij} + \theta_{i(j+1)} + \ldots + \varphi_{iR_i}$; and for a symbol meeting $1 \leq i \leq N$ and $j = R_i$ in the N segments, adjust a phase of the symbol according to $\varphi_{ij} = \theta_{ij}$.

In a possible implementation of this application, the adjustment module is configured to:

determine an in-segment reference symbol in each of the N segments, where the in-segment reference symbol meets $R_i = 1$;

for an in-segment reference symbol meeting $1 \leq i \leq N$ in the N segments, adjust a constellation phase of the in-segment reference symbol according to $\varphi_{iR_i} = \theta_{iR_i} + \theta_{(i-1)(R_{i-1})} + \ldots \theta_{2R_2} + \theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $1 < j \leq M_i$ in the N segments, adjust a constellation phase of the symbol according to $\varphi_{ij} = \theta_{ij} + \theta_{i(j-1)} + \ldots \theta_{i(R_i-1)} + \varphi_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$; and for a symbol meeting $1 \leq i \leq N$ and $j = R_i$ in the N segments, adjust a phase of the symbol according to $\varphi_{ij} = \theta_{ij}$.

In a possible implementation of this application, the adjustment module is configured to:

determine an in-segment reference symbol in each symbol in the N segments, where the in-segment reference symbol meets $2 \leq R_i \leq M_i - 1$;

for an in-segment reference symbol meeting $1 \leq i \leq N$ in the N segments, adjust a constellation phase of the in-segment reference symbol according to $\varphi_{iR_i} = \theta_{iR_i} + \theta_{(i-1)(R_{i-1})} + \ldots \theta_{2R_2} + \theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$, $1 \leq j \leq R_i$, and $j \neq R_i$ in the N segments, adjust a constellation phase of the symbol according to $\varphi_{ij} = \theta_{ij} + \varphi_{iR_i}$, where $M_i$ represents a quantity of symbols in an $i^{th}$ segment, $M_1 + M_2 + \ldots M_N = M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 3$, and for a symbol meeting $1 \leq i \leq N$ and $j = R_i$ in the N segments, adjust a phase of the symbol according to $\varphi_{ij} = \theta_{ij}$.

In a possible implementation of this application, the adjustment module is configured to:

determine an in-segment reference symbol in each symbol in the N segments, where the in-segment reference symbol meets $R_i = 1$;

for an in-segment reference symbol meeting $1 \leq i \leq N$ in the N segments, adjust a constellation phase of the in-segment reference symbol according to $\varphi_{iR_1} = \theta_{iR_i} + \theta_{(i-1)(R_{i-1})} + \ldots \theta_{2R_2} + \theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $1 < j \leq M_i$ in the N segments, adjust a constellation phase of the symbol according to $\varphi_{ij} = \theta_{ij} + \varphi_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$; and for a symbol meeting $1 \leq i \leq N$ and $j = 1$ in the N segments, adjust a phase of the symbol according to $\varphi_{ij} = \theta_{ij}$.

In a possible implementation of this application, the in-segment reference symbol is a pilot symbol.

According to a fourth aspect, this application provides a receiving device, including:

a receiving module, configured to receive a modulated signal, and demodulate the adjusted signal to obtain M symbols;

a regrouping module, configured to divide the M symbols into N groups, where N is an integer greater than 1;

a phase obtaining module, configured to obtain a phase of each symbol in the N segments;

an inverse-adjustment module, configured to adjust a phase of a symbol in each segment according to a preset phase inverse-adjustment rule, where phase adjustment is concurrently performed on the N segments;

a demapping module, configured to perform, based on a preset constellation diagram, constellation demapping on M symbols obtained through phase adjustment, to obtain a coded sequence; and a decoding module, configured to perform decoding processing on the coded sequence to obtain raw data.

In a possible implementation of this application, the inverse-adjustment module is configured to:

determine an in-segment reference symbol in each of the N segments, where the in-segment reference symbol meets $2 \leq R_i \leq M_i - 1$;

for a symbol meeting $1 \leq i \leq N$ and $R_i < j \leq M_i$ in the N segments, adjust a phase of the symbol according to $\theta_{ij} = \varphi_{ij} - \varphi_{i(j-1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \geq 3$;

for a symbol meeting $1 \leq i \leq N$ and $1 \leq j < R_i$ in the N segments, adjust a phase of the symbol according to $\theta_{ij} = \varphi_{ij} - \varphi_{i(j+1)}$; and for a symbol meeting $1 \leq i \leq N$ and $j = R_i$ in the N segments, adjust a phase of the symbol according to $\theta_{ij} = \varphi_{ij}$.

In a possible implementation of this application, the inverse-adjustment module is configured to:

determine an in-segment reference symbol in each of the N segments, where the in-segment reference symbol meets $R_i = 1$;

for a symbol meeting $1 \le i \le N$ and $1 < j \le M_i$ in the N segments, adjust a phase of the symbol according to $\theta_{ij} = \varphi_{ij} - \varphi_{i(j-1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \ge 2$; and for a symbol meeting $1 \le i \le N$ and $j=1$ in the N segments, adjust a phase of the symbol according to $\theta_{ij} = \varphi_{ij}$.

In a possible implementation of this application, the inverse-adjustment module is configured to:

determine an in-segment reference symbol in each of the N segments, where the in-segment reference symbol meets $2 \le R_i \le M_i - 1$;

for a symbol meeting $1 \le i \le N$, $1 \le j \le M_i$, and $j \ne R_i$ in the N segments, adjust a phase of the symbol according to $\theta_{ij} = \varphi_{ij} - \varphi_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \ge 2$; and for a symbol meeting $1 \le i \le N$ and $j = R_i$ in the N segments, adjust a phase of the symbol according to $\theta_{ij} = \varphi_{ij}$.

In a possible implementation of this application, the inverse-adjustment module is configured to:

determine an in-segment reference symbol in each of the N segments, where the in-segment reference symbol meets $R_i = 1$;

for a symbol meeting $1 \le i \le N$ and $1 < j \le M_i$ in the N segments, adjust a phase of the symbol according to $\theta_{ij} = \varphi_{ij} - \varphi_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \ge 2$; and for a symbol meeting $1 \le i \le N$ and $j=1$ in the N segments, adjust a phase of the symbol according to $\theta_{ij} = \varphi_{ij}$.

In a possible implementation of this application, the inverse-adjustment module is configured to:

determine an in-segment reference symbol in each of the N segments, where the in-segment reference symbol meets $2 \le R_i \le M_i - 1$;

for an in-segment reference symbol meeting $1 \le i \le N$ in the N segments, adjust a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a phase of the reference symbol in the $i^{th}$ segment, and $\theta_{iR_i}$ represents a phase to which $\varphi_{iR_i}$ is adjusted;

for a symbol meeting $R_i + 1 < j \le M_i$ in the N segments, adjust a constellation phase of the symbol according to a formula $\theta_{ij} = \varphi_{ij} - \varphi_{i(j-1)}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \ge 3$;

for a symbol meeting $1 \le i \le N$ and $j = R_i + 1$ in the N segments, adjust a phase of the symbol according to $\theta_{i(R_i+1)} = \varphi_{i(R_i+1)} - \theta_{iR_i}$;

for a symbol meeting $1 \le i \le N$ and $1 \le j < R_i - 1$ in the N segments, adjust a phase of the symbol according to $\theta_{ij} = \varphi_{ij} - \varphi_{i(j+1)}$;

for a symbol meeting $1 \le i \le N$ and $j = R_i - 1$ in the N segments, adjust a phase of the symbol according to $\theta_{i(R_i-1)} = \varphi_{i(R_i-1)} - \theta_{iR_i}$; and for a symbol meeting $1 \le i \le N$ and $j = R_i$ in the N segments, adjust a phase of the symbol according to $\theta_{ij} = \varphi_{ij}$.

In a possible implementation of this application, the inverse-adjustment module is configured to:

determine an in-segment reference symbol in each of the N segments, where the in-segment reference symbol meets $R_i = 1$;

for an in-segment reference symbol meeting $1 \le i \le N$ in the N segments, adjust a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a phase of the reference symbol in the $i^{th}$ segment, and $\theta_{iR_i}$ represents a phase to which $\varphi_{iR_i}$ is adjusted;

for a symbol meeting $2 < j \le M_i$ in the N segments, adjust a constellation phase of the symbol according to a formula $\theta_{ij} = \varphi_{ij} - \varphi_{i(j-1)}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \ge 3$;

for a symbol meeting $1 \le i \le N$ and $j=2$ in the N segments, adjust a phase of the symbol according to $\theta_{i(R_i+1)} = \varphi_{i(R_i+1)} - \theta_{iR_i}$; and for a symbol meeting $1 \le i \le N$ and $j=1$ in the N segments, adjust a phase of the symbol according to $\theta_{ij} = \varphi_{ij}$.

In a possible implementation of this application, the inverse-adjustment module is configured to:

determine an in-segment reference symbol in each symbol in the N segments, where the in-segment reference symbol meets $2 \le R_i \le M_i - 1$;

for an in-segment reference symbol meeting $1 \le i \le N$ in the N segments, adjust a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \le i \le N$, $1 \le j \le M_i$, and $j \ne R_i$ in the N segments, adjust a phase of the symbol according to $\theta_{ij} = \varphi_{ij} - \theta_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \ge 3$; and for a symbol meeting $1 \leq i \leq N$ and $j=R_i$ in the N segments, adjust a phase of the symbol according to $\theta_{ij}=\varphi_{ij}$.

In a possible implementation of this application, the inverse-adjustment module is configured to:

determine an in-segment reference symbol in each symbol in the N segments, where the in-segment reference symbol meets $R_i=1$;

for an in-segment reference symbol meeting $1 \leq i \leq N$ in the N segments, adjust a phase of the in-segment reference symbol according to $\theta_{iR_i}=\varphi_{iR_i}-\varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$ and $1 < j \leq M_i$ in the N segments, adjust a phase of the symbol according to $\theta_{ij}=\varphi_{ij}-\theta_{iR_i}$, where $M_i$ represents a quantity of symbols in the $i^{th}$ segment, $M_1+M_2+\ldots M_N=M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted and $M_i$ are all integers, and $M_i \geq 2$; and for a symbol meeting $1 \leq i \leq N$ and $j=1$ in the N segments, adjust a phase of the symbol according to $\theta_{ij}=\varphi_{ij}$.

According to a fifth aspect, this application provides a digital communications system, including a sending device and a receiving device, where the sending device performs coding processing on raw data to obtain a coded sequence; the sending device performs constellation mapping on the coded sequence based on a preset constellation diagram, to obtain M symbols, where M is an integer greater than 1; the sending device divides the M symbols into N segments, where N is an integer greater than 1; the sending device obtains a constellation phase of each symbol in the N segments; the sending device adjusts a constellation phase of a symbol in each segment according to a preset phase adjustment rule, where the N segments are concurrently adjusted; and the sending device modulates M symbols obtained through phase adjustment, to obtain a modulated signal, and sends the modulated signal. The receiving device receives the modulated signal sent by the sending device and demodulates the adjusted signal to obtain M symbols; the receiving device divides the M symbols into N groups, where a manner in which the receiving device divides the M symbols is the same as a manner for the sending device, where N is an integer greater than 1; the receiving device obtains a phase of each symbol in the N segments; the receiving device adjusts a phase of a symbol in each segment according to a preset phase inverse-adjustment rule, where the phase inverse-adjustment rule for the receiving device is an inverse process of the phase adjustment rule for the sending device, and phase adjustment is concurrently performed on the N segments; the receiving device performs, based on a preset constellation diagram, constellation demapping on the M symbols obtained through phase adjustment, to obtain a coded sequence, where the constellation diagram used by the receiving device is the same as that used by the sending device; and the receiving device performs decoding processing on the coded sequence to obtain the raw data. According to the foregoing embodiment, the sending device and the receiving device concurrently perform adjustment for phase noise suppression, thereby improving processing efficiency.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show some embodiments of the present application, and a person of ordinary skill in the art may still derive other drawings from these accompanying drawings without creative efforts.

DESCRIPTION OF EMBODIMENTS

It should be noted that the terms used in the embodiments of the present application are for a purpose of describing a specific embodiment, and are not intended to limit the present application. The terms "a", "foregoing", and "the" of singular forms used in the embodiments and the appended claims of the present application are also intended to include plural forms, unless otherwise specified in the context clearly. It should also be understood that the term "and/or" in the specification indicates and includes any or all possible combinations of one or more associated listed items. In addition, in the specification, claims, and accompanying drawings of the present application, the terms "first", "second", "third", "fourth", and so on are intended to distinguish between different objects but do not indicate a specific order. In addition, the terms "including", "having", or any other variant thereof are intended to cover a non-exclusive inclusion. For example, a process, method, system, product, or device that includes a series of steps or units is not limited to the listed steps or units, but optionally further includes an unlisted step or unit, or optionally further includes another inherent step or unit of such a process, method, product, or device.

A digital modulation method and a digital demodulation method provided in implementations may be applied to a plurality of communications standards, which include but are not limited to GSM (Global System for Mobile Communications) or CDMA (Code Division Multiple Access), or may be WCDMA (Wideband Code Division Multiple Access), LTE (Long Term Evolution), a future 5G network standard, or another communications standard such as wireless local area network (WLAN), Worldwide Interoperability for Microwave Access (WiMAX), Bluetooth, or infrared.

Figure 1:
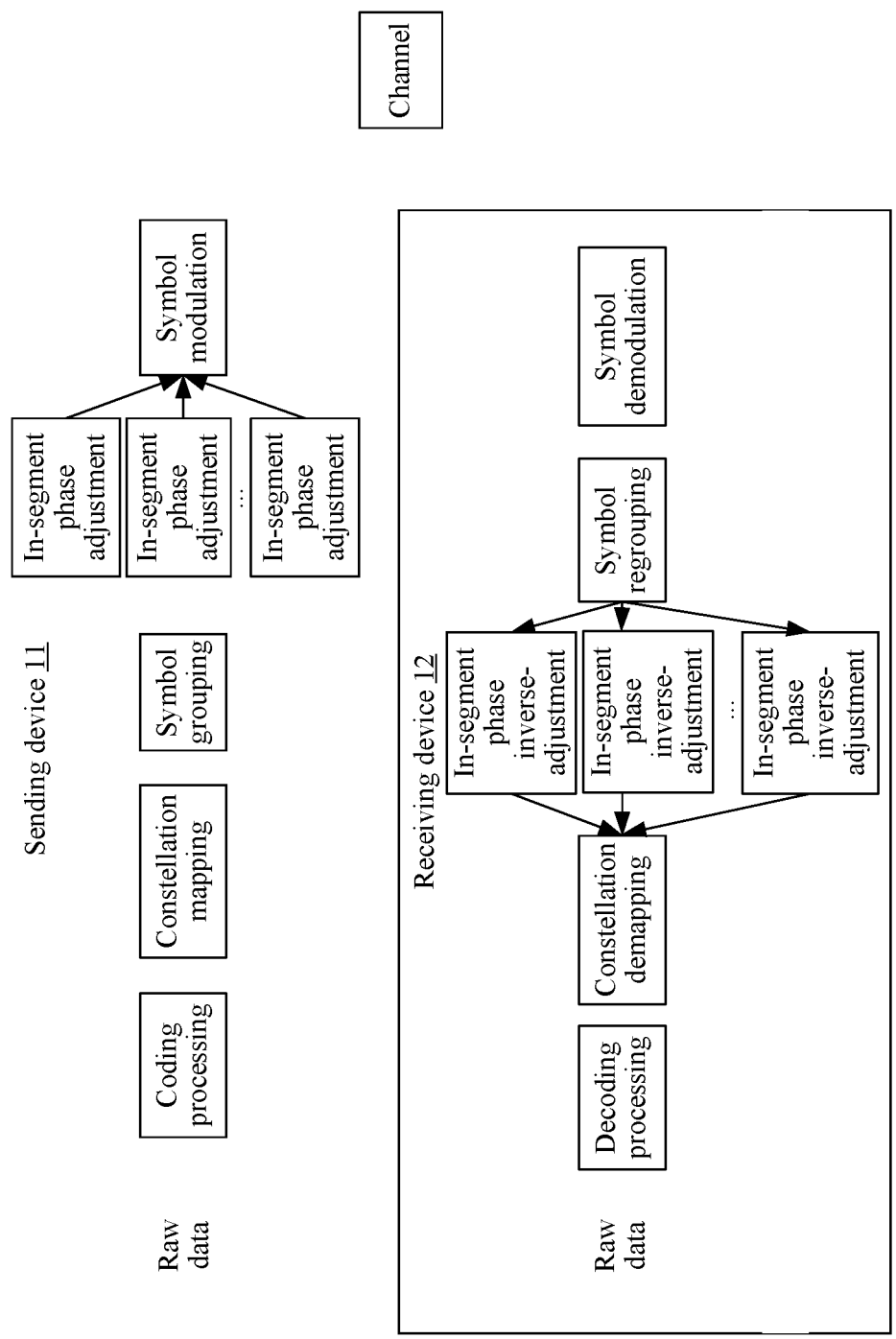
FIG. 1 is a schematic structural diagram of a digital communications system according to an embodiment of the present application.

FIG. 1 is a schematic structural diagram of a digital communications system according to an embodiment of the present application. In this embodiment of the present application, the digital communications system includes a sending device 11 and a receiving device 12. A working process of the digital communications system is as follows.

The sending device 11 performs coding processing, symbol grouping, concurrent in-segment phase adjustment coding processing, and symbol modulation. Coding processing: The sending device 11 performs coding processing on raw data to obtain a coded sequence, where the raw data may be data in a binary format, and the sending device performs processing such as source coding, channel coding processing, and interleaving coding on the raw data. The sending device obtains a binary bit sequence after the coding processing. The sending device divides the bit sequence into M bit groups based on a modulation order, where the coded sequence includes the M bit groups, and a quantity of bits included in each bit group is the same as the modulation order. Constellation mapping: The sending device performs constellation mapping on the M bit groups based on a preset constellation diagram, to obtain M symbols, where M is an integer greater than 1. Symbol grouping: The sending device divides the M symbols into N segments, where N is an integer greater than 1. In-segment phase adjustment: The sending device obtains a constellation phase of each symbol in the N segments. The sending device adjusts a constellation phase of a symbol in each segment according to a preset phase adjustment rule, where the N segments are concurrently adjusted. The concurrent manner may be specifically: a software manner or a hardware manner. Software manner: A multi-thread manner is used to perform phase adjustment on the N segments, where a quantity of created threads is equal to the quantity N of the segments, and each thread is used to adjust a constellation phase of a symbol in a corresponding segment. Hardware manner: Serial-to-parallel conversion is performed on the N segments to obtain N parallel symbol streams, and the N parallel symbol streams are respectively input to N phase adjustment circuits, where each symbol stream uniquely corresponds to one phase adjustment circuit, and the phase adjustment circuit is configured to adjust a constellation phase of an input symbol according to the preset phase adjustment rule. Symbol modulation: The sending device modulates M symbols obtained through phase adjustment, to obtain a modulated signal, and sends the modulated signal.

A processing process of the receiving device 12 includes symbol demodulation, symbol regrouping, in-segment phase inverse-adjustment, constellation demapping, and decoding processing. Symbol demodulation: The receiving device receives the modulated signal sent by the sending device and demodulates the adjusted signal to obtain M symbols. Symbol regrouping: The receiving device divides the M symbols into N groups, where a manner in which the receiving device divides the M symbols is the same as a manner for the sending device, and N is an integer greater than 1. In-segment phase inverse-adjustment: The receiving device obtains a phase of each symbol in the N segments, and the receiving device adjusts a phase of a symbol in each segment according to a preset phase inverse-adjustment rule, where the phase inverse-adjustment rule for the receiving device is an inverse process of the phase adjustment rule for the sending device, and phase adjustment is concurrently performed on the N segments. Constellation demapping: The receiving device performs, based on a preset constellation diagram, constellation demapping on the M symbols obtained through phase adjustment, to obtain the coded sequence, where the constellation diagram used by the receiving device is the same as that used by the sending device. Decoding processing: The receiving device performs decoding processing on the coded sequence to obtain the raw data. In the foregoing embodiment, when a phase noise suppression capability of a signal of the sending device needs to be improved, the sending device divides the symbols obtained through the constellation mapping into the segments. Phases of the symbols are concurrently adjusted for the segments, thereby improving modulation efficiency of the sending device and reducing a processing time.

Figure 2:
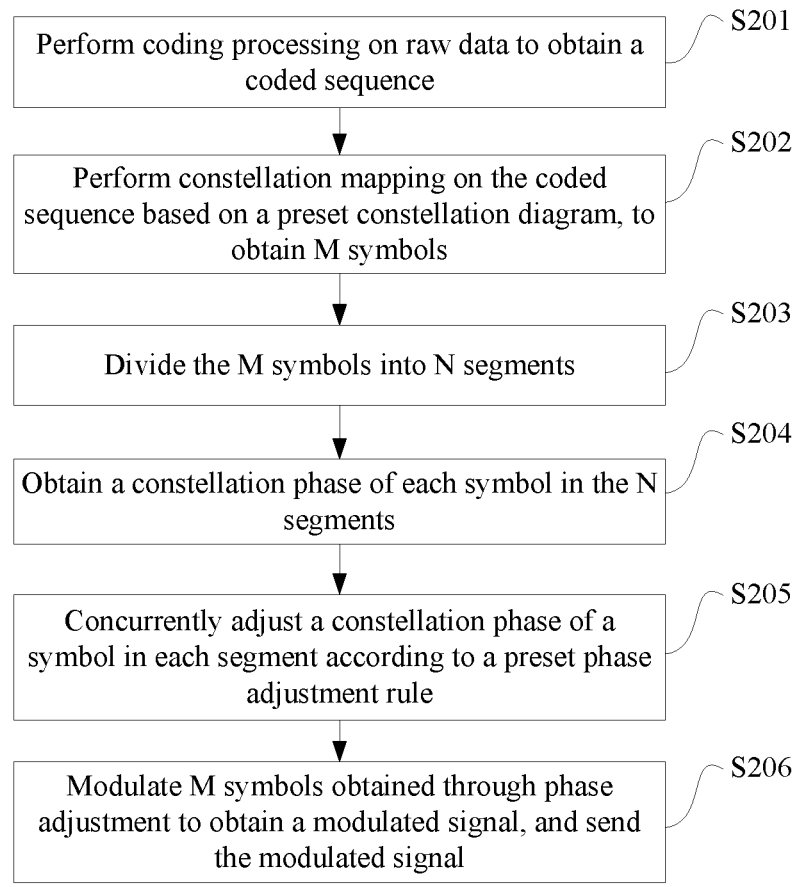
FIG. 2 is a schematic flowchart of a modulation method according to an embodiment of the present application.

FIG. 2 is a schematic flowchart of a modulation method according to an embodiment of the present application. The method includes but is not limited to the following steps.

S201. Perform coding processing on raw data to obtain a coded sequence.

Specifically, a sending device obtains the raw data output by a signal source. The sending device includes but is not limited to a base station, a mobile station, a router, a site, a gateway, or another network device. The raw data may be data in a binary format. The sending device performs processing such as source coding, channel coding processing, or interleaving coding on the raw data, where the source coding method includes but is not limited to Shannon coding, Fano coding, and Huffman coding; and the channel coding method includes but is not limited to parity-check coding, CRC coding, Turbo coding, and the like. The sending device obtains a binary bit sequence after coding processing. The sending device divides the bit sequence into M bit groups based on a modulation order, where the coded sequence includes the M bit groups, and a quantity of bits included in each bit group is the same as the modulation order. For example, the bit sequence includes 16 bits, the modulation order is 2, the sending device divides the 16 bits into eight bit groups, and each bit group includes two bits.

S202. Perform constellation mapping on the coded sequence based on a preset constellation diagram, to obtain M symbols.

Specifically, the coded sequence includes M bit groups, the bit groups each include a same quantity of bits, and the quantity of bits is equal to the modulation order. The constellation diagram is preset based on the modulation order. For example, when the modulation order N=2, the constellation diagram is a four-point constellation diagram;

when the modulation order is 4, the constellation diagram is a 16-point constellation diagram; or when the modulation order is 6, the constellation diagram is a 64-point constellation diagram. The constellation diagram may be a standard APSK constellation diagram or QAM constellation diagram, or symmetric constellation diagram in another form, or a customized asymmetric constellation diagram. Positions of constellation points in the constellation diagram are not limited in this embodiment of the present application. The constellation diagram is used to represent a mapping relationship between a bit group and coordinates of a constellation point. The mapping relationship between the bit group and the coordinates of the constellation point is not limited in this embodiment of the present application, either. The coordinates of the constellation point include an amplitude and a constellation phase. Optionally, a Gray code mapping manner is used for the QAM constellation diagram, and a quasi-Gray code mapping manner is used for the APSK constellation diagram.

S203. Divide the M symbols into N segments.

Specifically, M and N are integers greater than 1, and quantities of symbols included in each of the N segments may be the same or different. For example, in a wireless local area network, the M symbols are a radio frame, the radio frame includes 512 symbols, the sending device divides the radio frame into eight segments, and each of the eight segments includes 64 symbols.

S204. Obtain a constellation phase of each symbol in the N segments.

Specifically, the constellation diagram represents a mapping relationship between a symbol and constellation coordinates. The sending device may learn constellation phases of the M symbols by using positions of the symbols on the constellation diagram in S203.

S205. Concurrently adjust a constellation phase of a symbol in each segment according to a preset phase adjustment rule.

Specifically, the phase adjustment rule is used to suppress phase noise. When the sending device performs phase adjustment on each of the N segments according to the preset phase adjustment rule, phase adjustment is concurrently performed on the segments. The concurrent manner may be specifically: a software manner or a hardware manner. Software manner: A multi-thread manner is used to perform phase adjustment on the N segments, where a quantity of created threads is equal to the quantity N of the segments, and each thread is used to adjust a constellation phase of a symbol in a corresponding segment. Hardware manner: Serial-to-parallel conversion is performed on the N segments to obtain N parallel symbol streams, and the N parallel symbol streams are respectively input to N phase adjustment circuits, where each symbol stream uniquely corresponds to one phase adjustment circuit, and the phase adjustment circuit is configured to adjust a constellation phase of an input symbol according to the preset phase adjustment rule, to improve modulation efficiency and reduce processing duration.

In a possible implementation, the adjusting, by the sending device, a constellation phase of a symbol in each segment according to a preset phase adjustment rule includes: determining an in-segment reference symbol in each of the N segments, where the in-segment reference symbol meets $2 \leq R_i \leq M_i - 1$;

for a symbol meeting $1 \leq i \leq N$ and $R_i < j \leq M_i$ in the N segments, adjusting a constellation phase of the symbol according to $\varphi_{ij} = \theta_{ij} + \theta_{i(j-1)} + \ldots \theta_{i(R_i-1)} + \theta_{iR_i}$, where i represents a sequence number of a segment, j represents a sequence number of a symbol in the N segments, $M_i$ represents a quantity of symbols in an $i^{th}$ segment, that is, $M_1 + M_2 + \ldots M_N = M$ is met, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 3$;

for a symbol meeting $1 \leq i \leq N$ and $1 \leq j < R_i$ in the N segments, adjusting a constellation phase of the symbol according to $\varphi_{ij} = \theta_{ij} + \theta_{i(j+1)} + \ldots + \theta_{iR_i}$; and for a symbol meeting $1 \leq i \leq N$ and $j = R_i$ in the N segments, adjusting a constellation phase of the symbol according to $\varphi_{ij} = \theta_{ij}$.

Specifically, the in-segment reference symbol may be an intermediate symbol in a segment, and the in-segment reference symbol meets $2 \leq R_i \leq M_i - 1$. In other words, the in-segment reference symbol cannot be the first symbol or the last symbol in the segment. Positions of in-segment reference symbols in all the segments may be the same or different. For one segment, an in-segment reference symbol is used as a boundary to divide symbols in the segment into two types: symbols before the in-segment reference symbol and symbols after the in-segment reference symbol. After the constellation mapping, constellation phases of symbols in each of the N segments are represented as follows: Constellation phases of symbols in the first segment are $\theta_{11}, \theta_{12}, \theta_{13}, \ldots, \theta_{1R_1}, \ldots, \theta_{1(M_1-1)} \theta_{1M_1}$, constellation phases of symbols in the second segment are $\theta_{21}, \theta_{22}, \theta_{23}, \ldots, \theta_{2R_2}, \ldots, \theta_{2(M_2-1)} \theta_{2M_2}$, constellation phases of symbols in the third segment are $\theta_{31}, \theta_{32}, \theta_{33}, \ldots, \theta_{3R_3}, \ldots, \theta_{3(M_3-1)} \theta_{3M_3}$, and by analogy, constellation phases of symbols in the $N^{th}$ segment are $\theta_{N1}, \theta_{N2}, \theta_{N3}, \ldots, \theta_{NR_N}, \ldots, \theta_{N(M_N-1)}, \theta_{NM_N}$, where $\theta_{ij}$ is a constellation phase of any symbol in the N segments, N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, and $\varphi_{ij}$ is obtained through phase adjustment on $\theta_{ij}$. When $1 \leq i \leq N$ and $j = R_i$, that is, a to-be-adjusted symbol is an in-segment reference symbol, $\varphi_{iR_i} = \theta_{iR_i}$; when $1 \leq i \leq N$ and $R_i < j \leq M_i$, $\varphi_{ij} = \theta_{ij} + \theta_{i(j-1)} + \ldots \theta_{i(R_i-1)}$; or when $1 \leq i \leq N$ and $1 \leq j < R_i$, $\varphi_{ij} = \theta_{ij} + \theta_{i(j+1)} + \ldots + \theta_{iR_i}$.

Figure 3A:
FIG. 3a is a schematic diagram of grouping symbols according to an embodiment of the present application.

For example, referring to a grouping manner in FIG. 3a, N=4. Symbols included in a segment 1 are $S_{11}, S_{12}, S_{13}, S_{14}$, and $S_{15}$, and constellation phases of the foregoing symbols are $\theta_{11}, \theta_{12}, \theta_{13}, \theta_{14}$, and $\theta_{15}$ respectively; symbols included in a segment 2 are $S_{21}, S_{22}, S_{23}$, and $S_{24}$, and constellation phases of the foregoing symbols are $\theta_{21}, \theta_{22}, \theta_{23}$, and $\theta_{24}$ respectively; symbols included in a segment 3 are $S_{31}, S_{32}, S_{33}$, and $S_{34}$, and constellation phases of the foregoing symbols are $\theta_{31}, \theta_{32}, \theta_{33}$, and $\theta_{34}$ respectively; and symbols included in a segment 4 are $S_{41}, S_{42}, S_{43}$, and $S_{44}$, and constellation phases of the foregoing four symbols are $\theta_{41}, \theta_{42}, \theta_{43}$, and $\theta_{44}$ respectively. A symbol having a bold box in FIG. 3a is an in-segment reference symbol, and the in-segment reference symbol is an intermediate symbol in a segment. The sending device determines that an in-segment reference symbol in the segment 1 is $S_{13}$, an in-segment reference symbol in the segment 2 is $S_{22}$, an in-segment reference symbol in the segment 3 is $S_{33}$, and an in-segment reference symbol in the segment 4 is $S_{43}$. A method for adjusting, by the sending device, constellation phases of the 17 symbols in the four segments according to the preset phase adjustment rule is: keeping constellation phases of the in-segment reference symbols in the four segments unchanged, that is, keeping $\varphi_{13}=\theta_{13}$, $\varphi_{22}=\theta_{22}$, $\varphi_{33}=\theta_{33}$, and $\varphi_{43}=\theta_{43}$; and adjusting, by the sending device, constellation phases of symbols other than the in-segment reference symbols in the segments as follows: In the segment 1, $\varphi_{11}=\theta_{11}+\theta_{12}+\theta_{13}$, $\varphi_{12}=\theta_{12}+\theta_{13}$, $\varphi_{14}=\theta_{14}+\theta_{13}$, and $\varphi_{15}=\theta_{15}+\theta_{14}+\theta_{13}$; in the segment 2, $\varphi_{21}=\theta_{21}+\theta_{22}$, $\varphi_{23}=\theta_{23}+\theta_{22}$, and $\varphi_{24}=\theta_{24}+\theta_{23}+\theta_{22}$; in the segment 3, $\varphi_{31}=\theta_{31}+\theta_{32}+\theta_{33}$, $\varphi_{32}=\theta_{32}+\theta_{33}$, and $\varphi_{34}=\theta_{34}+\theta_{33}$; and in the segment 4, $\varphi_{44}=\theta_{44}+\theta_{43}$, $\varphi_{42}=\theta_{42}+\theta_{43}+\theta_{44}$, and $\varphi_{41}=\theta_{41}+\theta_{42}+\theta_{43}+\theta_{44}$.

In a possible implementation, the adjusting a constellation phase of a symbol in each segment according to a preset phase adjustment rule includes:

determining an in-segment reference symbol in each of the N segments, where the in-segment reference symbol meets $R_i=M_i$;

for a symbol meeting $1 \leq i \leq N$ and $1 \leq j < M_i$ in the N segments, adjusting a constellation phase of the symbol according to $\varphi_{ij}=\theta_{ij}+\theta_{i(j+1)}+ \ldots \theta_{i(R_i+1)}+\theta_{iR_i}$, where i represents a sequence number of a segment, j represents a sequence number of a symbol in the N segments, $M_i$ represents a quantity of symbols in an $i^{th}$ segment, that is, $M_1+M_2+ \ldots M_N=M$ is met, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 2$; and for a symbol meeting $1 \leq i \leq N$ and $j=M_i$ in the N segments, adjusting a constellation phase of the symbol according to $\varphi_{ij}=\theta_{ij}$.

In a possible implementation of this application, the adjusting a constellation phase of a symbol in each segment according to a preset phase adjustment rule includes:

determining an in-segment reference symbol in each of the N segments, where the in-segment reference symbol meets $R_i=M_i$;

for a symbol meeting $1 \leq i \leq N$ and $1 \leq j < M_i$ in the N segments, adjusting a constellation phase of the symbol according to $\varphi_{ij}=\theta_{ij}+\theta_{iR_i}$, where N represents a quantity of segments, i represents a sequence number of a segment, $M_i$ represents a quantity of symbols in an $i^{th}$ segment, $M_1+M_2+ \ldots M_N=M$, M represents a total quantity of symbols in the N segments, $R_i$ represents a sequence number of an in-segment reference symbol in the $i^{th}$ segment, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 2$; and for a symbol meeting $1 \leq i \leq N$ and $j=R_i$ in the N segments, adjusting a constellation phase of the symbol according to $\varphi_{ij}=\theta_{ij}$.

Figure 3B:
FIG. 3b is another schematic diagram of grouping symbols according to an embodiment of the present application.

For example, referring to a grouping manner in FIG. 3b, N=4. Symbols included in a segment 1 are $S_{11}, S_{12}, S_{13}, S_{14}$, and $S_{15}$, and constellation phases of the foregoing symbols are $\theta_{11}, \theta_{12}, \theta_{13}, \theta_{14}$, and $\theta_{15}$ respectively; symbols included in a segment 2 are $S_{21}, S_{22}, S_{23}$, and $S_{24}$, and constellation phases of the foregoing symbols are $\theta_{21}, \theta_{22}, \theta_{23}$, and $\theta_{24}$ respectively; symbols included in a segment 3 are $S_{31}, S_{32}, S_{33}$ and $S_{34}$, and constellation phases of the foregoing symbols are $\theta_{31}, \theta_{32}, \theta_{33}$, and $\theta_{34}$ respectively; and symbols included in a segment 4 are $S_{41}, S_{42}, S_{43}$, and $S_{44}$, and constellation phases of the foregoing four symbols are $\theta_{41}, \theta_{42}, \theta_{43}$, and $\theta_{44}$ respectively. A symbol having a bold box in FIG. 3b is an in-segment reference symbol, and the in-segment reference symbol is the last symbol in a segment. The sending device determines that an in-segment reference symbol in the segment 1 is $S_{15}$, an in-segment reference symbol in the segment 2 is $S_{24}$, an in-segment reference symbol in the segment 3 is $S_{34}$, and an in-segment reference symbol in the segment 4 is $S_{44}$. A method for adjusting, by the sending device, constellation phases of the 17 symbols in the four segments according to the preset phase adjustment rule is: keeping constellation phases of the in-segment reference symbols in the four segments unchanged, that is, keeping $\varphi_{15}=\theta_{15}$, $\varphi_{24}=\theta_{24}$, $\varphi_{34}=\theta_{34}$, and $\varphi_{44}=\theta_{44}$; and adjusting, by the sending device, constellation phases of symbols other than the in-segment reference symbols in the segments as follows: In the segment 1, $\varphi_{11}=\theta_{11}+\theta_{12}+\theta_{13}+\theta_{14}+\theta_{15}$, $\varphi_{12}=\theta_{12}+\theta_{13}+\theta_{14}+\theta_{15}$, $\varphi_{13}=\theta_{13}+\theta_{14}+\theta_{15}$, and $\varphi_{14}=\theta_{14}+\theta_{15}$; in the segment 2, $\varphi_{21}=\theta_{21}+\theta_{22}+\theta_{23}+\theta_{24}$, $\varphi_{22}=\theta_{22}+\theta_{23}+\theta_{24}$, and $\varphi_{23}=\theta_{23}+\theta_{24}$; in the segment 3, $\varphi_{31}=\theta_{31}+\theta_{32}+\theta_{33}+\theta_{34}$, $\varphi_{32}=\theta_{32}+\theta_{33}+\theta_{34}$, and $\varphi_{33}=\theta_{33}+\theta_{34}$; and in the segment 4, $\varphi_{41}=\theta_{41}+\theta_{42}+\theta_{43}+\theta_{44}$, $\varphi_{42}=\theta_{42}+\theta_{43}+\theta_{44}$, and $\varphi_{43}=\theta_{43}+\theta_{44}$.

In a possible implementation of this application, the adjusting a constellation phase of a symbol in each segment according to a preset phase adjustment rule includes:

determining an in-segment reference symbol in each of the N segments, where the in-segment reference symbol meets $R_i=1$;

for a symbol meeting $1 \leq i \leq N$ and $1 < j \leq M_i$ in the N segments, adjusting a constellation phase of the symbol according to $\varphi_{ij}=\theta_{ij}+\theta_{i(j-1)}+ \ldots \theta_{i(R_i-1)}+\theta_{iR_i}$, where i represents a sequence number of a segment, j represents a sequence number of a symbol in the N segments, $M_i$ represents a quantity of symbols in an $i^{th}$ segment, that is, $M_1+M_2+ \ldots M_N=M$ is met, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 2$; and for a symbol meeting $1 \leq i \leq N$ and $j=1$ in the N segments, adjusting a constellation phase of the symbol according to $\varphi_{ij}=\theta_{ij}$.

Figure 3C:
FIG. 3c is still another schematic diagram of grouping symbols according to an embodiment of the present application.

For example, referring to a grouping manner in FIG. 3c, N=4. Symbols included in a segment 1 are $S_{11}, S_{12}, S_{13}, S_{14}$, and $S_{15}$, and constellation phases of the foregoing symbols are $\theta_{11}, \theta_{12}, \theta_{13}, \theta_{14}$, and $\theta_{15}$ respectively; symbols included in a segment 2 are $S_{21}, S_{22}, S_{23}$, and $S_{24}$, and constellation phases of the foregoing symbols are $\theta_{21}, \theta_{22}, \theta_{23}$, and $\theta_{24}$ respectively; symbols included in a segment 3 are $S_{31}, S_{32}, S_{33}$, and $S_{34}$, and constellation phases of the foregoing symbols are $\theta_{31}, \theta_{32}, \theta_{33}$, and $\theta_{34}$ respectively; and symbols included in a segment 4 are $S_{41}, S_{42}, S_{43}$, and $S_{44}$, and constellation phases of the foregoing four symbols are $\theta_{41}, \theta_{42}, \theta_{43}$, and $\theta_{44}$ respectively. A symbol having a bold box in FIG. 3c is an in-segment reference symbol, and the in-segment reference symbol is the first symbol in a segment. The sending device determines that an in-segment reference symbol in the segment 1 is $S_{11}$, in-segment reference symbol in the segment 2 is $S_{21}$, an in-segment reference symbol in the segment 3 is $S_{31}$, and an in-segment reference symbol in the segment 4 is $S_{41}$. A method for adjusting, by the sending device, constellation phases of the 17 symbols in the four segments according to the preset phase adjustment rule is: keeping constellation phases of the in-segment reference symbols in the four segments unchanged, that is, keeping $\varphi_{11}=\theta_{11}$, $\varphi_{21}=\theta_{21}$, $\varphi_{31}=\theta_{31}$, and $\varphi_{41}=\theta_{41}$; and adjusting, by the sending device, constellation phases of symbols other than the in-segment reference symbols in the segments as follows: In the segment 1, $\varphi_{12}=\theta_{12}+\theta_{11}$, $\varphi_{13}=\theta_{13}+\theta_{12}+\theta_{11}$, $\varphi_{14}=\theta_{14}+\theta_{13}+\theta_{12}+\theta_{11}$, and $\varphi_{15}=\theta_{15}+\theta_{14}+\theta_{13}+\theta_{12}+\theta_{11}$; in the segment 2, $\varphi_{22}=\theta_{22}+\theta_{21}$, $\varphi_{23}=\theta_{23}+\theta_{22}+\theta_{21}$, and $\varphi_{24}=\theta_{24}+\theta_{23}+\theta_{22}+\theta_{21}$; in the segment 3, $\varphi_{32}=\theta_{32}+$ $\theta_{31}$, $\varphi_{33}=\theta_{33}+\theta_{32}+\theta_{31}$, and $\varphi_{34}=\theta_{34}+\theta_{33}+\theta_{32}+\theta_{31}$; and in the segment 4, $\varphi_{42}=\theta_{42}+\theta_{41}$, $\varphi_{43}=\theta_{43}+\theta_{42}+\theta_{41}$, and $\varphi_{44}=\theta_{44}+\theta_{43}+\theta_{42}+\theta_{41}$.

In a possible implementation of this application, the adjusting a constellation phase of a symbol in each segment according to a preset phase adjustment rule includes:

determining an in-segment reference symbol in each of the N segments, where the in-segment reference symbol meets $2 \leq R_i \leq M_i-1$;

for a symbol meeting $1 \leq i \leq N$, $1 \leq M_i$, and $j \neq R_i$ in the N segments, adjusting a constellation phase of the symbol according to $\varphi_{ij}=\theta_{ij}+\theta_{iR_i}$, where N represents a quantity of segments, i represents a sequence number of a segment, $M_i$ represents a quantity of symbols in an $i^{th}$ segment, $M_1+M_2+\ldots M_N=M$, M represents a total quantity of symbols in the N segments, $R_i$ represents a sequence number of an in-segment reference symbol in the $i^{th}$ segment, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 3$; and for a symbol meeting $1 \leq i \leq N$ and $j=R_i$ in the N segments, adjusting a constellation phase of the symbol according to $\varphi_{ij}=\theta_{ij}$.

Specifically, the in-segment reference symbol may be an intermediate symbol in a segment, and the in-segment reference symbol meets $2 \leq R_i \leq M_i-1$. In other words, the in-segment reference symbol cannot be the first symbol or the last symbol in the segment. Positions of in-segment reference symbols in the N segments may be the same or different, and this is not limited in this application; and quantities of symbols included in all the segments may also be the same or different, and this is not limited in this application. After the constellation mapping, constellation phases of symbols in each of the N segments may be represented as follows: Constellation phases of symbols in the first segment are $\theta_{11}, \theta_{12}, \theta_{13}, \ldots, \theta_{1R_1}, \ldots, \theta_{1(M_1-1)}, \theta_{1M_1}$, constellation phases of symbols in the second segment are $\theta_{21}, \theta_{22}, \theta_{23}, \ldots, \theta_{2R_2}, \ldots, \theta_{2(M_2-1)}, \theta_{2M_2}$, constellation phases of symbols in the third segment are $\theta_{31}, \theta_{32}, \theta_{33}, \ldots, \theta_{3R_3}, \ldots, \theta_{3(M_3-1)}, \theta_{3M_3}$, and by analogy, constellation phases of symbols in the $N^{th}$ segment are $\theta_{N1}, \theta_{N2}, \theta_{N3}, \ldots, \theta_{NR_N}, \ldots, \theta_{N(M_N-1)}, \theta_{NM_N}$, where $\theta_{ij}$ is a constellation phase of any symbol in the N segments, N represents a quantity of segments, i represents a sequence number of a segment, $M_i$ represents a quantity of symbols in an $i^{th}$ segment, $M_1+M_2+\ldots M_N=M$, M represents a total quantity of symbols in the N segments, $R_i$ represents a sequence number of an in-segment reference symbol in the $i^{th}$ segment, j represents a sequence number of a symbol, and $\varphi_{ij}$ is obtained through phase adjustment on $\theta_{ij}$. When $1 \leq i \leq N$ and $j=R_i$, that is, a to-be-adjusted symbol is an in-segment reference symbol, $\varphi_{iR_i}=\theta_{iR_i}$; or when $1 \leq i \leq N$, $1 \leq j \leq M_i$, and $j \neq R_i$, $\varphi_{ij}=\theta_{ij}+\theta_{iR_i}$.

Figure 4A:
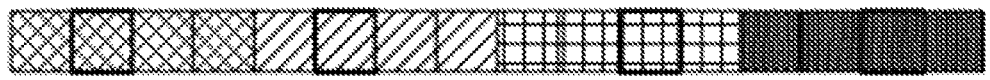
FIG. 4a is a schematic diagram of grouping symbols according to an embodiment of the present application.

For example, referring to a grouping manner in FIG. 4a, N=4, and each segment includes four symbols. Symbols included in a segment 1 are $S_{11}$, $S_{12}$, $S_{13}$, and $S_{14}$, and constellation phases of the foregoing symbols are $\theta_{11}$, $\theta_{12}$, $\theta_{13}$, and $\theta_{14}$ respectively; symbols included in a segment 2 are $S_{21}$, $S_{22}$, $S_{23}$, and $S_{24}$, and constellation phases of the foregoing symbols are $\theta_{21}$, $\theta_{22}$, $\theta_{23}$, and $\theta_{24}$ respectively; symbols included in a segment 3 are $S_{31}$, $S_{32}$, $S_{33}$, and $S_{34}$, and constellation phases of the foregoing symbols are $\theta_{31}$, $\theta_{32}$, $\theta_{33}$, and $\theta_{34}$ respectively; and symbols included in a segment 4 are $S_{41}$, $S_{42}$, $S_{43}$, and $S_{44}$, and constellation phases of the foregoing four symbols are $\theta_{41}$, $\theta_{42}$, $\theta_{43}$, and $\theta_{44}$ respectively. A symbol having a bold box in FIG. 4a is an in-segment reference symbol, and the in-segment reference symbol is an intermediate symbol in a segment. The sending device determines that an in-segment reference symbol in the segment 1 is $S_{12}$, an in-segment reference symbol in the segment 2 is $S_{22}$, an in-segment reference symbol in the segment 3 is $S_{33}$, and an in-segment reference symbol in the segment 4 is $S_{43}$. A method for adjusting, by the sending device, constellation phases of the 16 symbols in the four segments according to the preset phase adjustment rule is: keeping constellation phases of the in-segment reference symbols in the four segments unchanged, that is, keeping $\varphi_{12}=\theta_{12}$, $\varphi_{22}=\theta_{22}$, $\varphi_{33}=\theta_{33}$, and $\varphi_{43}=\theta_{43}$; and adjusting, by the sending device, constellation phases of symbols other than the in-segment reference symbols in the segments as follows: In the segment 1, $\varphi_{11}=\theta_{11}+\theta_{12}$, $\varphi_{13}=\theta_{13}+\theta_{12}$, and $\varphi_{14}=\theta_{14}+\theta_{12}$; in the segment 2, $\varphi_{21}=\theta_{21}+\theta_{22}$, $\varphi_{23}=\theta_{23}+\theta_{22}$, and $\varphi_{24}=\theta_{24}+\theta_{22}$; in the segment 3, $\varphi_{32}=\theta_{32}+\theta_{33}$, $\varphi_{31}=\theta_{31}+\theta_{33}$, and $\varphi_{34}=\theta_{34}+\theta_{33}$; and in the segment 4, $\varphi_{44}=\theta_{44}+\theta_{43}$, $\varphi_{42}=\theta_{42}+\theta_{43}$, and $\varphi_{41}=\theta_{41}+\theta_{43}$.

In a possible implementation of this application, the adjusting a constellation phase of a symbol in each segment according to a preset phase adjustment rule includes:

determining an in-segment reference symbol in each of the N segments, where the in-segment reference symbol meets $R_i=1$;

for a symbol meeting $1 \leq i \leq N$ and $1 < j \leq M_i$ in the N segments, adjusting a constellation phase of the symbol according to $\varphi_{ij}=\theta_{ij}+\theta_{iR_i}$, where N represents a quantity of segments, i represents a sequence number of a segment, $M_i$ represents a quantity of symbols in an $i^{th}$ segment, $M_1+M_2+\ldots M_N=M$, M represents a total quantity of symbols in the N segments, $R_i$ represents a sequence number of an in-segment reference symbol in the $i^{th}$ segment, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 2$; and for a symbol meeting $1 \leq i \leq N$ and $j=R_i$ in the N segments, adjusting a constellation phase of the symbol according to $\varphi_{ij}=\theta_{ij}$.

Figure 4B:
FIG. 4b is another schematic diagram of grouping symbols according to an embodiment of the present application.

For example, referring to a grouping manner in FIG. 4b, N=4, and each segment includes four symbols. Symbols included in a segment 1 are $S_{11}$, $S_{12}$, $S_{13}$, and $S_{14}$, and constellation phases of the foregoing symbols are $\theta_{11}$, $\theta_{12}$, $\theta_{13}$, and $\theta_{14}$ respectively; symbols included in a segment 2 are $S_{21}$, $S_{22}$, $S_{23}$, and $S_{24}$, and constellation phases of the foregoing symbols are $\theta_{21}$, $\theta_{22}$, $\theta_{23}$, and $\theta_{24}$ respectively; symbols included in a segment 3 are $S_{31}$, $S_{32}$, $S_{33}$, and $S_{34}$, and constellation phases of the foregoing symbols are $\theta_{31}$, $\theta_{32}$, $\theta_{33}$, and $\theta_{34}$ respectively; and symbols included in a segment 4 are $S_{41}$, $S_{42}$, $S_{43}$, and $S_{44}$, and constellation phases of the foregoing four symbols are $\theta_{41}$, $\theta_{42}$, $\theta_{43}$, and $\theta_{44}$ respectively. A symbol having a bold box in FIG. 4b is an in-segment reference symbol, and the in-segment reference symbol is the first symbol in a segment. The sending device determines that an in-segment reference symbol in the segment 1 is $S_{11}$, an in-segment reference symbol in the segment 2 is $S_{21}$, an in-segment reference symbol in the segment 3 is $S_{31}$, and an in-segment reference symbol in the segment 4 is $S_{41}$. A method for adjusting, by the sending device, constellation phases of the 16 symbols in the four segments according to the preset phase adjustment rule is: keeping constellation phases of the in-segment reference symbols in the four segments unchanged, that is, keeping $\varphi_{11}=\theta_{11}$, $\varphi_{21}=\theta_{21}$, $\varphi_{31}=\theta_{31}$, and $\varphi_{41}=\theta_{41}$; and adjusting, by the sending device, constellation phases of symbols other than the in-segment reference symbols in the segments as follows: In the segment 1, $\varphi_{12}=\theta_{12}+\theta_{11}$, $\varphi_{13}=\theta_{13}+\theta_{11}$, and $\varphi_{14}=\theta_{14}+\theta_{11}$; in the segment 2, $\varphi_{22}=\theta_{22}+\theta_{21}$, $\varphi_{23}=\theta_{23}+\theta_{21}$, and $\varphi_{24}=\theta_{24}+\theta_{21}$; in the segment 3, $\varphi_{32}=\theta_{32}+\theta_{31}$, $\varphi_{33}=\theta_{33}+\theta_{31}$, and $\varphi_{34}=\theta_{34}+\theta_{31}$; and in the segment 4, $\varphi_{42}=\theta_{42}+\theta_{41}$, $\varphi_{43}=\theta_{43}+\theta_{41}$, and $\varphi_{44}=\theta_{44}+\theta_{41}$.

In a possible implementation of this application, the adjusting a constellation phase of a symbol in each segment according to a preset phase adjustment rule includes:

determining an in-segment reference symbol in each of the N segments, where the in-segment reference symbol meets $R_i=M_i$;

for a symbol meeting $1\leq i\leq N$ and $1\leq j<M_i$ in the N segments, adjusting a constellation phase of the symbol according to $\varphi_{ij}=\theta_{ij}+\theta_{iR_i}$, where N represents a quantity of segments, i represents a sequence number of a segment, $M_i$ represents a quantity of symbols in an $i^{th}$ segment, $M_1+M_2+\ldots M_N=M$, M represents a total quantity of symbols in the N segments, $R_i$ represents a sequence number of an in-segment reference symbol in the $i^{th}$ segment, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i\geq 2$; and for a symbol meeting $1\leq i\leq N$ and $j=R_i$ in the N segments, adjusting a constellation phase of the symbol according to $\varphi_{ij}=\theta_{ij}$.

Figure 4C:
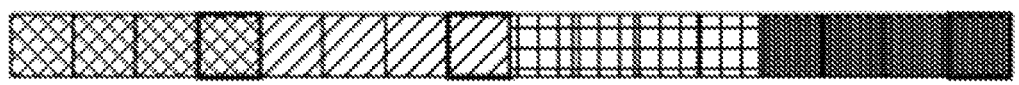
FIG. 4c is still another schematic diagram of grouping symbols according to an embodiment of the present application.

For example, referring to a grouping manner in FIG. 4c, N=4, and each segment includes four symbols. Symbols included in a segment 1 are $S_{11}$, $S_{12}$, $S_{13}$, and $S_{14}$, and constellation phases of the foregoing symbols are $\theta_{11}$, $\theta_{12}$, $\theta_{13}$, and $\theta_{14}$ respectively; symbols included in a segment 2 are $S_{21}$, $S_{22}$, $S_{23}$, and $S_{24}$, and constellation phases of the foregoing symbols are $\theta_{21}$, $\theta_{22}$, $\theta_{23}$, and $\theta_{24}$ respectively; symbols included in a segment 3 are $S_{31}$, $S_{32}$, $S_{33}$, and $S_{34}$ and constellation phases of the foregoing symbols are $\theta_{31}$, $\theta_{32}$, $\theta_{33}$, and $\theta_{34}$ respectively; and symbols included in a segment 4 are $S_{41}$, $S_{42}$, $S_{43}$, and $S_{44}$, and phases of the foregoing four symbols are $\theta_{41}$, $\theta_{42}$, $\theta_{43}$, and $\theta_{44}$ respectively. A symbol having a bold box in FIG. 4c is an in-segment reference symbol, and the in-segment reference symbol is the last symbol in a segment. The sending device determines that an in-segment reference symbol in the segment 1 is $S_{14}$, an in-segment reference symbol in the segment 2 is $S_{24}$, an in-segment reference symbol in the segment 3 is $S_{34}$, and an in-segment reference symbol in the segment 4 is $S_{44}$. A method for adjusting, by the sending device, constellation phases of the 16 symbols in the four segments according to the preset phase adjustment rule is: keeping constellation phases of the in-segment reference symbols in the four segments unchanged, that is, keeping $\varphi_{14}=\theta_{14}$, $\varphi_{24}=\theta_{24}$, $\varphi_{34}=\theta_{34}$, and $\varphi_{44}=\theta_{44}$; and adjusting, by the sending device, constellation phases of symbols other than the in-segment reference symbols in the segments as follows: In the segment 1, $\varphi_{11}=\theta_{11}+\theta_{14}$, $\varphi_{12}=\theta_{12}+\theta_{14}$, and $\varphi_{13}=\theta_{13}+\theta_{14}$; in the segment 2, $\varphi_{21}=\theta_{21}+\theta_{24}$, $\varphi_{22}=\theta_{22}+\theta_{24}$, and $\varphi_{23}=\theta_{23}+\theta_{24}$; in the segment 3, $\varphi_{31}=\theta_{31}+\theta_{34}$, $\varphi_{32}=\theta_{32}+\theta_{34}$, and $\varphi_{33}=\theta_{33}+\theta_{34}$; and in the segment 4, $\varphi_{41}=\theta_{41}+\theta_{44}$, $\varphi_{42}=\theta_{42}+\theta_{44}$, and $\theta_{43}=\theta_{43}+\theta_{44}$.

In a possible implementation of this application, the adjusting a constellation phase of a symbol in each segment according to a preset phase adjustment rule includes:

determining an in-segment reference symbol in each of the N segments, where the in-segment reference symbol meets $2\leq R_i\leq M_i-1$;

for an in-segment reference symbol meeting $1\leq i\leq N$ in the N segments, adjusting a constellation phase of the in-segment reference symbol according to $\varphi_{iR_i}=\theta_{iR_i}+\theta_{(i-1)(R_{i-1})}+\ldots \theta_{2R_2}+\theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1\leq i\leq N$ and $R_i<j\leq M_i$ in the N segments, adjusting a constellation phase of the symbol according to $\varphi_{ij}=\theta_{ij}+\theta_{i(j-1)}+\ldots \theta_{i(R_i-1)}+\varphi_{iR_i}$, where $M_i$ represents a quantity of symbols in the $i^{th}$ segment, $M_1+M_2+\ldots M_N=M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i\geq 2$;

for a symbol meeting $1\leq i\leq N$ and $1\leq j<R_i$ in the N segments, adjusting a constellation phase of the symbol according to a formula $\varphi_{ij}=\theta_{ij}+\theta_{i(j+1)}+\ldots +\varphi_{iR_i}$; and for a symbol meeting $1\leq i\leq N$ and $j=R_i$ in the N segments, adjusting a phase of the symbol according to $\varphi_{ij}=\theta_{ij}$.

Specifically, the in-segment reference symbol may be an intermediate symbol in a segment, and the in-segment reference symbol meets $2\leq R_i\leq M_i-1$. In other words, the in-segment reference symbol is neither the first symbol nor the last symbol in the segment. Positions of in-segment reference symbols in the segments may be the same or different. After the constellation mapping is performed on the M bit groups included in the coded sequence, constellation phases of symbols in each of the N segments are represented as follows: Constellation phases of symbols in the first segment are $\theta_{11},\theta_{12},\theta_{13},\ldots,\theta_{1R_1},\ldots,\theta_{1(M_1-1)},\theta_{1M_1}$, constellation phases of symbols in the second segment are $\theta_{21},\theta_{22},\theta_{23},\ldots,\theta_{2R_2},\ldots,\theta_{2(M_2-1)},\theta_{2M_2}$, constellation phases of symbols in the third segment are $\theta_{31},\theta_{32},\theta_{33},\ldots,\theta_{3R_3},\ldots,\theta_{3(M_3-1)},\theta_{3M_3}$, and by analogy, constellation phases of symbols in the $N^{th}$ segment are $\theta_{N1},\theta_{N2},\theta_{N3},\ldots,\theta_{NR_N},\ldots,\theta_{N(M_N-1)},\theta_{NM_N}$, where $\theta_{ij}$ is a constellation phase of any symbol in the N segments, N represents a quantity of segments, i represents a sequence number of a segment, $M_i$ represents a quantity of symbols in an $i^{th}$ segment, $M_1+M_2+\ldots M_N=M$, M represents a total quantity of symbols in the N segments, $R_i$ represents a sequence number of an in-segment reference symbol in the $i^{th}$ segment, j represents a sequence number of a symbol, and $\varphi_{ij}$ is obtained through phase adjustment on $\theta_{ij}$. When $1\leq i\leq N$ and $j=R_i$, that is, a to-be-adjusted symbol is an in-segment reference symbol, $\varphi_{iR_i}=\theta_{iR_i}+\theta_{(i-)(R_{i-1})}+\ldots \theta_{2R_2}+\theta_{1R_1}$. An in-segment reference symbol is used as a boundary to divide symbols in a segment into two types: symbols before the in-segment reference symbol and symbols after the in-segment reference symbol. The symbols after the in-segment reference symbol meet $1\leq i\leq N$ and $R_i<j\leq M_i$, and constellation phases of the symbols are adjusted according to a formula $\varphi_{ij}=\theta_{ij}+\theta_{i(j-1)}+\ldots \theta_{i(R_i-1)}+\varphi_{iR_i}$; and the symbols before the in-segment reference symbol meet $1\leq i\leq N$ and $1\leq j<R_i$, constellation phases of the symbols are adjusted according to a formula $\varphi_{ij}=\theta_{ij}+\theta_{i(j+1)}+\ldots +\varphi_{iR_i}$.

Figure 5A:
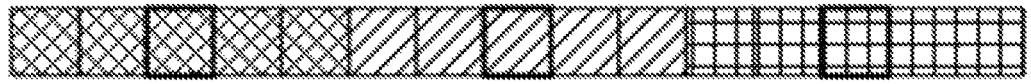
FIG. 5a is a schematic diagram of grouping symbols according to an embodiment of the present application.

For example, referring to a grouping manner in FIG. 5a, N=3. Symbols included in a segment 1 are $S_{11}$, $S_{12}$, $S_{13}$, $S_{14}$, and $S_{15}$, and constellation phases of the foregoing symbols are $\theta_{11}$, $\theta_{12}$, $\theta_{13}$, $\theta_{14}$, and $\theta_{15}$ respectively; symbols included in a segment 2 are $S_{21}$, $S_{22}$, $S_{23}$, $S_{24}$, and $S_{25}$, and constellation phases of the foregoing symbols are $\theta_{21}$, $\theta_{22}$, $\theta_{23}$, $\theta_{24}$, and $\theta_{25}$ respectively; and symbols included in a segment 3 are $S_{31}$, $S_{32}$, $S_{33}$, $S_{34}$, and $S_{35}$, and constellation phases of the foregoing symbols are $\theta_{31}$, $\theta_{32}$, $\theta_{33}$, $\theta_{34}$, and $\theta_{35}$ respectively. A symbol having a bold box in FIG. 5a is an in-segment reference symbol, and the in-segment reference symbol is an intermediate symbol. The sending device determines that an in-segment reference symbol in the segment 1 is $S_{13}$, an in-segment reference symbol in the segment 2 is $S_{23}$, and an in-segment reference symbol in the segment 3 is $S_{33}$. A method for adjusting, by the sending device, constellation phases of the 15 symbols in the three segments according to the preset phase adjustment rule is: first adjusting, by the sending device, constellation phases of the in-segment reference symbols in the three segments according to $\varphi_{13}=\theta_{13}$, $\varphi_{23}=\theta_{23}+\theta_{13}$, and $\varphi_{33}=\theta_{33}+\theta_{23}+\theta_{13}$; and then adjusting, by the sending device, constellation phases of symbols other than the in-segment reference symbols in the segments as follows: In the segment 1, $\varphi_{11}=\theta_{11}+\theta_{12}+\varphi_{13}$, $\varphi_{12}=\theta_{12}+\varphi_{13}$, $\varphi_{14}=\theta_{14}+\varphi_{13}$, and $\varphi_{15}=\theta_{15}+\theta_{14}+\varphi_{13}$; in the segment 2, $\varphi_{21}=\theta_{21}+\theta_{22}+\varphi_{23}$, $\varphi_{22}=\theta_{22}+\varphi_{23}$, $\varphi_{24}=\theta_{24}+\varphi_{23}$, and $\varphi_{24}=\theta_{25}+\theta_{24}+\varphi_{23}$; and in the segment 3, $\varphi_{31}=\theta_{31}+\theta_{32}+\varphi_{33}$, $\varphi_{32}=\theta_{32}+\varphi_{33}$, $\varphi_{34}+\theta_{34}+\varphi_{33}$, and $\varphi_{35}=\theta_{35}+\theta_{34}+\varphi_{33}$.

In a possible implementation of this application, the adjusting a constellation phase of a symbol in each segment according to a preset phase adjustment rule includes:

determining an in-segment reference symbol in each of the N segments, where the in-segment reference symbol meets $R_i=1$;

for an in-segment reference symbol meeting $1 \leq i \leq N$ in the N segments, adjusting a constellation phase of the in-segment reference symbol according to $\varphi_{iR_i}=\theta_{iR_i}+\theta_{(i-1)(R_{i-1})}+ \ldots \theta_{2R_2}+\theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $1 < j \leq M_i$ in the N segments, adjusting a constellation phase of the symbol according to $\varphi_{ij}=\theta_{ij}+\theta_{i(j-1)}+ \ldots \theta_{i(R_i-1)}+\varphi_{iR_i}$, where $M_i$ represents a quantity of symbols in the $i^{th}$ segment, $M_1+M_2+ \ldots M_N=M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$; and for a symbol meeting $1 \leq i \leq N$ and $j=R_i$ in the N segments, adjusting a phase of the symbol according to $\varphi_{ij}=\theta_{ij}$.

Figure 5B:
FIG. 5b is another schematic diagram of grouping symbols according to an embodiment of the present application.

For example, referring to a grouping manner in FIG. 5b, N=3. Symbols included in a segment 1 are $S_{11}$, $S_{12}$, $S_{13}$, $S_{14}$, and $S_{15}$, and constellation phases of the foregoing symbols are $\theta_{11}$, $\theta_{12}$, $\theta_{13}$, $\theta_{14}$, and $\theta_{15}$ respectively; symbols included in a segment 2 are $S_{21}$, $S_{22}$, $S_{23}$, $S_{24}$, and $S_{25}$, and constellation phases of the foregoing symbols are $\theta_{21}$, $\theta_{22}$, $\theta_{23}$, $\theta_{24}$, and $\theta_{25}$ respectively; and symbols included in a segment 3 are $S_{31}$, $S_{32}$, $S_{33}$, $S_{34}$, and $S_{35}$, and constellation phases of the foregoing symbols are $\theta_{31}$, $\theta_{32}$, $\theta_{33}$, $\theta_{34}$, and $\theta_{35}$ respectively. A symbol having a bold box in FIG. 5b is an in-segment reference symbol, and the in-segment reference symbol is the first symbol. The sending device determines that an in-segment reference symbol in the segment 1 is $S_{11}$, an in-segment reference symbol in the segment 2 is $S_{21}$, and an in-segment reference symbol in the segment 3 is $S_{31}$. A method for adjusting, by the sending device, constellation phases of the 15 symbols in the three segments according to the preset phase adjustment rule is: first adjusting, by the sending device, constellation phases of the in-segment reference symbols in the three segments according to $\varphi_{11}=\theta_{11}$, $\varphi_{21}=\theta_{21}+\theta_{11}$, and $\varphi_{31}=\theta_{31}+\theta_{21}+\theta_{11}$; and then adjusting, by the sending device, constellation phases of symbols other than the in-segment reference symbols in the segments as follows: In the segment 1, $\varphi_{12}=\theta_{12}+\varphi_{11}$, $\varphi_{13}=\theta_{13}+\theta_{12}+\varphi_{11}$, $\varphi_{14}=\theta_{14}+\theta_{13}+\theta_{12}+\varphi_{11}$, and $\varphi_{15}=\theta_{15}+\theta_{14}+\theta_{13}+\theta_{12}+\varphi_{11}$; in the segment 2, $\varphi_{22}=\theta_{22}+\varphi_{21}$, $\varphi_{23}=\theta_{23}+\theta_{22}+\varphi_{21}$, $\varphi_{24}=\theta_{24}+\theta_{23}+\theta_{22}+\varphi_{21}$, and $\varphi_{25}=\theta_{25}+\theta_{24}+\theta_{23}+\theta_{22}+\varphi_{21}$; and in the segment 3, $\varphi_{32}=\theta_{32}+\varphi_{31}$, $\varphi_{33}=\theta_{33}+\theta_{32}+\varphi_{31}$, $\varphi_{34}=\theta_{34}+\theta_{33}+\theta_{32}+\varphi_{31}$, and $\varphi_{33}=\theta_{35}+\theta_{34}+\theta_{33}+\theta_{32}+\varphi_{31}$.

In a possible implementation of this application, the adjusting a constellation phase of a symbol in each segment according to a preset phase adjustment rule includes: determining an in-segment reference symbol in each of the N segments, where the in-segment reference symbol meets $R_i=M_i$;

for an in-segment reference symbol meeting $1 \leq i \leq N$ in the N segments, adjusting a constellation phase of the in-segment reference symbol according to $\varphi_{iR_i}=\theta_{iR_i}+\theta_{(i-1)(R_{i-1})}+ \ldots \theta_{2R_2}+\theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $1 \leq j < M_i$ in the N segments, adjusting a constellation phase of the symbol according to a formula $\varphi_{ij}=\theta_{ij}+\theta_{i(j+1)}+ \ldots +\varphi_{iR_i}$, where $M_i$ represents a quantity of symbols in the $i^{th}$ segment, $M_1+M_2+ \ldots M_N=M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$; and for a symbol meeting $1 \leq i \leq N$ and $j=R_i$ in the N segments, adjusting a phase of the symbol according to $\varphi_{ij}=\theta_{ij}$.

Figure 5C:
FIG. 5c is still another schematic diagram of grouping symbols according to an embodiment of the present application.

For example, referring to a grouping manner in FIG. 5c, N=3. Symbols included in a segment 1 are $S_{11}$, $S_{12}$, $S_{13}$, $S_{14}$, and $S_{15}$, and constellation phases of the foregoing symbols are $\theta_{11}$, $\theta_{12}$, $\theta_{13}$, $\theta_{14}$, and $\theta_{15}$ respectively; symbols included in a segment 2 are $S_{21}$, $S_{22}$, $S_{23}$, $S_{24}$, and $S_{25}$, and constellation phases of the foregoing symbols are $\theta_{21}$, $\theta_{22}$, $\theta_{23}$, $\theta_{24}$, and $\theta_{25}$ respectively; and symbols included in a segment 3 are $S_{31}$, $S_{32}$, $S_{33}$, $S_{34}$, and $S_{35}$, and constellation phases of the foregoing symbols are $\theta_{31}$, $\theta_{32}$, $\theta_{33}$, $\theta_{34}$, and $\theta_{35}$ respectively. A symbol having a bold box in FIG. 5c is an in-segment reference symbol, and the in-segment reference symbol is the last symbol. The sending device determines that an in-segment reference symbol in the segment 1 is $S_{15}$ an in-segment reference symbol in the segment 2 is $S_{25}$, and an in-segment reference symbol in the segment 3 is $S_{35}$. A method for adjusting, by the sending device, constellation phases of the 15 symbols in the three segments according to the preset phase adjustment rule is: first adjusting, by the sending device, constellation phases of the in-segment reference symbols in the three segments according to $\varphi_{15}=\theta_{15}$, $\varphi_{25}=\theta_{25}+\theta_{15}$, and $\varphi_{35}=\theta_{35}+\theta_{25}+\theta_{15}$; and then adjusting, by the sending device, constellation phases of symbols other than the in-segment reference symbols in the segments as follows: In the segment 1, $\varphi_{14}=\theta_{14}+\varphi_{15}$, $\varphi_{13}=\theta_{13}+\theta_{14}+\varphi_{15}$, $\varphi_{12}=\theta_{12}+\theta_{13}+\theta_{14}+\varphi_{15}$, and $\varphi_{11}=\theta_{11}+\theta_{12}+\theta_{13}+\theta_{14}+\varphi_{15}$; in the segment 2; $\varphi_{24}=\theta_{24}+\varphi_{25}$, $\varphi_{23}=\theta_{23}+\theta_{24}+\varphi_{25}$, $\varphi_{22}=\theta_{22}+\theta_{23}+\theta_{24}+\varphi_{25}$, and $\varphi_{21}=\theta_{21}+\theta_{22}+\theta_{23}+\theta_{24}+\varphi_{25}$; and in the segment 3, $\varphi_{34}=\theta_{34}+\varphi_{35}$, $\varphi_{33}=\theta_{33}+\theta_{34}+\varphi_{35}$, $\varphi_{32}=\theta_{32}+\theta_{33}+\theta_{34}+\varphi_{35}$, and $\varphi_{31}=\theta_{31}+\theta_{32}+\theta_{33}+\theta_{34}+\varphi_{33}$.

In a possible implementation of this application, the adjusting a constellation phase of a symbol in each segment according to a preset phase adjustment rule includes:

determining an in-segment reference symbol in each symbol in the N segments, where the in-segment reference symbol meets $2 \leq R_i \leq M_i - 1$;

for an in-segment reference symbol meeting $1 \leq i \leq N$ in the N segments, adjusting a constellation phase of the in-segment reference symbol according to $\varphi_{iR_i} = \theta_{iR_i} + \theta_{(i-1)(R_{i-1})} + \ldots + \theta_{2R_2} + \theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$, $1 \leq j \leq R_i$, and $j \neq R_i$ in the N segments, adjusting a constellation phase of the symbol according to $\varphi_{ij} = \theta_{ij} + \varphi_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 3$; and for a symbol meeting $1 \leq i \leq N$ and $j = R_i$ in the N segments, adjusting a phase of the symbol according to $\varphi_{ij} = \theta_{ij}$.

Specifically, the in-segment reference symbol may be an intermediate symbol in a segment, and the in-segment reference symbol meets $2 \leq R_i \leq M_i - 1$. In other words, the in-segment reference symbol is neither the first symbol nor the last symbol in the segment. Positions of in-segment reference symbols in the N segments may be the same or different, and this is not limited in this application; and quantities of symbols included in all the segments may also be the same or different, and this is not limited in this application. After the constellation mapping, constellation phases of symbols in each of the N segments may be represented as follows: Constellation phases of symbols in the first segment are $\theta_{11}, \theta_{12}, \theta_{13}, \ldots, \theta_{1R_1}, \ldots, \theta_{1(M_1-1)}, \theta_{1M_1}$, constellation phases of symbols in the second segment are $\theta_{21}, \theta_{22}, \theta_{23}, \ldots, \theta_{2R_2}, \ldots, \theta_{2(M_2-1)}, \theta_{2M_2}$, constellation phases of symbols in the third segment are $\theta_{31}, \theta_{32}, \theta_{33}, \ldots, \theta_{3R_3}, \ldots, \theta_{3(M_3-1)}, \theta_{3M_3}$, and by analogy, constellation phases of symbols in the $N^{th}$ segment are $\theta_{N1}, \theta_{N2}, \theta_{N3}, \ldots, \theta_{NR_N}, \ldots, \theta_{N(M_N-1)}, \theta_{NM_N}$, where $\theta_{ij}$ is a constellation phase of any symbol in the N segments, N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, and $\varphi_{ij}$ is obtained through phase adjustment on $\theta_{ij}$. When $1 \leq i \leq N$ and $j = R_i$, that is, a to-be-adjusted symbol is an in-segment reference symbol, $\varphi_{iR_i} = \theta_{iR_i} + \theta_{(i-1)(R_{i-1})} + \ldots + \theta_{2R_2} + \theta_{1R_1}$. For a symbol meeting $1 \leq i \leq N$, $1 \leq j \leq R_i$, and $j \neq R_i$ in the N segments, a constellation phase of the symbol is adjusted according to a formula $\varphi_{ij} = \theta_{ij} + \varphi_{iR_i}$.

Figure 6A:
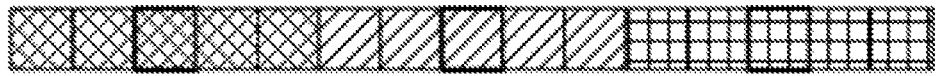
FIG. 6a is a schematic diagram of grouping symbols according to an embodiment of the present application.

For example, referring to a grouping manner in FIG. 6a, N=3. Symbols included in a segment 1 are $S_{11}, S_{12}, S_{13}, S_{14}$, and $S_{15}$, and constellation phases of the foregoing symbols are $\theta_{11}, \theta_{12}, \theta_{13}, \theta_{14}$, and $\theta_{15}$ respectively; symbols included in a segment 2 are $S_{21}, S_{22}, S_{23}, S_{24}$, and $S_{25}$, and constellation phases of the foregoing symbols are $\theta_{21}, \theta_{22}, \theta_{23}, \theta_{24}$, and $\theta_{25}$ respectively; and symbols included in a segment 3 are $S_{31}, S_{32}, S_{33}, S_{34}$, and $S_{35}$, and constellation phases of the foregoing symbols are $\theta_{31}, \theta_{32}, \theta_{33}, \theta_{34}$, and $\theta_{35}$ respectively. A symbol having a bold box in FIG. 6a is an in-segment reference symbol. The sending device determines that an in-segment reference symbol in the segment 1 is $S_{13}$, an in-segment reference symbol in the segment 2 is $S_{23}$, and an in-segment reference symbol in the segment 3 is $S_{33}$. A method for adjusting, by the sending device, constellation phases of the 15 symbols in the three segments according to the preset phase adjustment rule is: first adjusting, by the sending device, constellation phases of the in-segment reference symbols in the three segments according to $\varphi_{13} = \theta_{13}$, $\varphi_{23} = \theta_{23} + \theta_{13}$, and $\varphi_{33} = \theta_{33} + \theta_{23} + \theta_{13}$; and then adjusting, by the sending device, constellation phases of symbols other than the in-segment reference symbols in the segments as follows: In the segment 1, $\varphi_{11} = \theta_{11} + \varphi_{13}$, $\varphi_{12} = \theta_{12} + \varphi_{13}$, $\varphi_{14} = \theta_{14} + \varphi_{13}$, and $\varphi_{15} = \theta_{15} + \varphi_{13}$; in the segment 2, $\varphi_{21} = \theta_{21} + \varphi_{23}$, $\varphi_{22} = \theta_{22} + \varphi_{23}$, $\varphi_{24} = \theta_{24} + \varphi_{23}$, and $\varphi_{25} = \theta_{25} + \varphi_{23}$; and in the segment 3, $\varphi_{31} = \theta_{31} + \varphi_{33}$, $\varphi_{32} = \theta_{32} + \varphi_{33}$, $\varphi_{34} = \theta_{34} + \varphi_{33}$, and $\varphi_{35} = \theta_{35} + \varphi_{33}$.

In a possible implementation of this application, the adjusting a constellation phase of a symbol in each segment according to a preset phase adjustment rule includes:

determining an in-segment reference symbol in each symbol in the N segments, where the in-segment reference symbol meets $R_i = 1$;

for an in-segment reference symbol meeting $1 \leq i \leq N$ in the N segments, adjusting a constellation phase of the in-segment reference symbol according to $\varphi_{iR_i} = \theta_{iR_i} + \theta_{(i-1)(R_{i-1})} + \ldots + \theta_{2R_2} + \theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $1 < j \leq M_i$ in the N segments, adjusting a constellation phase of the symbol according to $\varphi_{ij} = \theta_{ij} + \varphi_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$; and for a symbol meeting $1 \leq i \leq N$ and $j = 1$ in the N segments, adjusting a phase of the symbol according to $\varphi_{ij} = \theta_{ij}$.

Figure 6B:
FIG. 6b is another schematic diagram of grouping symbols according to an embodiment of the present application.

For example, referring to a grouping manner in FIG. 6b, N=3. Symbols included in a segment 1 are $S_{11}, S_{12}, S_{13}, S_{14}$, and $S_{15}$, and constellation phases of the foregoing symbols are $\theta_{11}, \theta_{12}, \theta_{13}, \theta_{14}$, and $\theta_{15}$ respectively; symbols included in a segment 2 are $S_{21}, S_{22}, S_{23}, S_{24}$, and $S_{25}$, and constellation phases of the foregoing symbols are $\theta_{21}, \theta_{22}, \theta_{23}, \theta_{24}$, and $\theta_{25}$ respectively; and symbols included in a segment 3 are $S_{31}, S_{32}, S_{33}, S_{34}$, and $S_{35}$, and constellation phases of the foregoing symbols are $\theta_{31}, \theta_{32}, \theta_{33}, \theta_{34}$, and $\theta_{35}$ respectively. A symbol having a bold box in FIG. 6b is an in-segment reference symbol, and the in-segment reference symbol is the first symbol in a segment. The sending device determines that an in-segment reference symbol in the segment 1 is $S_{11}$, an in-segment reference symbol in the segment 2 is $S_{21}$, and an in-segment reference symbol in the segment 3 is $S_{31}$. A method for adjusting, by the sending device, constellation phases of the 15 symbols in the three segments according to the preset phase adjustment rule is: first adjusting, by the sending device, constellation phases of the in-segment reference symbols in the three segments according to $\varphi_{11} = \theta_{11}$, $\varphi_{21} = \theta_{21} + \theta_{11}$, and $\varphi_{31} = \theta_{31} + \theta_{21} + \theta_{11}$; and then adjusting, by the sending device, constellation phases of symbols other than the in-segment reference symbols in the segments as follows: In the segment 1, $\varphi_{12} = \theta_{12} + \varphi_{11}$, $\varphi_{13} = \theta_{13} + \varphi_{11}$, $\varphi_{14} = \theta_{14} + \varphi_{11}$, and $\varphi_{15} = \theta_{15} + \varphi_{11}$;

in the segment 2, $\varphi_{22}=\theta_{22}+\varphi_{21}$, $\varphi_{23}=\theta_{23}+\varphi_{21}$, $\varphi_{24}=\theta_{24}+\varphi_{21}$, and $\varphi_{25}=\theta_{25}+\varphi_{21}$; and in the segment 3, $\varphi_{32}=\theta_{32}+\varphi_{31}$, $\varphi_{33}=\theta_{33}+\varphi_{31}$, $\varphi_{34}=\theta_{34}+\varphi_{31}$, and $\varphi_{35}=\theta_{35}+\varphi_{31}$.

In a possible implementation of this application, the adjusting a constellation phase of a symbol in each segment according to a preset phase adjustment rule includes: determining an in-segment reference symbol in each symbol in the N segments, where the in-segment reference symbol meets $R_i=M_i$;

for an in-segment reference symbol meeting $1 \leq i \leq N$ in the N segments, adjusting a constellation phase of the in-segment reference symbol according to $\varphi_{iR_i}=\theta_{iR_i}+\theta_{(i-1)(R_{i-1})}+\ldots\theta_{2R_2}+\theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $1 \leq j < M_i$ in the N segments, adjusting a constellation phase of the symbol according to $\varphi_{ij}=\theta_{ij}+\varphi_{iR_i}$, where $M_i$ represents a quantity of symbols in the $i^{th}$ segment, $M_1+M_2+\ldots M_N=M$, M represents a total quantity of symbols in the N segments, j represents a sequence number of a symbol, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$; and for a symbol meeting $1 \leq i \leq N$ and $j=M_i$ in the N segments, adjusting a phase of the symbol according to $\varphi_{ij}=\theta_{ij}$.

Figure 6C:
FIG. 6c is still another schematic diagram of grouping symbols according to an embodiment of the present application.

For example, referring to a grouping manner in FIG. 6c, N=3. Symbols included in a segment 1 are $S_{11}$, $S_{12}$, $S_{13}$, $S_{14}$, and $S_{15}$, and constellation phases of the foregoing symbols are $\theta_{11}$, $\theta_{12}$, $\theta_{13}$, $\theta_{14}$, and $\theta_{15}$ respectively; symbols included in a segment 2 are $S_{21}$, $S_{22}$, $S_{23}$, $S_{24}$, and $S_{25}$, and constellation phases of the foregoing symbols are $\theta_{21}$, $\theta_{22}$, $\theta_{23}$, $\theta_{24}$, and $\theta_{25}$ respectively; and symbols included in a segment 3 are $S_{31}$, $S_{32}$, $S_{33}$, $S_{34}$, and $S_{35}$, and constellation phases of the foregoing symbols are $\theta_{31}$, $\theta_{32}$, $\theta_{33}$, $\theta_{34}$, and $\theta_{35}$ respectively. A symbol having a bold box in FIG. 6c is an in-segment reference symbol, and the in-segment reference symbol is the last symbol in the segment. The sending device determines that an in-segment reference symbol in the segment 1 is $S_{15}$, an in-segment reference symbol in the segment 2 is $S_{25}$, and an in-segment reference symbol in the segment 3 is $S_{35}$. A method for adjusting, by the sending device, constellation phases of the 15 symbols in the three segments according to the preset phase adjustment rule is: first adjusting, by the sending device, constellation phases of the in-segment reference symbols in the three segments according to $\varphi_{15}=\theta_{15}$, $\varphi_{25}=\theta_{25}+\theta_{15}$, and $\varphi_{35}=\theta_{25}+\theta_{25}+\theta_{15}$; and then adjusting, by the sending device, constellation phases of symbols other than the in-segment reference symbols in the segments as follows: In the segment 1, $\varphi_{11}=\theta_{11}+\theta_{15}$, $\varphi_{12}=\theta_{12}+\varphi_{15}$, $\varphi_{13}=\theta_{13}+\varphi_{15}$, and $\varphi_{14}=\theta_{14}+\varphi_{15}$; in the segment 2, $\varphi_{21}=\theta_{21}+\varphi_{25}$, $\varphi_{22}=\theta_{22}+\varphi_{25}$, $\varphi_{23}=\theta_{23}+\varphi_{25}$, and $\varphi_{24}=\theta_{24}+\varphi_{25}$; and in the segment 3, $\varphi_{31}=\theta_{31}+\varphi_{35}$, $\varphi_{32}=\theta_{32}+\varphi_{35}$, $\varphi_{33}=\theta_{33}+\varphi_{35}$, and $\varphi_{34}=\theta_{34}+\varphi_{35}$.

It should be noted that the in-segment reference symbols are not limited to the case, in the foregoing embodiment, in which all the in-segment reference symbols are intermediate symbols, the last symbols, or the first symbols in the segments, and may alternatively be distributed in the segments in a mixed form. In other words, for the N segments, the in-segment reference symbols may be one or a combination of the intermediate symbol, the last symbol, and the first symbol.

S206. Modulate M symbols obtained through phase adjustment, to obtain a modulated signal.

Specifically, the sending device may control an amplitude, a phase or the amplitude and the phase of a high-frequency carrier by using an IQ (in-phase quadrature) modulation method to obtain the modulated signal, perform non-linear amplification on the modulated signal, and transmit an amplified signal by using an antenna.

Optionally, an in-segment reference symbol in each of the N segments is the first symbol.

Optionally, the in-segment reference symbol is a pilot symbol. In this case, occupation of a symbol, used to transmit data, in a segment is avoided, and impact on data transmission is mitigated.

Optionally, the performing, by the sending device, constellation mapping on the coded sequence based on a preset constellation diagram, to obtain M symbols is as follows.

Specifically, the constellation diagram represents a mapping relationship between a bit group and coordinates of a constellation point. The coordinates of the constellation point include an amplitude and a constellation phase. The preset constellation diagram may be an existing QAM constellation diagram or APSK constellation diagram, or a constellation diagram obtained through optimization on the existing QAM constellation diagram or APSK constellation diagram. Constellation points in the existing QAM constellation diagram may be arranged in a rectangle shape, and distances between adjacent constellation points are the same.

The existing APSK constellation diagram includes a plurality of concentric circles. Constellation points with an equal spacing are on each circle. If a quantity of the concentric circles is K, a signal set of the APSK constellation diagram is:

$X=rk*\exp(2\pi*ik/nk+\theta k)$, where k=1, 2, ..., K, rk is a radius of a $k^{th}$ circumference, nk is a quantity of constellation points on the $k^{th}$ circumference, ik is a sequence number of a constellation point on the $k^{th}$ circumference, ik=0, 1, 2, ..., nk−1, and θk is a phase of a constellation point on the $k^{th}$ circumference. To sufficiently utilize signal space in the constellation diagram, nk<nk+1 should be met. In other words, a quantity of constellation points on an outer circumference is greater than a quantity of constellation points on an inner circumference.

Figure 7:
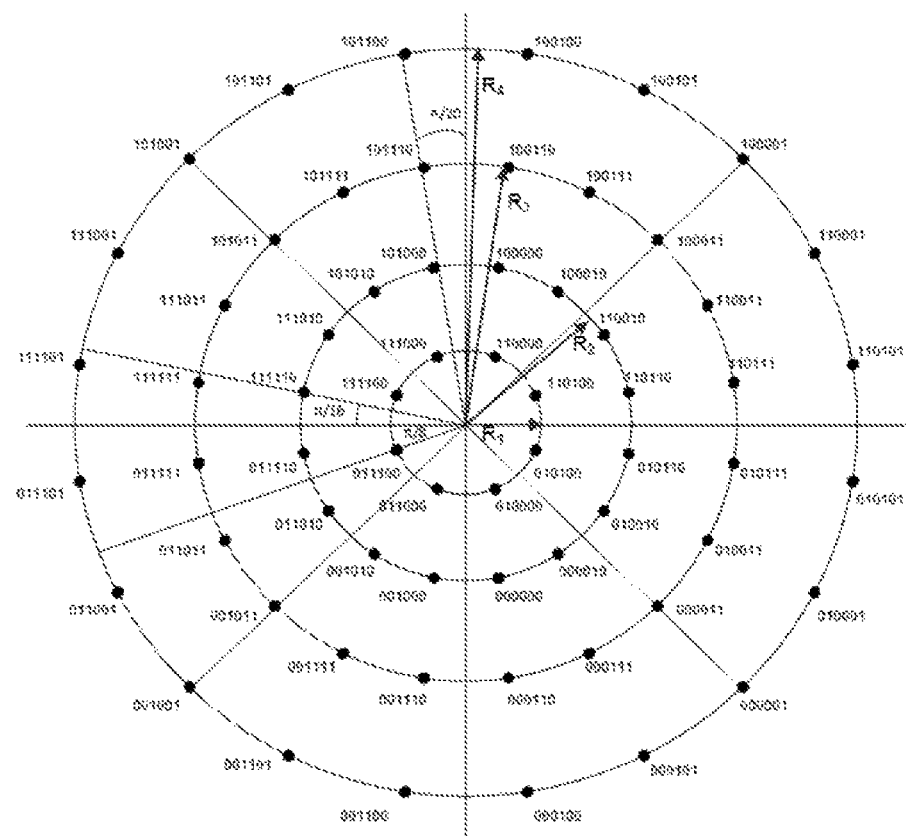
FIG. 7 is a schematic diagram of a constellation diagram according to an embodiment of the present application.

For example, referring to a distribution case of constellation points in a 64APSK constellation diagram in FIG. 7, a quantity of circles in the 64APSK constellation diagram is four. A radius ratio of the circles from inner to outer is 1:2:3:4. Quantities of constellation points on the circles from inner to outer are 8, 16, 20, and 20 respectively. 64 6-bit groups are mapped onto the 64 constellation points of the 64APSK constellation diagram in the quasi-Gray code mapping manner.

In the method described in FIG. 2, when a phase noise suppression capability of a signal of the sending device needs to be improved, the sending device divides the symbols obtained through the constellation mapping into the segments. Phases of the symbols are concurrently adjusted for the segments, thereby improving modulation efficiency of the sending device and reducing a processing time.

Figure 8:
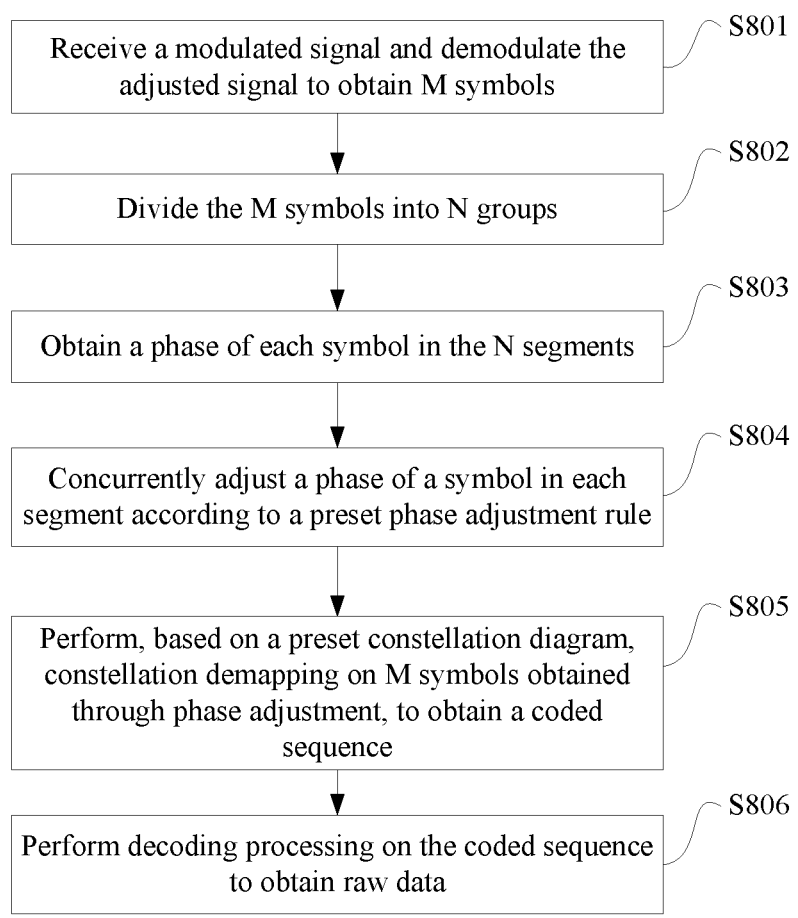
FIG. 8 is a schematic flowchart of a demodulation method according to an embodiment of the present application.

FIG. 8 is a schematic flowchart of a demodulation method according to an embodiment of the present application. The method includes but is not limited to the following steps.

S801. A receiving device demodulates a modulated signal sent by a sending device to obtain M symbols.

Specifically, the receiving device performs channel equalization, down-conversion, and demodulation processing on the adjusted signal sent by the sending device to obtain M symbols, and the receiving device obtains phases of the M symbols through parsing. Phase noise is introduced when the adjusted signal is transmitted on a channel. Therefore, the phase noise may be superposed on the phases of the M symbols obtained through parsing.

S802. The receiving device divides the M symbols into N groups.

Specifically, the receiving device may divide the M symbols into the N groups according to an indication of the sending device, or the receiving device may divide the M symbols into the N groups according to a division rule on which the receiving device and the sending device pre-agree. Quantities of symbols included in each of the N groups may be the same or different. No limitation is imposed in this application.

S803. The receiving device concurrently performs phase differentiation on a phase of a symbol in each segment according to a preset phase inverse-adjustment rule.

Specifically, the receiving device performs phase differentiation processing on each symbol in the N groups according to a preset phase differentiation rule, to mitigate impact from phase noise. When performing the phase differentiation processing on the N groups, the receiving device may concurrently perform phase differentiation on the groups. In other words, the receiving device may concurrently perform differentiation processing on the N groups.

In a possible implementation of this application, the performing, by the receiving device, phase differentiation on a phase of a symbol in each segment according to a preset phase differentiation adjustment rule includes: determining an in-segment reference symbol in each of the N segments, where the in-segment reference symbol meets $2 \le R_i \le M_i - 1$;

for a symbol meeting $1 \le i \le N$ and $R_i < j \ge M_i$ in the N segments, adjusting a phase of the symbol according to $\theta_{ij} = \varphi_{ij} - \varphi_{i(j-1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \ge 3$;

for a symbol meeting $1 \le i \le N$ and $1 \le j < R_i$ in the N segments, adjusting a phase of the symbol according to $\theta_i = \varphi_{ij} - \varphi_{i(j+1)}$; and for a symbol meeting $1 \le i \le N$ and $j = R_i$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $R_i = M_i$;

for a symbol meeting $1 \le i \le N$ and $1 \le j < M_i$ in the N segments, adjusting a phase of the symbol according to $\theta_{ij} = \varphi_{ij} - \varphi_{i(j+1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \ge 2$; and for a symbol meeting $1 \le i \le N$ and $j = M_i$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $R_i = 1$;

for a symbol meeting $1 \le i \le N$ and $1 < j \le M_i$ in the N segments, adjusting a phase of the symbol according to $\theta_{ij} = \varphi_{ij} - \varphi_{i(j-1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \ge 2$; and for a symbol meeting $1 \le i \le N$ and $j = 1$ in the N segments, adjusting a phase of the symbol according to $\theta_{ij} = \varphi_{ij}$.

Specifically, the receiving device may determine the in-segment reference symbol in each of the N segments according to the indication of the sending device, or may determine the in-segment reference symbol in each of the N segments based on in-segment reference symbol position information on which the receiving device and the sending device pre-agree. The in-segment reference symbol may be a symbol in any position in the segment. For example, the in-segment reference symbol is the first symbol, an intermediate symbol, or the last symbol in the segment. Positions of in-segment reference symbols in all the segments may be the same or different. For one segment, an in-segment reference symbol is used as a boundary to divide symbols in the segment into two types: symbols before the in-segment reference symbol and symbols after the in-segment reference symbol. After the constellation mapping, phases of the symbols in each of the N segments are represented as follows: Phases of symbols in the first segment are $\varphi_{11}, \varphi_{12}, \varphi_{13}, \ldots, \varphi_{1R_1}, \ldots, \varphi_{1(M_1-1)}, \varphi_{1M_1}$, phases of symbols in the second segment are $\varphi_{21}, \varphi_{22}, \varphi_{23}, \ldots, \varphi_{2R_2}, \ldots, \varphi_{2(M_2-1)}$, phases of symbols in the third segment are $\varphi_{31}, \varphi_{32}, \varphi_{33}, \ldots, \varphi_{3R_3}, \ldots, \varphi_{3(M_3-1)}$, and by analogy, phases of symbols in the $N^{th}$ segment are $\varphi_{N1}, \varphi_{N2}, \varphi_{N3}, \ldots, \varphi_{NR_N}, \ldots, \varphi_{N(M_N-1)}, \varphi_{NM_N}$, where $\varphi_{ij}$ is a phase of any symbol in the N segments, N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, and $\theta^{ij}$ is obtained through phase adjustment on $\varphi_{ij}$. When $1 \le i \le N$ and $j = R_i$, that is, a to-be-adjusted symbol is an in-segment reference symbol, $\theta_{iR_i} = \varphi_{iR_i}$; when $1 \le i \le N$ and $R_i < j \le M_i$, $\theta_{ij} = \varphi_{ij} - \varphi_{i(j-1)}$; or when $1 \le i \le N$ and $1 \le j < R_i$, $\theta_{ij} = \varphi_{ij} - \varphi_{i(j+1)}$.

For example, N=4. Symbols included in a segment 1 are $S_{11}, S_{12}, S_{13}, S_{14}$, and $S_{15}$, and phases of the foregoing symbols are $\varphi_{11}, \varphi_{12}, \varphi_{13}, \varphi_{14}$, and $\varphi_{15}$ respectively; symbols included in a segment 2 are $S_{21}, S_{22}, S_{23}$, and $S_{24}$, and phases of the foregoing symbols are $\varphi_{21}, \varphi_{22}, \varphi_{23}$, and $\varphi_{24}$ respectively; symbols included in a segment 3 are $S_{31}, S_{32}, S_{33}$, and $S_{34}$, and phases of the foregoing symbols are $\varphi_{31}, \varphi_{32}, \varphi_{33}$, and $\varphi_{34}$ respectively; and symbols included in a segment 4 are $S_{41}$, $S_{42}$, $S_{43}$, and $S_{44}$, and phases of the foregoing four symbols are $\varphi_{41}$, $\varphi_{42}$, $\varphi_{43}$, and $\varphi_{44}$ respectively. The receiving device determines that an in-segment reference symbol in the segment 1 is $S_{11}$, an in-segment reference symbol in the segment 2 is $S_{22}$, an in-segment reference symbol in the segment 3 is $S_{33}$, and an in-segment reference symbol in the segment 4 is $S_{44}$. A method for adjusting, by the receiving device, phases of the 17 symbols in the four segments according to the preset phase adjustment rule is: keeping phases of the in-segment reference symbols in the four segments unchanged, that is, keeping $\theta_{11}=\varphi_{11}$, $\theta_{22}=\varphi_{22}$, $\theta_{33}=\varphi_{33}$, and $\theta_{44}=\varphi_{44}$; and adjusting, by the receiving device, phases of symbols other than the in-segment reference symbols in the segments as follows: In the segment 1, $\theta_{12}=\varphi_{12}-\varphi_{11}$, $\theta_{13}=\varphi_{13}-\varphi_{12}$, $\theta_{14}=\varphi_{14}-\varphi_{13}$, and $\theta_{15}=\varphi_{15}-\varphi_{14}$; in the segment 2, $\theta_{21}=\varphi_{21}-\varphi_{22}$, $\theta_{23}=\varphi_{23}-\varphi_{22}$, and $\theta_{24}=\varphi_{24}-\varphi_{23}$, in the segment 3, $\theta_{31}=\varphi_{31}-\varphi_{32}$, $\theta_{32}=\varphi_{32}-\varphi_{33}$, and $\theta_{34}=\varphi_{34}-\varphi_{33}$; and in the segment 4, $\theta_{43}=\varphi_{43}-\varphi_{44}$, $\theta_{42}=\varphi_{42}-\varphi_{43}$, and $\theta_{41}=\varphi_{41}-\varphi_{42}$.

In a possible implementation of this application, the adjusting a phase of a symbol in each segment according to a preset phase inverse-adjustment rule includes:

determining an in-segment reference symbol in each of the N segments, where the in-segment reference symbol meets $2 \leq R_i \leq M_i-1$;

for a symbol meeting $1 \leq i \leq N$, $1 \leq j \leq M_i$, and $j \neq R_i$ in the N segments, adjusting a phase of the symbol according to $\theta_{ij}=\varphi_{ij}-\varphi_{iR_i}$, where N represents a quantity of segments, i represents a sequence number of a segment, $M_i$ represents a quantity of symbols in an $i^{th}$ segment, $M_1+M_2+\ldots M_N=M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$, and for a symbol meeting $1 \leq i \leq N$ and $j=R_i$ in the N segments, adjusting a phase of the symbol according to $\theta_{ij}=\varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $R_i=M_i$;

for a symbol meeting $1 \leq i \leq N$ and $1 \leq j < M_i$ in the N segments, adjusting a phase of the symbol according to $\theta_{ij}=\varphi_{ij}-\varphi_{iR_i}$, where N represents a quantity of segments, i represents a sequence number of a segment, $M_i$ represents a quantity of symbols in an $i^{th}$ segment, $M_1+M_2+\ldots M_N=M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$ and $M_i$ are all integers, and $M_i \geq 2$; and for a symbol meeting $1 \leq i \leq N$ and $j=M_i$ in the N segments, adjusting a phase of the symbol according to $\theta_{ij}=\varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $R_i=1$;

for a symbol meeting $1 \leq i \leq N$ and $1 < j \geq M_i$ in the N segments, adjusting a phase of the symbol according to $\theta_{ij}=\varphi_{ij}-\varphi_{iR_i}$, where N represents a quantity of segments, i represents a sequence number of a segment, $M_i$ represents a quantity of symbols in an $i^{th}$ segment, $M_1+M_2+\ldots M_N=M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j=1$ in the N segments, adjusting a phase of the symbol according to $\theta_{ij}=\varphi_{ij}$.

Specifically, the receiving device may determine the in-segment reference symbol in each of the N segments according to the indication of the sending device, or may determine the in-segment reference symbol in each of the N segments based on in-segment reference symbol position information on which the receiving device and the sending device pre-agree. The in-segment reference symbol may be a symbol in any position in the segment. For example, the in-segment reference symbol is the first symbol, an intermediate symbol, or the last symbol in the segment. Positions of in-segment reference symbols in the segments may be the same or different. For one segment, an in-segment reference symbol is used as a boundary to divide symbols in the segment into two types: symbols before the in-segment reference symbol and symbols after the in-segment reference symbol. After the constellation mapping, phases of the symbols in each of the N segments are represented as follows: Phases of symbols in the first segment are $\varphi_{11}, \varphi_{12}, \varphi_{13}, \ldots, \varphi_{1R_1}, \ldots, \varphi_{1(M_1-1)}, \varphi_{1M_1}$, phases of symbols in the second segment are $\varphi_{21}, \varphi_{22}, \varphi_{23}, \ldots, \varphi_{2R_2}, \ldots, \varphi_{2(M_2-1)}, \varphi_{2M_2}$, phases of symbols in the third segment are $\varphi_{31}, \varphi_{32}, \varphi_{33}, \ldots, \varphi_{3R_3}, \ldots, \varphi_{3(M_3-1)}, \varphi_{3M_3}$, and by analogy, phases of symbols in the $N^{th}$ segment are $\varphi_{N1}, \varphi_{N2}, \varphi_{N3}, \ldots, \varphi_{NR_N}, \ldots, \varphi_{N(M_N-1)}, \varphi_{NM_N}$, where $\varphi_{ij}$ is a phase of any symbol in the N segments, N represents a quantity of segments, i represents a sequence number of a segment, $M_i$ represents a quantity of symbols in an $i^{th}$ segment, $M_1+M_2+\ldots M_N=M$, M represents a total quantity of symbols in the N segments, $R_i$ represents a sequence number of an in-segment reference symbol in the $i^{th}$ segment, j represents a sequence number of a symbol, and $\theta_{ij}$ obtained through phase adjustment on $\varphi_{ij}$. When $1 \leq i \leq N$ and $j=R_i$, $\theta_{ij}=\varphi_{iR_i}$, that is, a phase of the in-segment reference symbol remains unchanged. For a symbol meeting $1 \leq i \leq N$, $1 \leq j \leq M_i$, and $j \neq R_i$ in the N segments, a phase of the symbol is adjusted according to the formula $\theta_{ij}=\varphi_{ij}-\varphi_{iR_i}$.

For example, N=4, and each segment includes four symbols. Symbols included in a segment 1 are $S_{11}, S_{12}, S_{13}$, and $S_{14}$, and phases of the foregoing symbols are $\varphi_{11}, \varphi_{12}, \varphi_{13}$, and $\varphi_{14}$ respectively; symbols included in a segment 2 are $S_{21}, S_{22}, S_{23}$, and $S_{24}$, and phases of the foregoing symbols are $\varphi_{21}, \varphi_{22}, \varphi_{23}$, and $\varphi_{24}$ respectively; symbols included in a segment 3 are $S_{31}, S_{32}, S_{33}$, and $S_{34}$, and phases of the foregoing symbols are $\varphi_{31}, \varphi_{32}, \varphi_{33}$, and $\varphi_{34}$ respectively; and symbols included in a segment 4 are $S_{41}, S_{42}, S_{43}$, and $S_{44}$, and phases of the foregoing four symbols are $\varphi_{41}, \varphi_{42}, \varphi_{43}$, and $\varphi_{44}$ respectively. A symbol having a bold box in FIG. 8 is an in-segment reference symbol. The receiving device determines that an in-segment reference symbol in the segment 1 is $S_{11}$, an in-segment reference symbol in the segment 2 is $S_{21}$, an in-segment reference symbol in the segment 3 is $S_{31}$, and an in-segment reference symbol in the segment 4 is $S_{41}$. A method for adjusting, by the receiving device, phases of the 16 symbols in the four segments according to the preset phase differentiation adjustment rule is: keeping phases of the in-segment reference symbols in the four segments unchanged, that is, keeping $\theta_{11}=\varphi_{11}$, $\theta_{22}=\varphi_{21}$, $\theta_{31}=\varphi_{31}$, and $\theta_{41}=\varphi_{41}$; and adjusting, by the receiving device, phases of symbols other than the in-segment reference symbols in the segments as follows: In the segment 1, $\theta_{12}=\varphi_{12}-\varphi_{11}$, $\theta_{13}=\varphi_{13}-\varphi_{11}$, and $\theta_{14}=\varphi_{14}-\varphi_{11}$; in the segment 2, $\theta_{22}=\varphi_{22}-\varphi_{21}$, $\theta_{23}=\varphi_{23}-\varphi_{21}$, and $\theta_{24}=\varphi_{24}-\varphi_{21}$; in the segment 3, $\theta_{32}=\varphi_{32}-\varphi_{31}$, $\theta_{33}=\varphi_{33}-\varphi_{31}$, and $\theta_{34}=\varphi_{34}-\varphi_{31}$; and in the segment 4, $\theta_{44}=\varphi_{44}-\varphi_{41}$, $\theta_{43}=\varphi_{43}-\varphi_{41}$, and $\theta_{42}=\varphi_{42}-\varphi_{41}$.

In a possible implementation of this application, the adjusting a phase of a symbol in each segment according to a preset phase inverse-adjustment rule includes:

determining an in-segment reference symbol in each of the N segments, where the in-segment reference symbol meets $2 \leq R_i \leq M_i - 1$;

for an in-segment reference symbol meeting $1 \leq i \leq N$ in the N segments, adjusting a phase of the in-segment reference symbol according to $\theta_{iR_i}=\varphi_{iR_i}-\varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a phase of the reference symbol in the $i^{th}$ segment, and $\theta_{iR_i}$ represents a phase to which $\varphi iR_i$ is adjusted;

for a symbol meeting $R_i+1<j \leq M_i$ in the N segments, adjusting a constellation phase of the symbol according to a formula $\theta_{ij}=\varphi_{ij}-\varphi_{i(j-1)}$, where $M_i$ represents a quantity of symbols in the $i^{th}$ segment, $M_1+M_2+\ldots M_N=M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted according to a preset phase adjustment rule, i, j, $R_i$, and $M_i$ are all integers, and $M_i \geq 3$;

for a symbol meeting $1 \leq i \leq N$ and $j=R_i+1$ in the N segments, adjusting a phase of the symbol according to $\theta_{i(R_i+1)}=\varphi_{i(R_i+1)}-\theta_{iR_i}$;

for a symbol meeting $1 \leq i \leq N$ and $1 \leq j < R_i-1$ in the N segments, adjusting a phase of the symbol according to $\theta_{ij}=\varphi_{ij}-\varphi_{i(j+1)}$;

for a symbol meeting $1 \leq i \leq N$ and $j=R_i-1$ in the N segments, adjusting a phase of the symbol according to $\theta_{i(R_i-1)}=\varphi_{i(R_i-1)}'\theta_{iR_i}$; and for a symbol meeting $1 \leq i \leq N$ and $j=R_i$ in the N segments, adjusting a phase of the symbol according to $\theta_{ij}=\varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $R_i=M_i$;

for an in-segment reference symbol meeting $1 \leq i \leq N$ in the N segments, adjusting a phase of the in-segment reference symbol according to $\theta_{iR_i}=\varphi_{iR_i}-\varphi_{(j-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a phase of the reference symbol in the $i^{th}$ segment, and $\theta_{iR_i}$ represents a phase to which $\varphi_{iR_i}$ is adjusted;

for a symbol meeting $1 \leq i \leq N$ and $1 \leq j < M_i-1$ in the N segments, adjusting a phase of the symbol according to $\theta_{ij}=\varphi_{ij}-\varphi_{i(j+1)}$, where $M_i$ represents a quantity of symbols in the $i^{th}$ segment, $M_1+M_2+\ldots M_N=M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted according to a preset phase inverse-adjustment rule, i, j, $R_i$, and $M_i$ are all integers, and $M_i \geq 3$;

for a symbol meeting $1 \leq i \leq N$ and $j=M_i-1$ in the N segments, adjusting a phase of the symbol according to $\theta_{i(R_i-1)}=\varphi_{i(R_i-1)}-\theta_{iR_i}$; and for a symbol meeting $1 \leq i \leq N$ and $j=M_i$ in the N segments, adjusting a phase of the symbol according to $\theta_{ij}=\varphi_{ij}$.

In a possible implementation of this application, the adjusting a phase of a symbol in each segment according to a preset phase inverse-adjustment rule includes:

determining an in-segment reference symbol in each of the N segments, where the in-segment reference symbol meets $R_i=1$;

for an in-segment reference symbol meeting $1 \leq i \leq N$ in the N segments, adjusting a phase of the in-segment reference symbol according to $\theta_{iR_i}=\varphi_{iR_i}-\varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a phase of the reference symbol in the $i^{th}$ segment, and $\theta_{iR_i}$ represents a phase to which $\varphi_{iR_i}$ is adjusted;

for a symbol meeting $2<j \leq M_i$ in the N segments, adjusting a constellation phase of the symbol according to a formula $\theta_{ij}=\varphi_{ij}-\varphi_{i(j-1)}$, where $M_i$ represents quantity of symbols in the $i^{th}$ segment, $M_1+M_2+\ldots M_N=M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted according to a preset phase inverse-adjustment rule, i, j, $R_i$, and $M_i$ are all integers, and $M_i \geq 3$.

for a symbol meeting $1 \leq i \leq N$ and $j=2$ in the N segments, adjusting a phase of the symbol according to $\theta_{i(R_i+1)}=\varphi_{i(R_i+1)}-\theta_{iR_i}$; and for a symbol meeting $1 \leq i \leq N$ and $j=1$ in the N segments, adjusting a phase of the symbol according to $\theta_{ij}=\varphi_{ij}$.

For example, N=3. Symbols included in a segment 1 are $S_{11}$, $S_{12}$, $S_{13}$, $S_{14}$, and $S_{15}$, and phases of the foregoing symbols are $\varphi_{11}$, $\varphi_{12}$, $\varphi_{13}$, $\varphi_{14}$, and $\varphi_{15}$ respectively; symbols included in a segment 2 are $S_{21}$, $S_{22}$, $S_{23}$, $S_{24}$, and $S_{25}$, and phases of the foregoing symbols are $\varphi_{21}$, $\varphi_{22}$, $\varphi_{23}$, $\varphi_{24}$, and $\varphi_{25}$ respectively; and symbols included in a segment 3 are $S_{31}$, $S_{32}$, $S_{33}$, $S_{34}$, and $S_{35}$, and phases of the foregoing symbols are $\varphi_{31}$, $\varphi_{32}$, $\varphi_{33}$, $\varphi_{34}$, and $\varphi_{35}$ respectively. The receiving device determines that an in-segment reference symbol in the segment 1 is $S_{11}$, an in-segment reference symbol in the segment 2 is $S_{22}$, and an in-segment reference symbol in the segment 3 is $S_{33}$. A method for adjusting, by the receiving device, phases of the 15 symbols in the three segments according to the preset phase adjustment rule is: first adjusting, by the receiving device, phases of the in-segment reference symbols in the three segments according to $\theta_{11}=\varphi_{11}$, $\theta_{22}=\varphi_{22}-\varphi_{11}$, and $\theta_{33}=\varphi_{33}-\theta_{22}$; and then adjusting, by the receiving device, phases of symbols other than the in-segment reference symbols in the segments as follows: In the segment 1, $\theta_{12}=\varphi_{12}-\theta_{11}$, $\theta_{13}=\varphi_{13}-\varphi_{12}$, $\theta_{14}=\varphi_{14}-\varphi_{13}$, and $\theta_{15}=\varphi_{15}-\varphi_{14}$; in the segment 2, $\theta_{21}=\varphi_{21}-\theta_{22}$, $\theta_{23}=\varphi_{23}-\theta_{22}$, $\theta_{24}=\varphi_{24}-\varphi_{23}$, and $\theta_{25}=\varphi_{25}-\varphi_{24}$; and in the segment 3, $\theta_{31}=\varphi_{31}-\varphi_{32}$, $\theta_{32}=\varphi_{32}-\theta_{33}$, $\theta_{34}=\varphi_{34}-\theta_{33}$, and $\theta_{35}=\varphi_{35}-\varphi_{34}$.

In a possible implementation of this application, the adjusting a phase of a symbol in each segment according to a preset phase inverse-adjustment rule includes:

determining an in-segment reference symbol in each symbol in the N segments, where the in-segment reference symbol meets $2 \leq R_i \leq M_i-1$;

for an in-segment reference symbol meeting $1 \leq i \leq N$ in the N segments, adjusting a phase of the in-segment reference symbol according to $\theta_{iR_i}=\varphi_{iR_i}-\varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$, $1 \leq j \leq M_i$, and $j \neq R_i$ in the N segments, adjusting a phase of the symbol according to $\theta_{ij} = \varphi_{ij} - \theta_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 3$, and for a symbol meeting $1 \leq i \leq N$ and $j = R_i$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each symbol in the N segments, where the in-segment reference symbol meets $R_i = M_i$;

for an in-segment reference symbol meeting $1 \leq i \leq N$ in the N segments, adjusting a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$ and $1 \leq j < M_i$ in the N segments, adjusting a phase of the symbol according to $\theta_{ij} = \varphi_{ij} - \theta_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = M_i$ in the N segments, adjusting a phase of the symbol according to $\theta_{ij} = \varphi_{ij}$.

In a possible implementation of this application, the adjusting a phase of a symbol in each segment according to a preset phase inverse-adjustment rule includes:

determining an in-segment reference symbol in each symbol in the N segments, where the in-segment reference symbol meets $R_i = 1$;

for an in-segment reference symbol meeting $1 \leq i \leq N$ in the N segments, adjusting a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$ and $1 < j \leq M_i$ in the N segments, adjusting a phase of the symbol according to $\theta_{ij} = \varphi_{ij} - \theta_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = 1$ in the N segments, adjusting a phase of the symbol according to $\theta_{ij} = \varphi_{ij}$.

For example, N=3. Symbols included in a segment 1 are $S_{11}$, $S_{12}$, $S_{13}$, $S_{14}$, and $S_{15}$, and phases of the foregoing symbols are $\varphi_{11}$, $\varphi_{12}$, $\varphi_{13}$, $\varphi_{14}$, and $\varphi_{15}$ respectively; symbols included in a segment 2 are $S_{21}$, $S_{22}$, $S_{23}$, $S_{24}$, and $S_{25}$, and phases of the foregoing symbols are $\varphi_{21}\varphi_{22}$, $\varphi_{23}$, $\varphi_{24}$, and $\varphi_{25}$ respectively; and symbols included in a segment 3 are $S_{31}$, $S_{32}$, $S_{33}$, $S_{34}$, and $S_{35}$, and phases of the foregoing symbols are $\varphi_{31}$, $\varphi_{32}$, $\varphi_{33}$, $\varphi_{34}$, and $\varphi^{35}$ respectively. The receiving device determines that an in-segment reference symbol in the segment 1 is $S_{11}$, an in-segment reference symbol in the segment 2 is $S_{22}$, and an in-segment reference symbol in the segment 3 is $S_{33}$. A method for adjusting, by the receiving device, phases of the 15 symbols in the three segments according to the preset phase adjustment rule is: first adjusting, by the receiving device, phases of the in-segment reference symbols in the three segments according to $\theta_{11} = \varphi_{11}$, $\theta_{22} = \varphi_{22} - \varphi_{11}$, and $\theta_{33} = \varphi_{33} - \varphi_{22}$; and then adjusting, by the receiving device, phases of symbols other than the in-segment reference symbols in the segments as follows: In the segment 1, $\theta_{12} = \varphi_{12} - \theta_{11}$, $\theta_{13} = \varphi_{13} - \theta_{11}$, $\theta_{14} = \varphi_{14} - \theta_{11}$, and $\theta_{15} = \varphi_{15} - \theta_{11}$; in the segment 2, $\theta_{21} = \varphi_{21} - \theta_{22}$, $\theta_{23} = \varphi_{23} - \theta_{22}$, $\theta_{24} = \varphi_{24} - \theta_{22}$, and $\theta_{25} = \varphi_{25} - \theta_{22}$; and in the segment 3, $\theta_{31} = \varphi_{31} - \theta_{33}$, $\theta_{32} = \varphi_{32} - \theta_{33}$, $\theta_{34} = \varphi_{34} - \theta_{33}$, and $\theta_{35} = \varphi_{35} - \theta_{33}$.

S804. Perform, based on a preset constellation diagram, constellation demapping on M symbols obtained through phase adjustment, to obtain a coded sequence.

Specifically, the constellation diagram represents a mapping relationship between a bit group and coordinates of a constellation point. The receiving device performs, by using a constellation diagram the same as that used by the sending device, constellation demapping on the M symbols obtained through phase adjustment, to obtain M bit groups. A quantity of symbols in each bit group is associated with a constellation diagram order.

S805. Perform decoding processing on the coded sequence to obtain raw data.

Specifically, the receiving device performs source decoding, channel decoding processing, de-interleaving decoding, or the like on the coded sequence to obtain the raw data. The raw data may be a binary bit sequence.

According to the method described in FIG. 8, a processing delay is reduced in a manner of concurrently processing the segments, and impact of phase noise is suppressed by using the phase differentiation method.

The foregoing describes the methods in the embodiments of the present application in detail. To better implement the foregoing solutions of the embodiments of the present application, correspondingly, the following provides an apparatus in an embodiment of the present application.

Figure 9:
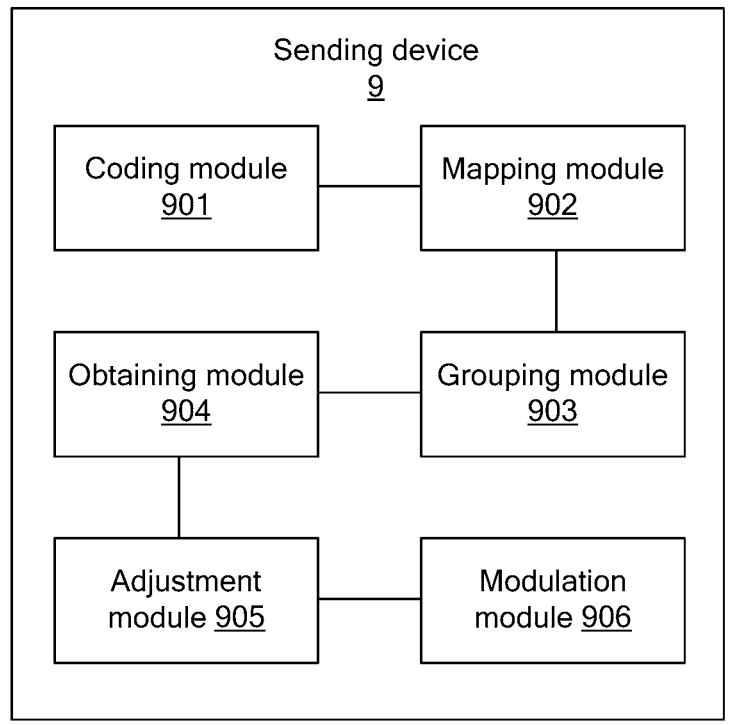
FIG. 9 is a schematic structural diagram of a sending device according to an embodiment of the present application.

FIG. 9 is a schematic structural diagram of a sending device according to an embodiment of the present application. The sending device 9 may include a coding module 901, a mapping module 902, a grouping module 903, an obtaining module 904, an adjustment module 905, and a modulation module 906. Detailed descriptions of the modules are as follows.

The coding module 901 is configured to perform coding processing on raw data to obtain a coded sequence.

The mapping module 902 is configured to perform constellation mapping on the coded sequence based on a preset constellation diagram, to obtain M symbols, where M is an integer greater than 1.

The grouping module 903 is configured to divide the M symbols into N segments, where N is an integer greater than 1.

The obtaining module 904 is configured to obtain a constellation phase of each symbol in the N segments.

The adjustment module 905 is configured to adjust a constellation phase of a symbol in each segment according to a preset phase adjustment rule, where the N segments are concurrently adjusted.

The modulation module 906 is configured to modulate M symbols obtained through phase adjustment, to obtain a modulated signal, and send the modulated signal.

Optionally, the adjustment module 905 is configured to:
determine an in-segment reference symbol in each of the N segments, where the in-segment reference symbol meets $2 \leq R_i \leq M_i - 1$;

for a symbol meeting $1 \leq i \leq N$ and $R_i < j \leq M_i$ in the N segments, adjust a constellation phase of the symbol according to $\varphi_{ij} = \theta_{ij} + \theta_{i(j-1)} + \ldots \theta_{i(R_i-1)} + \theta_{iR_i}$, where i represents a sequence number of a segment, j represents a sequence number of a symbol in the N segments, $M_i$ represents a quantity of symbols in an $i^{th}$ segment, that is, $M_1 + M_2 + \ldots M_N = M$ is met, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 3$;

for a symbol meeting $1 \leq i \leq N$ and $1 \leq j < R_i$ in the N segments, adjust a constellation phase of the symbol according to $\varphi_{ij} = \theta_{ij} + \theta_{i(j+1)} + \ldots + \theta_{iR_i}$; and for a symbol meeting $1 \leq i \leq N$ and $j = R_i$ in the N segments, adjust a constellation phase of the symbol according to $\varphi_{ij} = \theta_{ij}$.

Optionally, the adjustment module 905 is configured to: determine an in-segment reference symbol in each of the N segments, where the in-segment reference symbol meets $R_i = 1$;

for a symbol meeting $1 \leq i \leq N$ and $1 < j \leq M_i$ in the N segments, adjust a constellation phase of the symbol according to $\varphi_{ij} = \theta_{ij} + \theta_{i(j-1)} + \ldots \theta_{i(R_i-1)} + \theta_{iR_i}$, where i represents a sequence number of a segment, j represents a sequence number of a symbol in the N segments, $M_i$ represents a quantity of symbols in an $i^{th}$ segment, that is, $M_1 + M_2 + \ldots M_N = M$ is met, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 2$; and for a symbol meeting $1 \leq i \leq N$ and $j = 1$ in the N segments, adjust a constellation phase of the symbol according to $\varphi_{ij} = \theta_{ij}$.

Optionally, the adjustment module 905 is configured to:
determine an in-segment reference symbol in each of the N segments, where the in-segment reference symbol meets $2 \leq R_i \leq M_i - 1$.

for a symbol meeting $1 \leq i \leq N$, $1 \leq j \leq M_i$, and $j \neq R_i$ in the N segments, adjust a constellation phase of the symbol according to $\varphi_{ij} = \theta_{ij} + \theta_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 3$; and for a symbol meeting $1 \leq i \leq N$ and $R_i$ in the N segments, adjust a constellation phase of the symbol according to $\varphi_{ij} = \theta_{ij}$.

Optionally, the adjustment module 905 is configured to:
determine an in-segment reference symbol in each of the N segments, where the in-segment reference symbol meets $R_i = 1$;

for a symbol meeting $1 \leq i \leq N$ and $1 < j \leq M_i$ in the N segments, adjust a constellation phase of the symbol according to $\varphi_{ij} = \theta_{ij} + \theta_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 2$; and for a symbol meeting $1 \leq i \leq N$ and $j = R_i$ in the N segments, adjust a constellation phase of the symbol according to $\varphi_{ij} = \theta_{ij}$.

Optionally, the adjustment module 905 is configured to:
determine an in-segment reference symbol in each of the N segments, where the in-segment reference symbol meets $2 \leq R_i \leq M_i - 1$;

for an in-segment reference symbol meeting $1 \leq i \leq N$ in the N segments, adjust a constellation phase of the in-segment reference symbol according to $\varphi_{iR_i} = \theta_{iR_i} + \theta_{(i-1)(R_{i-1})} + \ldots \theta_{2R_2} + \theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $R_i < j \leq M_i$ in the N segments, adjust a constellation phase of the symbol according to $\varphi_{ij} = \theta_{ij} + \theta_{i(j-1)} + \ldots \theta_{i(R_i-1)} + \varphi_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$;

for a symbol meeting $1 \leq i \leq N$ and $1 \leq j < R_i$ in the N segments, adjust a constellation phase of the symbol according to a formula $\varphi_{ij} = \theta_{ij} + \theta_{i(j+1)} + \ldots + \varphi_{iR_i}$; and for a symbol meeting $1 \leq i \leq N$ and $j = R_i$ in the N segments, adjust a phase of the symbol according to $\varphi_{ij} = \theta_{ij}$.

Optionally, the adjustment module 905 is configured to:
determine an in-segment reference symbol in each of the N segments, where the in-segment reference symbol meets $R_i = 1$;

for an in-segment reference symbol meeting $1 \leq i \leq N$ in the N segments, adjust a constellation phase of the in-segment reference symbol according to $\varphi_{iR_i} = \theta_{iR_i} + \theta_{(i-1)(R_{i-1})} + \ldots \theta_{2R_2} + \theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $1 < j \leq M_i$ in the N segments, adjust a constellation phase of the symbol according to $\varphi_{ij} = \theta_{ij} + \theta_{i(j-1)} + \ldots \theta_{i(R_i-1)} + \varphi_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$; and for a symbol meeting $1 \leq i \leq N$ and $j = R_i$ in the N segments, adjust a phase of the symbol according to $\varphi_{ij} = \theta_{ij}$.

Optionally, the adjustment module 905 is configured to:

determine an in-segment reference symbol in each symbol in the N segments, where the in-segment reference symbol meets $2 \leq R_i \leq M_i - 1$;

for an in-segment reference symbol meeting $1 \leq i \leq N$ in the N segments, adjust a constellation phase of the in-segment reference symbol according to $\varphi_{iR_i} = \theta_{iR_i} + \theta_{(i-1)(R_{i-1})} + \ldots \theta_{2R_2} + \theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$, $1 \leq j \leq R_i$, and $j \neq R_i$ in the N segments, adjust a constellation phase of the symbol according to $\varphi_{ij} = \theta_{ij} + \varphi_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $M_i$, and $R_i$ are all integers, and $M_i \geq 3$; and for a symbol meeting $1 \leq i \leq N$ and $j = R_i$ in the N segments, adjust a phase of the symbol according to $\varphi_{ij} = \theta_{ij}$.

Optionally, the adjustment module 905 is configured to:

determine an in-segment reference symbol in each symbol in the N segments, where the in-segment reference symbol meets $R_i = 1$;

for an in-segment reference symbol meeting $1 \leq i \leq N$ in the N segments, adjust a constellation phase of the in-segment reference symbol according to $\varphi_{iR_i} = \theta_{iR_i} + \theta_{(i-1)(R_{i-1})} + \ldots \theta_{2R_2} + \theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $1 < j \leq M_i$ in the N segments, adjust a constellation phase of the symbol according to $\varphi_{ij} = \theta_{ij} + \varphi_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$; and for a symbol meeting $1 \leq i \leq N$ and $j = 1$ in the N segments, adjust a phase of the symbol according to $\varphi_{ij} = \theta_{ij}$.

Optionally, the in-segment reference symbol is a pilot symbol.

It should be noted that, in this embodiment of the present application, for specific implementation of each unit, corresponding reference may be further made to the corresponding description of the method embodiment shown in FIG. 1.

According to the sending device described in FIG. 9, a processing delay is reduced in a manner of concurrently processing the segments, and impact of phase noise is suppressed by using the phase accumulation method.

Figure 10:
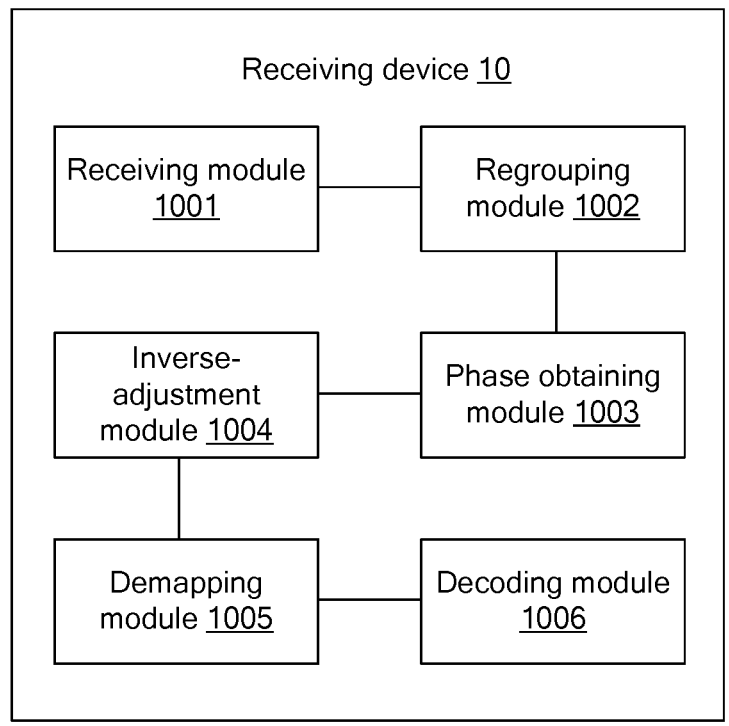
FIG. 10 is a schematic structural diagram of a receiving device according to an embodiment of the present application.

FIG. 10 is a schematic structural diagram of a receiving device according to an embodiment of the present application. The receiving device 10 may include a receiving module 1001, a regrouping module 1002, a phase obtaining module 1003, an inverse-adjustment module 1004, a demapping module 1005, and a decoding module 1006. Detailed descriptions of the units are as follows.

The receiving module 1001 is configured to receive a modulated signal and demodulate the adjusted signal to obtain M symbols.

The regrouping module 1002 is configured to divide the M symbols into N groups, where N is an integer greater than 1.

The phase obtaining module 1003 is configured to obtain a phase of each symbol in the N segments.

The inverse-adjustment module 1004 is configured to adjust a phase of a symbol in each segment according to a preset phase inverse-adjustment rule, where phase adjustment is concurrently performed on the N segments.

The demapping module 1005 is configured to perform, based on a preset constellation diagram, constellation demapping on M symbols obtained through phase adjustment, to obtain a coded sequence.

The decoding module 1006 is configured to perform decoding processing on the coded sequence to obtain raw data.

Optionally, the inverse-adjustment module 1004 is configured to:

determine an in-segment reference symbol in each of the N segments, where the in-segment reference symbol meets $2 \leq R_i \leq M_i - 1$.

for a symbol meeting $1 \leq i \leq N$ and $R_i < j \leq M_i$ in the N segments, adjust a phase of the symbol according to $\theta_{ij} = \varphi_{ij} - \varphi_{i(j-1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$ and $M_i$ are all integers, and $M_i \geq 3$;

for a symbol meeting $1 \leq i \leq N$ and $1 \leq j < R_i$ in the N segments, adjust a phase of the symbol according to $\theta_{ij} = \varphi_{ij} - \varphi_{i(j+1)}$; and for a symbol meeting $1 \leq i \leq N$ and $j = R_i$ in the N segments, adjust a phase of the symbol according to $\theta_{ij} = \varphi_{ij}$.

Optionally, the inverse-adjustment module 1004 is configured to:

determine an in-segment reference symbol in each of the N segments, where the in-segment reference symbol meets $R_i = 1$;

for a symbol meeting $1 \leq i \leq N$ and $1 < j \leq M_i$ in the N segments, adjust a phase of the symbol according to $\theta_{ij} = \varphi_{ij} - \varphi_{i(j-1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = 1$ in the N segments, adjust a phase of the symbol according to $\theta_{ij} = \varphi_{ij}$.

Optionally, the inverse-adjustment module 1004 is configured to:

determine an in-segment reference symbol in each of the N segments, where the in-segment reference symbol meets $2 \leq R_i \leq M_i - 1$;

for a symbol meeting $1 \leq i \leq N$, $1 \leq j \leq M_i$, and $j \neq R_i$ in the N segments, adjust a phase of the symbol according to $\theta_{ij} = \varphi_{ij} - \varphi_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = R_i$ in the N segments, adjust a phase of the symbol according to $\theta_{ij} = \varphi_{ij}$.

Optionally, the inverse-adjustment module 1004 is configured to:

determine an in-segment reference symbol in each of the N segments, where the in-segment reference symbol meets $R_i = 1$;

for a symbol meeting $1 \leq i \leq N$ and $1 < j \leq M_i$ in the N segments, adjust a phase of the symbol according to $\theta_{ij} = \varphi_{ij} - \varphi_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = 1$ in the N segments, adjust a phase of the symbol according to $\theta_{ij} = \varphi_{ij}$.

Optionally, the inverse-adjustment module 1004 is configured to:

determine an in-segment reference symbol in each of the N segments, where the in-segment reference symbol meets $2 \leq R_i \leq M_i - 1$;

for an in-segment reference symbol meeting $1 \leq i \leq N$ in the N segments, adjust a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a phase of the reference symbol in the $i^{th}$ segment, and $\theta_{iR_i}$ represents a phase to which $\varphi_{iR_i}$ is adjusted;

for a symbol meeting $R_i + 1 < j \leq M_i$ in the N segments, adjust a constellation phase of the symbol according to a formula $\theta_{ij} = \varphi_{ij} - \varphi_{i(j-1)}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 3$;

for a symbol meeting $1 \leq i \leq N$ and $j = R_i + 1$ in the N segments, adjust a phase of the symbol according to $\theta_{i(R_i+1)} = \varphi_{i(R_i+1)} - \theta_{iR_i}$;

for a symbol meeting $1 \leq i \leq N$ and $1 \leq j < R_i - 1$ in the N segments, adjust a phase of the symbol according to $\theta_{ij} = \varphi_{ij} - \varphi_{i(j+1)}$;

for a symbol meeting $1 \leq i \leq N$ and $j = R_i - 1$ in the N segments, adjust a phase of the symbol according to $\theta_{i(R_i-1)} = \varphi_{i(R_i-1)} - \theta_{iR_i}$; and for a symbol meeting $1 \leq i \leq N$ and $j = R_i$ in the N segments, adjust a phase of the symbol according to $\theta_{ij} = \varphi_{ij}$.

Optionally, the inverse-adjustment module 1004 is configured to:

determine an in-segment reference symbol in each of the N segments, where the in-segment reference symbol meets $R_i = 1$;

for an in-segment reference symbol meeting $1 \leq i \leq N$ in the N segments, adjust a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a phase of the reference symbol in the $i^{th}$ segment, and $\theta_{iR_i}$ represents a phase to which $\varphi_{iR_i}$ is adjusted;

for a symbol meeting $2 < j \leq M_i$ in the N segments, adjust a constellation phase of the symbol according to a formula $\theta_{ij} = \varphi_{ij} - \varphi_{i(j-1)}$, where $M_i$ represents a quantity of symbols in the $i^{th}$ segment, $M_1 + M_2 + \ldots M_n = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 3$;

for a symbol meeting $1 \leq i \leq N$ and $j = 2$ in the N segments, adjust a phase of the symbol according to $\theta_{i(R+1)} = \varphi_{i(R_i+1)} - \theta_{iR_i}$; and for a symbol meeting $1 \leq i \leq N$ and $j = 1$ in the N segments, adjust a phase of the symbol according to $\theta_{ij} = \varphi_{ij}$.

Optionally, the inverse-adjustment module 1004 is configured to:

determine an in-segment reference symbol in each symbol in the N segments, where the in-segment reference symbol meets $2 \leq R_i \leq M_i - 1$;

for an in-segment reference symbol meeting $1 \leq i \leq N$ in the N segments, adjust a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$, $1 \leq j \leq M_i$, and $j \neq R_i$ in the N segments, adjust a phase of the symbol according to $\theta_{ij} = \varphi_{ij} - \theta_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 3$; and for a symbol meeting $1 \leq i \leq N$ and $j = R_i$ in the N segments, adjust a phase of the symbol according to $\theta_{ij} = \varphi_{ij}$.

Optionally, the inverse-adjustment module 1004 is configured to:

determine an in-segment reference symbol in each symbol in the N segments, where the in-segment reference symbol meets $R_i = 1$;

for an in-segment reference symbol meeting $1 \leq i \leq N$ in the N segments, adjust a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$ and $1 < j \leq M_i$ in the N segments, adjust a phase of the symbol according to $\theta_{ij} = \varphi_{ij} - \theta_{iR_i}$, where $M_i$ represents a quantity of symbols in the $i^{th}$ $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j=1$ in the N segments, adjust a phase of the symbol according to $\theta_{ij}=\varphi_{ij}$.

It should be noted that, in this embodiment of the present application, for specific implementation of each unit, corresponding reference may be further made to the corresponding description of the method embodiment shown in FIG. 8.

According to the receiving method described in FIG. 8, a processing delay is reduced in a manner of concurrently processing the segments, and impact of phase noise is suppressed by using a phase differentiation method.

Figure 11:
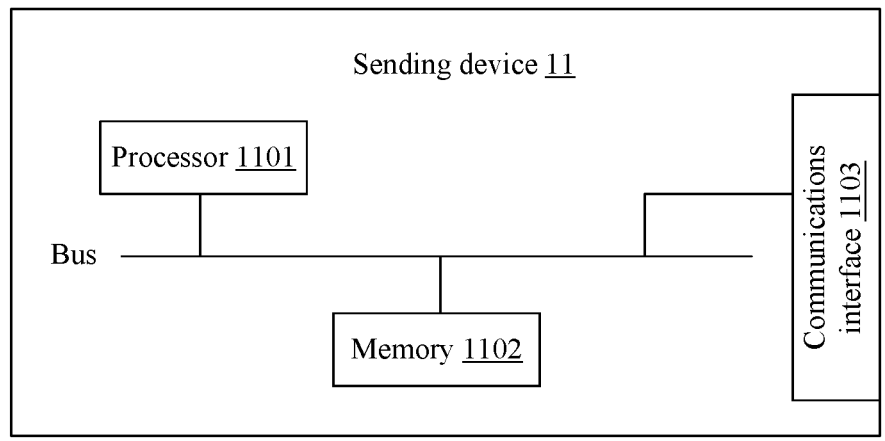
FIG. 11 is a schematic structural diagram of another sending device according to an embodiment of the present application.

FIG. 11 is another schematic structural diagram of a sending device according to an embodiment of the present application. In this embodiment of the present application, the sending device 11 includes a processor 1101, a memory 1102, and a communications interface 1103. There may be one or more processors 1101 in the sending device 11. In some embodiments of the present application, the processor 1101, the memory 1102, and the communications interface 1103 may be connected by using a bus system or in another manner. The processor 1101, the memory 1102, and the communications interface 1103 may be connected to each other in a wired manner, or may implement communication through wireless transmission or another means. The sending device 11 may be configured to perform the method shown in FIG. 2. For meanings and examples of terms in this embodiment, refer to the embodiment corresponding to FIG. 2. Details are not described herein again.

The memory 1102 stores program code. The processor 1101 is configured to invoke the program code stored in the memory 1102, to perform the following operations:

performing coding processing on raw data to obtain a coded sequence;

performing constellation mapping on the coded sequence based on a preset constellation diagram, to obtain M symbols, where M is an integer greater than 1;

dividing the M symbols into N segments, where N is an integer greater than 1;

obtaining a constellation phase of each symbol in the N segments;

adjusting a constellation phase of a symbol in each segment according to a preset phase adjustment rule, where the N segments are concurrently adjusted; and modulating M symbols obtained through phase adjustment, to obtain a modulated signal, and sending the modulated signal.

Optionally, that the processor 1101 executes the adjusting a constellation phase of a symbol in each segment according to a preset phase adjustment rule includes:

determining an in-segment reference symbol in each of the N segments, where the in-segment reference symbol meets $2 \leq R_i \leq M_i - 1$;

for a symbol meeting $1 \leq i \leq N$ and $R_i < j \leq M_i$ in the N segments, adjusting a constellation phase of the symbol according to $\varphi_{ij}=\theta_{ij}+\theta_{i(j-1)}+ \ldots \theta_{i(R_i-1)}+\theta_{iR_i}$, where i represents a sequence number of a segment, j represents a sequence number of a symbol in the N segments, $M_i$ represents a quantity of symbols in an $i^{th}$ segment, that is, $M_1+M_2+ \ldots M_N=M$ is met, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 3$;

for a symbol meeting $1 \leq i \leq N$ and $1 \leq j < R_i$ in the N segments, adjusting a constellation phase of the symbol according to $\varphi_{ij}=\theta_{ij}+\theta_{i(j+1)}+ \ldots +\theta_{iR_i}$; and for a symbol meeting $1 \leq i \leq N$ and $j=R_i$ in the N segments, adjusting a constellation phase of the symbol according to $\varphi_{ij}=\theta_{ij}$.

Optionally, that the processor 1101 executes the adjusting a constellation phase of a symbol in each segment according to a preset phase adjustment rule includes:

determining an in-segment reference symbol in each of the N segments, where the in-segment reference symbol meets $R_i=1$;

for a symbol meeting $1 \leq i \leq N$ and $1 < j \leq M_i$ in the N segments, adjusting a constellation phase of the symbol according to $\varphi_{ij}=\theta_{ij}+\theta_{i(j-1)}+ \ldots \theta_{i(R_i-1)}+\theta_{iR_i}$, where i represents a sequence number of a segment, j represents a sequence number of a symbol in the N segments, $M_i$ represents a quantity of symbols in an $i^{th}$ segment, that is, $M_1+M_2+ \ldots M_N=M$ is met, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 2$; and for a symbol meeting $1 \leq i \leq N$ and $j=1$ in the N segments, adjusting a constellation phase of the symbol according to $\varphi_{ij}=\theta_{ij}$.

Optionally, that the processor 1101 executes the adjusting a constellation phase of a symbol in each segment according to a preset phase adjustment rule includes:

determining an in-segment reference symbol in each of the N segments, where the in-segment reference symbol meets $2 \leq R_i \leq M_i - 1$;

for a symbol meeting $1 \leq i \leq N$, $1 \leq j \leq M_i$, and $j \neq R_i$ in the N segments, adjusting a constellation phase of the symbol according to $\varphi_{ij}=\theta_{ij}+\theta_{iR_i}$, where N represents a quantity of segments, i represents a sequence number of a segment, $M_i$ represents a quantity of symbols in an $i^{th}$ segment, $M_1+M_2+ \ldots M_N=M$, M represents a total quantity of symbols in the N segments, $R_i$ represents a sequence number of an in-segment reference symbol in the $i^{th}$ segment, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 3$; and for a symbol meeting $1 \leq i \leq N$ and $j=R_i$ in the N segments, adjusting a constellation phase of the symbol according to $\varphi_{ij}=\theta_{ij}$.

Optionally, that the processor 1101 executes the adjusting a constellation phase of a symbol in each segment according to a preset phase adjustment rule includes:

determining an in-segment reference symbol in each of the N segments, where the in-segment reference symbol meets $R_i=1$;

for a symbol meeting $1 \leq i \leq N$ and $1 < j \leq M_i$ in the N segments, adjusting a constellation phase of the symbol according to $\varphi_{ij}=\theta_{ij}+\theta_{iR_i}$, where N represents a quantity of segments, i represents a sequence number of a segment, $M_i$ represents a quantity of symbols in an $i^{th}$ segment, $M_1+M_2+ \ldots M_N=M$, M represents a total quantity of symbols in the N segments, $R_i$ represents a sequence number of an in-segment reference symbol in the $i^{th}$ segment, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are all integers, and $M_i \geq 2$; and for a symbol meeting $1 \leq i \leq N$ and $j=R_i$ in the N segments, adjusting a constellation phase of the symbol according to $\varphi_{ij}=\theta_{ij}$.

Optionally, that the processor 1101 executes the adjusting a constellation phase of a symbol in each segment according to a preset phase adjustment rule includes:

determining an in-segment reference symbol in each of the N segments, where the in-segment reference symbol meets $2 \leq R_i \leq M_i-1$;

for an in-segment reference symbol meeting $1 \leq i \leq N$ in the N segments, adjusting a constellation phase of the in-segment reference symbol according to $\varphi_{iR_i}=\theta_{iR_i}+\theta_{(i-1)(R_{i-1})}+ \ldots \theta_{2R_2}+\theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $R_i<j \leq M_i$ in the N segments, adjusting a constellation phase of the symbol according to $\varphi_{ij}=\theta_{ij}+\theta_{i(j-1)}+ \ldots \theta_{i(R_i-1)}+\varphi_{iR_i}$, where $M_i$ represents a quantity of symbols in the $i^{th}$ segment, $M_1+M_2+\ldots M_N=M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$;

for a symbol meeting $1 \leq i \leq N$ and $1 \leq j<R_i$ in the N segments, adjusting a constellation phase of the symbol according to a formula $\varphi_{ij}=\theta_{ij}+\theta_{i(j+1)}+ \ldots +\varphi_{iR_i}$; and for a symbol meeting $1 \leq i \leq N$ and $j=R_i$ in the N segments, adjusting a phase of the symbol according to $\varphi_{ij}=\theta_{ij}$.

Optionally, that the processor 1101 executes the adjusting a constellation phase of a symbol in each segment according to a preset phase adjustment rule includes: determining an in-segment reference symbol in each of the N segments, where the in-segment reference symbol meets $R_i=1$;

for an in-segment reference symbol meeting $1 \leq i \leq N$ in the N segments, adjusting a constellation phase of the in-segment reference symbol according to $\varphi_{iR_i}=\theta_{iR_i}+\theta_{(i-1)(R_{i-1})}+ \ldots \theta_{2R_2}+\theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $1<j \leq M_i$ in the N segments, adjusting a constellation phase of the symbol according to $\varphi_{ij}=\theta_{ij}+\theta_{i(j-1)}+ \ldots \theta_{i(R_i-1)}+\varphi_{iR_i}$, where $M_i$ represents a quantity of symbols in the $i^{th}$ segment, $M_1+M_2+\ldots M_N=M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$; and for a symbol meeting $1 \leq i \leq N$ and $j=R_i$ in the N segments, adjusting a phase of the symbol according to $\varphi_{ij}=\theta_{ij}$.

Optionally, that the processor 1101 executes the adjusting a constellation phase of a symbol in each segment according to a preset phase adjustment rule includes:

determining an in-segment reference symbol in each symbol in the N segments, where the in-segment reference symbol meets $2 \leq R_i \leq M_i-1$;

for an in-segment reference symbol meeting $1 \leq i \leq N$ in the N segments, adjusting a constellation phase of the in-segment reference symbol according to $\varphi_{iR_i}=\theta_{iR_i}+\theta_{(i-1)(R_{i-1})}+ \ldots \theta_{2R_2}+\theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$, $1 \leq j \leq R_i$, and $j \neq R_i$ in the N segments, adjusting a constellation phase of the symbol according to $\varphi_{ij}=\theta_{ij}+\varphi_{iR_i}$, where $M_i$ represents a quantity of symbols in the $i^{th}$ segment, $M_1+M_2+ \ldots M_N=M$, M represents a total quantity of symbols in the N segments, j represents a sequence number of a symbol in the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 3$; and for a symbol meeting $1 \leq i \leq N$ and $j=R_i$ in the N segments, adjusting a phase of the symbol according to $\varphi_{ij}=\theta_{ij}$.

Optionally, that the processor 1101 executes the adjusting a constellation phase of a symbol in each segment according to a preset phase adjustment rule includes:

determining an in-segment reference symbol in each symbol in the N segments, where the in-segment reference symbol meets $R_i=1$;

for an in-segment reference symbol meeting $1 \leq i \leq N$ in the N segments, adjusting a constellation phase of the in-segment reference symbol according to $\varphi_{iR_i}=\theta_{iR_i}+\theta_{(i-1)(R_{i-1})}+ \ldots \theta_{2R_2}+\theta_{1R_1}$, where N represents a quantity of segments, i represents a sequence number of a segment, $R_i$ represents a sequence number of an in-segment reference symbol in an $i^{th}$ segment, $\theta_{iR_i}$ represents a constellation phase of the reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $1<j \leq M_i$ in the N segments, adjusting a constellation phase of the symbol according to $\varphi_{ij}=\theta_{ij}+\varphi_{iR_i}$, where $M_i$ represents a quantity of symbols in the $i^{th}$ segment, $M_1+M_2+ \ldots M_N=M$, M represents a total quantity of symbols in the N segments, j represents a sequence number of a symbol, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are all integers, and $M_i \geq 2$; and for a symbol meeting $1 \leq i \leq N$ and $j=1$ in the N segments, adjusting a phase of the symbol according to $\varphi_{ij}=\theta_{ij}$.

Optionally, the in-segment reference symbol is a pilot symbol.

Figure 12:
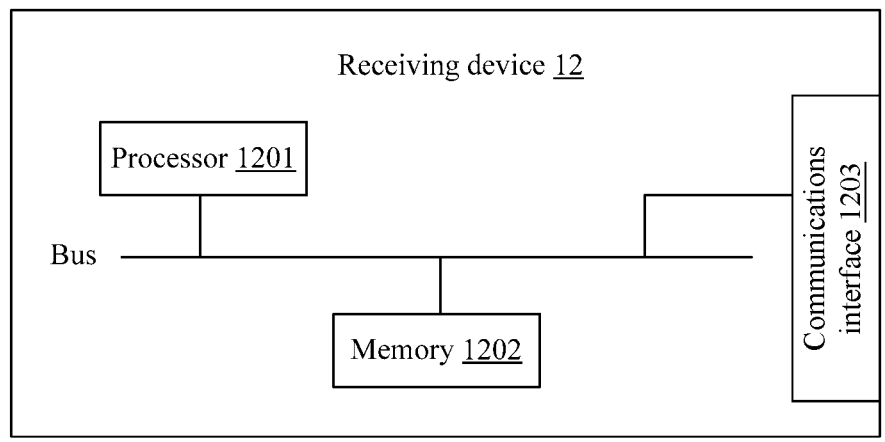
FIG. 12 is a schematic structural diagram of another receiving device according to an embodiment of the present application.

FIG. 12 is another schematic structural diagram of a receiving device according to an embodiment of the present application. In this embodiment of the present application, the receiving device 12 includes a processor 1201, a memory 1202, and a communications interface 1203. There may be one or more processors 1201 in the receiving device 12. In some embodiments of the present application, the processor 1201, the memory 1202, and the communications interface 1203 may be connected by using a bus system or in another manner. The processor 1201, the memory 1202, and the communications interface 1203 may be connected to each other in a wired manner, or may implement communication through wireless transmission or another means. The receiving device 12 may be configured to perform the method shown in FIG. 8. For meanings and examples of terms in this embodiment, refer to the embodiment corresponding to FIG. 8. Details are not described herein again.

The memory 1202 stores program code. The processor 1201 is configured to invoke the program code stored in the memory 1202, to perform the following operations:

receiving a modulated signal and demodulating the adjusted signal to obtain M symbols;

dividing the M symbols into N groups, where N is an integer greater than 1;

obtaining a phase of each symbol in the N segments;

adjusting a phase of a symbol in each segment according to a preset phase inverse-adjustment rule, where phase adjustment is concurrently performed on the N segments;

performing, based on a preset constellation diagram, constellation demapping on M symbols obtained through phase adjustment, to obtain a coded sequence; and performing decoding processing on the coded sequence to obtain raw data.

In a possible implementation of this application, that the processor 1201 executes the adjusting a phase of a symbol in each segment according to a preset phase inverse-adjustment rule includes:

determining an in-segment reference symbol in each of the N segments, where the in-segment reference symbol meets $2 \leq R_i \leq M_i - 1$;

for a symbol meeting $1 \leq i \leq N$ and $R_i < j \leq M_i$ in the N segments, adjusting a phase of the symbol according to $\theta_{ij} = \varphi_{ij} - \varphi_{i(j-1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 3$;

for a symbol meeting $1 \leq i \leq N$ and $1 \leq j < R_i$ in the N segments, adjusting a phase of the symbol according to $\theta_{ij} = \varphi_{ij} - \varphi_{i(j+1)}$; and for a symbol meeting $1 \leq i \leq N$ and $j = R_i$ in the N segments, adjusting a phase of the symbol according to $\theta_{ij} = \varphi_{ij}$.

In a possible implementation of this application, that the processor 1201 executes the adjusting a phase of a symbol in each segment according to a preset phase inverse-adjustment rule includes:

determining an in-segment reference symbol in each of the N segments, where the in-segment reference symbol meets $R_i = M_i$;

for a symbol meeting $1 \leq i \leq N$ and $1 \leq j < M_i$ in the N segments, adjusting a phase of the symbol according to $\theta_{ij} = \varphi_{ij} - \varphi_{i(j+1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = M_i$ in the N segments, adjusting a phase of the symbol according to $\theta_{ij} = \varphi_{ij}$.

In a possible implementation of this application, that the processor 1201 executes the adjusting a phase of a symbol in each segment according to a preset phase inverse-adjustment rule includes:

determining an in-segment reference symbol in each of the N segments, where the in-segment reference symbol meets $R_i = 1$;

for a symbol meeting $1 \leq i \leq N$ and $1 < j \leq M_i$ in the N segments, adjusting a phase of the symbol according to $\theta_{ij} = \varphi_{ij} - \varphi_{i(j-1)}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = 1$ in the N segments, adjusting a phase of the symbol according to $\theta_{ij} = \varphi_{ij}$.

In a possible implementation of this application, that the processor 1201 executes the adjusting a phase of a symbol in each segment according to a preset phase inverse-adjustment rule includes:

determining an in-segment reference symbol in each of the N segments, where the in-segment reference symbol meets $2 \leq R_i \leq M_i - 1$;

for a symbol meeting $1 \leq i \leq N$, $1 \leq j < M_i$, and $j \neq R_i$ in the N segments, adjusting a phase of the symbol according to $\theta_{ij} = \varphi_{ij} - \varphi_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = R_i$ in the N segments, adjusting a phase of the symbol according to $\theta_{ij} = \varphi_{ij}$.

In a possible implementation of this application, that the processor 1201 executes the adjusting a phase of a symbol in each segment according to a preset phase inverse-adjustment rule includes:

determining an in-segment reference symbol in each of the N segments, where the in-segment reference symbol meets $R_i = M_i$;

for a symbol meeting $1 \leq i \leq N$ and $1 \leq j < M_i$ in the N segments, adjusting a phase of the symbol according to $\theta_{ij} = \varphi_{ij} - \varphi_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = M_i$ in the N segments, adjusting a phase of the symbol according to $\theta_{ij} = \varphi_{ij}$.

In a possible implementation of this application, that the processor 1201 executes the adjusting a phase of a symbol in each segment according to a preset phase inverse-adjustment rule includes:

determining an in-segment reference symbol in each of the N segments, where the in-segment reference symbol meets $R_i = 1$;

for a symbol meeting $1 \leq i \leq N$ and $1 < j \leq M_i$ in the N segments, adjusting a phase of the symbol according to $\theta_{ij} = \varphi_{ij} - \varphi_{iR_i}$, where N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j=1$ in the N segments, adjusting a phase of the symbol according to $\theta_{ij}=\varphi_{ij}$.

In a possible implementation of this application, that the processor 1201 executes the adjusting a phase of a symbol in each segment according to a preset phase inverse-adjustment rule includes:

determining an in-segment reference symbol in each of the N segments, where the in-segment reference symbol meets $2 \leq R_i \leq M_i-1$;

for an in-segment reference symbol meeting $1 \leq i \leq N$ in the N segments, adjusting a phase of the in-segment reference symbol according to $\theta_{iR_i}=\varphi_{iR_i}-\varphi_{(i-1)(R_{i-1})}$, where N represents a sequence number of an in-segment reference symbol number of a segment, $R_i$ represents a sequence number of an in-segment reference symbol in an $i^{th}$ segment, $\varphi_{iR_i}$ represents a phase of the reference symbol in the $i^{th}$ segment, and $\theta_{iR_i}$ represents a phase to which $\varphi_{iR_i}$ is adjusted;

for a symbol meeting $R_i+1<j \leq M_i$ in the N segments, adjusting a constellation phase of the symbol according to a formula $\theta_{ij}=\varphi_{ij}-\varphi_{i(j-1)}$, where $M_i$ represents a quantity of symbols in the $i^{th}$ segment, $M_1+M_2+\ldots M_N=M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 3$;

for a symbol meeting $1 \leq i \leq N$ and $j=R_i+1$ in the N segments, adjusting a phase of the symbol according to $\theta_{i(R_i+1)}=\varphi_{ij}-\varphi_{i(j+1)}$;

for a symbol meeting $1 \leq i \leq N$ and $1 \leq j<R_i-1$ in the N segments, adjusting a phase of the symbol according to $\theta_{ij}=\varphi_{ij}-\varphi_{i(j+1)}$;

for a symbol meeting $1 \leq i \leq N$ and $j=R_i-1$ in the N segments, adjusting a phase of the symbol according to $\theta_{i(R_i-1)}=\varphi_{i(R_i-1)}-\theta_{iR_i}$; and for a symbol meeting $1 \leq i \leq N$ and $j=R_i$ in the N segments, adjusting a phase of the symbol according to $\theta_{ij}=\varphi_{ij}$.

In a possible implementation of this application, that the processor 1201 executes the adjusting a phase of a symbol in each segment according to a preset phase inverse-adjustment rule includes:

determining an in-segment reference symbol in each of the N segments, where the in-segment reference symbol meets $R_i=M_i$;

for an in-segment reference symbol meeting $1 \leq i \leq N$ in the N segments, adjusting a phase of the in-segment reference symbol according to $\theta_{iR_i}=\varphi_{iR_i}-\varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a phase of the reference symbol in the $i^{th}$ segment, and $\theta_{iR_i}$ represents a phase to which $\varphi_{iR_i}$ is adjusted;

for a symbol meeting $1 \leq i \leq N$ and $1 \leq j<M_i-1$ in the N segments, adjusting a phase of the symbol according to $\theta_{ij}=\varphi_{ij}-\varphi_{i(j+1)}$, where $M_i$ represents a quantity of symbols in the $i^{th}$ segment, $M_1+M_2+\ldots M_N=M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 3$;

for a symbol meeting $1 \leq i \leq N$ and $j=M_i-1$ in the N segments, adjusting a phase of the symbol according to $\theta_{i(R_i-1)}=\varphi_{i(R_i-1)}-\theta_{iR_i}$; and for a symbol meeting $1 \leq i \leq N$ and $j=M_i$ in the N segments, adjusting a phase of the symbol according to $\theta_{ij}=\varphi_{ij}$.

In a possible implementation of this application, that the processor 1201 executes the adjusting a phase of a symbol in each segment according to a preset phase inverse-adjustment rule includes:

determining an in-segment reference symbol in each of the N segments, where the in-segment reference symbol meets $R_i=1$;

for an in-segment reference symbol meeting $1 \leq i \leq N$ in the N segments, adjusting a phase of the in-segment reference symbol according to $\theta_{iR_i}=\varphi_{iR_i}-\varphi_{(i-1)(R_{i-1})}$, where N represents a quantity of segments, i represents a sequence number of a segment, $R_i$ represents a sequence number of an in-segment reference symbol segment, represents a phase of the reference symbol in the $i^{th}$ segment, and $\theta_{iR_i}$ represents a phase to which $\varphi_{iR_i}$ is adjusted;

for a symbol meeting $2<j \leq M_i$ in the N segments, adjusting a constellation phase of the symbol according to a formula $\theta_{ij}=\varphi_{ij}-\varphi_{i(j-1)}$, where $M_i$ represents a quantity of symbols in the $i^{th}$ segment, $M_1+M_2+\ldots M_N=M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 3$;

for a symbol meeting $1 \leq i \leq N$ and $j=2$ in the N segments, adjusting a phase of the symbol according to $\theta_{i(R_i+1)}=\varphi_{i(R_i+1)}-\theta_{iR_i}$; and for a symbol meeting $1 \leq i \leq N$ and $j=1$ in the N segments, adjusting a phase of the symbol according to $\theta_{ij}=\varphi_{ij}$.

In a possible implementation of this application, that the processor 1201 executes the adjusting a phase of a symbol in each segment according to a preset phase inverse-adjustment rule includes:

determining an in-segment reference symbol in each symbol in the N segments, where the in-segment reference symbol meets $2 \leq R_i \leq M_i-1$;

for an in-segment reference symbol meeting $1 \leq i \leq N$ in the N segments, adjusting a phase of the in-segment reference symbol according to $\theta_{iR_i}=\varphi_{iR_i}-\varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$, $1 \leq j \leq M_i$, and $j \neq R_i$ in the N segments, adjusting a phase of the symbol according to $\theta_{ij}=\varphi_{ij}-\theta_{iR_i}$, where $M_i$ represents a quantity of symbols in the $i^{th}$ segment, $M_1+M_2+\ldots M_N=M$, represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$ and $M_i$ are all integers, and $M_i \geq 3$; and for a symbol meeting $1 \leq i \leq N$ and $j=R_i$ in the N segments, adjusting a phase of the symbol according to $\theta_{ij}=\varphi_{ij}$.

In a possible implementation of this application, that the processor 1201 executes the adjusting a phase of a symbol in each segment according to a preset phase inverse-adjustment rule includes:

determining an in-segment reference symbol in each symbol in the N segments, where the in-segment reference symbol meets $R_i=M_i$;

for an in-segment reference symbol meeting $1 \leq i \leq N$ in the N segments, adjusting a phase of the in-segment reference symbol according to $\theta_{iR_i}=\varphi_{iR_i}-\varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$ and $1 \leq j < M_i$ in the N segments, adjusting a phase of the symbol according to $\theta_{ij} = \varphi_{ij} - \theta_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = M_i$ and in the N segments, adjusting a phase of the symbol according to $\theta_{ij} = \varphi_{ij}$.

In a possible implementation of this application, that the processor 1201 executes the adjusting a phase of a symbol in each segment according to a preset phase inverse-adjustment rule includes:

determining an in-segment reference symbol in each symbol in the N segments, where the in-segment reference symbol meets $R_i = 1$;

for an in-segment reference symbol meeting $1 \leq i \leq N$ in the N segments, adjusting a phase of the in-segment reference symbol according to $\theta_{iR_i} = \varphi_{iR_i} - \varphi_{(i-1)(R_{i-1})}$, where N represents a quantity of segments, i represents a sequence number of a segment, $R_i$ represents a sequence number of an in-segment reference symbol in an $i^{th}$ segment, $\varphi_{iR_i}$ represents a constellation phase of the reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$ and $1 < j \leq M_i$ in the N segments, adjusting a phase of the symbol according to $\theta_{ij} = \varphi_{ij} - \theta_{iR_i}$, where $M_i$ represents a quantity of symbols in the $i^{th}$ segment, $M_1 + M_2 + \ldots M_N = M$, M represents a total quantity of symbols in the N segments, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are all integers, and $M_i \geq 2$; and for a symbol meeting $1 \leq i \leq N$ and $j = 1$ in the N segments, adjusting a phase of the symbol according to $\theta_{ij} = \varphi_{ij}$.

In conclusion, according to the embodiments of the present application, when a phase noise suppression capability of a signal of the receiving device needs to be improved, the receiving device divides received symbols into segments. Phases of the symbols are concurrently adjusted for the segments, thereby improving demodulation efficiency of the receiving device and reducing a processing time.

A person of ordinary skill in the art may understand that all or some of the processes of the foregoing method embodiments may be implemented by a computer program instructing related hardware. The program may be stored in a computer readable storage medium. When the program runs, the processes of the methods in the embodiments are performed. The foregoing storage medium includes: any medium that can store program code, such as a ROM, a RAM, a magnetic disk, or an optical disc.

The foregoing embodiments are merely example embodiments of the present application, and the protection scope of the present application may not be limited thereby. A person of ordinary skill in the art may understand that all or some of processes that implement the foregoing embodiments and equivalent modifications made in accordance with the claims of the present application shall fall within the scope of the present application.

What is claimed is:

1. A modulation method, comprising:
   performing coding processing on raw data to obtain a coded sequence;
   performing constellation mapping on the coded sequence based on a preset constellation diagram, to obtain M symbols, wherein M is an integer greater than 1;
   dividing the M symbols into N segments, wherein N is an integer greater than 1;
   obtaining a constellation phase of each symbol in the N segments;
   adjusting a constellation phase of a symbol in each of the N segments according to a preset phase adjustment rule, wherein phase adjustments of the N segments are concurrently performed;
   modulating M symbols obtained through the phase adjustments, to obtain a modulated signal; and
   sending the modulated signal.

2. The method according to claim 1, wherein the adjusting a constellation phase of a symbol in each of the N segments according to a preset phase adjustment rule comprises:
   determining an in-segment reference symbol in each of the N segments, wherein the in-segment reference symbol meets $2 \leq R_i \leq M_i - 1$;
   for a symbol meeting $1 \leq i \leq N$ and $R_i < j \leq M_i$ in the N segments, adjusting a constellation phase of the symbol according to $\varphi_{ij} = \theta_{ij} + \theta_{i(j-1)} + \ldots \theta_{i(R_i-1)} + \theta_{iR_i}$, wherein i represents a sequence number of a segment, j represents a sequence number of a symbol in each of the N segments, $M_i$ represents a quantity of symbols in an $i^{th}$ segment, $M_1 + M_2 + \ldots M_N = M$, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are positive integers, and $M_i \geq 3$;
   for a symbol meeting $1 \leq i \leq N$ and $1 \leq j < R_i$ in the N segments, adjusting a constellation phase of the symbol according to $\varphi_{ij} = \theta_{ij} + \theta_{i(j+1)} + \ldots + \theta_{iR_i}$; and
   for a symbol meeting $1 \leq i \leq N$ and $j = R_i$ in the N segments, adjusting a constellation phase of the symbol according to $\varphi_{ij} = \theta_{ij}$.

3. The method according to claim 1, wherein the adjusting a constellation phase of a symbol in each of the N segments according to a preset phase adjustment rule comprises:
   determining an in-segment reference symbol in each of the N segments, wherein the in-segment reference symbol meets $R_i = 1$;
   for a symbol meeting $1 \leq i \leq N$ and $1 < j \leq M_i$ in the N segments, adjusting a constellation phase of the symbol according to $\varphi_{ij} = \theta_{ij} + \theta_{i(j-1)} + \ldots \theta_{i(R_i-1)} + \theta_{iR_i}$, wherein i represents a sequence number of a segment, j represents a sequence number of a symbol in each of the N segments, $M_i$ represents a quantity of symbols in an $i^{th}$ segment, $M_1 + M_2 + \ldots M_N = M$, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which is $\theta_{ij}$ adjusted, i, j, $R_i$, and $M_i$ are positive integers, and $M_i \geq 2$; and
   for a symbol meeting $1 \leq i \leq N$ and $j = 1$ in the N segments, adjusting a constellation phase of the symbol according to $\varphi_{ij} = \theta_{ij}$.

4. The method according to claim 1, wherein the adjusting a constellation phase of a symbol in each of the N segments according to a preset phase adjustment rule comprises:
   determining an in-segment reference symbol in each of the N segments, wherein the in-segment reference symbol meets $2 \leq R_i \leq M_i - 1$;

for a symbol meeting $1 \leq i \leq N$, $1 \leq j \leq M_i$, and $j \neq R_i$ in the N segments, adjusting a constellation phase of the symbol according to $\varphi_{ij} = \theta_{ij} + \theta_{iR_i}$, wherein N represents a quantity of segments, i represents a sequence number of a segment, $M_i$ represents a quantity of symbols in an $i^{th}$ segment, $M_1 + M_2 + \ldots M_N = M$, $R_i$ represents a sequence number of an in-segment reference symbol in the $i^{th}$ segment, j represents a sequence number of a symbol in each of the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are positive integers, and $M_i \geq 3$; and for a symbol meeting $1 \leq i \leq N$ and $j = R_i$ in the N segments, adjusting a constellation phase of the symbol according to $\varphi_{ij} = \theta_{ij}$.

5. The method according to claim 1, wherein the adjusting a constellation phase of a symbol in each of the N segments according to a preset phase adjustment rule comprises:

determining an in-segment reference symbol in each of the N segments, wherein the in-segment reference symbol meets $R_i = 1$;

for a symbol meeting $1 \leq i \leq N$ and $1 < j \leq M_i$ in the N segments, adjusting a constellation phase of the symbol according to $\varphi_{ij} = \theta_{ij} + \theta_{iR_i}$, wherein N represents a quantity of segments, i represents a sequence number of a segment, $M_i$ represents a quantity of symbols in an $i^{th}$ segment, $M_1 + M_2 + \ldots M_N = M$, M represents a total quantity of symbols in the N segments, $R_i$ represents a sequence number of an in-segment reference symbol in the $i^{th}$ segment, j represents a sequence number of a symbol in each of the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are positive integers, and $M_i \geq 2$; and for a symbol meeting $1 \leq i \leq N$ and $j = R_i$ in the N segments, adjusting a constellation phase of the symbol according to $\varphi_{ij} = \theta_{ij}$.

6. The method according to claim 1, wherein the adjusting a constellation phase of a symbol in each of the N segments according to a preset phase adjustment rule comprises:

determining an in-segment reference symbol in each of the N segments, wherein the in-segment reference symbol meets $2 \leq R_i \leq M_i - 1$;

for an in-segment reference symbol meeting $1 \leq i \leq N$ in the N segments, adjusting a constellation phase of the in-segment reference symbol according to $\varphi_{iR_i} = \theta_{iR_i} + \theta_{(i-1)(R_{i-1})} + \ldots \theta_{2R_2} + \theta_{1R_1}$, wherein N represents a quantity of segments, i represents a sequence number of a segment, $R_i$ represents a sequence number of an in-segment reference symbol in an $i^{th}$ segment, $\theta_{iR_i}$ represents a constellation phase of the in-segment reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $R_i < j \leq M_i$ in the N segments, adjusting a constellation phase of the symbol according to $\varphi_{ij} = \theta_{ij} + \theta_{i(j-1)} + \ldots \theta_{i(R_i-1)} + \varphi_{iR_i}$, wherein $M_i$ represents a quantity of symbols in the $i^{th}$ segment, $M_1 + M_2 + \ldots M_N = M$, M represents a total quantity of symbols in the N segments, j represents a sequence number of a symbol in each of the N segments, $\theta_{ij}$ represents a constellation phase of a $j^{th}$ symbol in the $i^{th}$ segment, $\varphi_{ij}$ represents a phase to which $\theta_{ij}$ is adjusted according to the preset phase adjustment rule, i, j, $R_i$, and $M_i$ are positive integers, and $M_i \geq 2$;

for a symbol meeting $1 \leq i \leq N$ and $1 \leq j < R_i$ in the N segments, adjusting a constellation phase of the symbol according to a formula $\varphi_{ij} = \theta_{ij} + \theta_{i(j+1)} + \ldots + \varphi_{iR_i}$; and for a symbol meeting $1 \leq i \leq N$ and $j = R_i$ in the N segments, adjusting a phase of the symbol according to $\varphi_{ij} = \theta_{ij}$.

7. The method according to claim 1, wherein the adjusting a constellation phase of a symbol in each of the N segments according to a preset phase adjustment rule comprises:

determining an in-segment reference symbol in each of the N segments, wherein the in-segment reference symbol meets $2 \leq R_i \leq M_i - 1$;

for an in-segment reference symbol meeting $1 \leq i \leq N$ in the N segments, adjusting a constellation phase of the in-segment reference symbol according to $\varphi_{iR_i} = \theta_{iR_i} + \theta_{(i-1)(R_{i-1})} + \ldots \theta_{2R_2} + \theta_{1R_1}$, wherein N represents a quantity of segments, i represents a sequence number of a segment, $R_i$ represents a sequence number of an in-segment reference symbol in an $i^{th}$ segment, $\theta_{iR_i}$ represents a constellation phase of the in-segment reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$, $1 \leq j \leq R_i$, and $j \neq R_i$ in the N segments, adjusting a constellation phase of the symbol according to $\varphi_{ij} = \theta_{ij} + \varphi_{iR_i}$, wherein $M_i$ represents a quantity of symbols in the $i^{th}$ segment, $M_1 + M_2 + \ldots M_N = M$, j represents a sequence number of a symbol in each of the N segments, $\theta_{ij}$ represents a constellation phase of a $j^{th}$ symbol in the $i^{th}$ segment, $\varphi_{ij}$ represents a phase to which $\theta_{ij}$ is adjusted according to a preset phase adjustment rule, i, j, $R_i$, and $M_i$ are positive integers, and $M_i \geq 3$; and for a symbol meeting $1 \leq i \leq N$ and $j = R_i$ in the N segments, adjusting a phase of the symbol according to $\varphi_{ij} = \theta_{ij}$.

8. A sending device, comprising:
a memory storing instructions; and
a processor coupled to the memory to execute the instructions to:
perform coding processing on raw data to obtain a coded sequence;
perform constellation mapping on the coded sequence based on a preset constellation diagram, to obtain M symbols, wherein M is an integer greater than 1;
divide the M symbols into N segments, wherein N is an integer greater than 1;
obtain a constellation phase of each symbol in the N segments;
adjust a constellation phase of a symbol in each of the N segments according to a preset phase adjustment rule, wherein phase adjustments of the N segments are concurrently performed;
modulate M symbols obtained through the phase adjustments, to obtain a modulated signal; and
send the modulated signal.

9. The sending device according to claim 8, wherein the adjust a constellation phase of a symbol in each of the N segments according to a preset phase adjustment rule comprises:

determine an in-segment reference symbol in each of the N segments, wherein the in-segment reference symbol meets $2 \leq R_i \leq M_i - 1$;

for a symbol meeting $1 \leq i \leq N$ and $R_i < j \leq M_i$ in the N segments, adjust a constellation phase of the symbol according to $\varphi_{ij} = \theta_{ij} + \theta_{i(j-1)} + \ldots \theta_{i(R_i-1)} + \theta_{iR_i}$, wherein i represents a sequence number of a segment, j represents a sequence number of a symbol in each of the N segments, $M_i$ represents a quantity of symbols in an $i^{th}$ segment, $M_1+M_2+\ldots M_N=M$, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are positive integers, and $M_i \geq 3$;

for a symbol meeting $1 \leq i \leq N$ and $1 \leq j < R_i$ in the N segments, adjust a constellation phase of the symbol according to $\varphi_{ij}=\theta_{ij}+\theta_{i(j+1)}+\ldots+\theta_{iR_i}$; and for a symbol meeting $1 \leq i \leq N$ and $j=R_i$ in the N segments, adjust a constellation phase of the symbol according to $\varphi_{ij}=\theta_{ij}$.

10. The sending device according to claim 8, wherein

The adjust a constellation phase of a symbol in each of the N segments according to a preset phase adjustment rule comprises: determine an in-segment reference symbol in each of the N segments, wherein the in-segment reference symbol meets $R_i=1$;

for a symbol meeting $1 \leq i \leq N$ and $1 < j \leq M_i$ in the N segments, adjust a constellation phase of the symbol according to $\varphi_{ij}=\theta_{ij}+\theta_{i(j-1)}+\ldots \theta_{i(R_i-1)}+\theta_{iR_i}$, wherein i represents a sequence number of a segment, j represents a sequence number of a symbol in each of the N segments, $M_i$ represents a quantity of symbols in an $i^{th}$ segment, $M_1+M_2+\ldots M_N=M$, $R_i$ represents a sequence number of an in-segment reference symbol in the $i^{th}$ segment, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are positive integers, and $M_i \geq 2$; and for a symbol meeting $1 \leq i \leq N$ and $j=1$ in the N segments, adjust a constellation phase of the symbol according to $\varphi_{ij}=\theta_{ij}$.

11. The sending device according to claim 8, wherein the adjust a constellation phase of a symbol in each of the N segments according to a preset phase adjustment rule comprises:

determine an in-segment reference symbol in each of the N segments, wherein the in-segment reference symbol meets $2 \leq R_i \leq M_i-1$;

for a symbol meeting $1 \leq i \leq N$, $1 \leq j \leq M_i$, and $j \neq R_i$ in the N segments, adjust a constellation phase of the symbol according to $\varphi_{ij}=\theta_{ij}+\theta_{iR_i}$, wherein N represents a quantity of segments, i represents a sequence number of a segment, $M_i$ represents a quantity of symbols in an $i^{th}$ segment, $M_1+M_2+\ldots M_N=M$, $R_i$ represents a sequence number of an in-segment reference symbol in the $i^{th}$ segment, j represents a sequence number of a symbol in each of the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are positive integers, and $M_i \geq 3$; and for a symbol meeting $1 \leq i \leq N$ and $j=R_i$ in the N segments, adjust a constellation phase of the symbol according to $\varphi_{ij}=\theta_{ij}$.

12. The sending device according to claim 8, wherein the adjust a constellation phase of a symbol in each of the N segments according to a preset phase adjustment rule comprises:

determine an in-segment reference symbol in each of the N segments, wherein the in-segment reference symbol meets $R_i=1$;

for a symbol meeting $1 \leq i \leq N$ and $1 < j \leq M_i$ in the N segments, adjust a constellation phase of the symbol according to $\varphi_{ij}=\theta_{ij}+\theta_{iR_i}$, wherein N represents a quantity of segments, i represents a sequence number of a segment, $M_i$ represents a quantity of symbols in an $i^{th}$ segment, $M_1+M_2+\ldots M_N=M$, M represents a total quantity of symbols in the N segments, $R_i$ represents a sequence number of an in-segment reference symbol in the $i^{th}$ segment, j represents a sequence number of a symbol in each of the N segments, $\theta_{ij}$ represents a constellation phase of a $j^{th}$ symbol in the $i^{th}$ segment, $\varphi_{ij}$ represents a phase to which $\theta_{ij}$ is adjusted, i, j, $R_i$, and $M_i$ are positive integers, and $M_i \geq 2$; and for a symbol meeting $1 \leq i \leq N$ and $j=R_i$ in the N segments, adjust a constellation phase of the symbol according to $\varphi_{ij}=\theta_{ij}$.

13. The sending device according to claim 8, wherein the adjust a constellation phase of a symbol in each of the N segments according to a preset phase adjustment rule comprises:

determine an in-segment reference symbol in each of the N segments, wherein the in-segment reference symbol meets $2 \leq R_i \leq M_i-1$;

for an in-segment reference symbol meeting $1 \leq i \leq N$ in the N segments, adjust a constellation phase of the in-segment reference symbol according to $\varphi_{iR_i}=\theta_{iR_i}+\theta_{(i-1)(R_{i-1})}+\ldots \theta_{2R_2}\theta_{1R_1}$, wherein N represents a quantity of segments, i represents a sequence number of a segment, $R_i$ represents a sequence number of an in-segment reference symbol in an $i^{th}$ segment, $\theta_{iR_i}$ represents a constellation phase of the in-segment reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$ and $R_i < j \leq M_i$ in the N segments, adjust a constellation phase of the symbol according to $\varphi_{ij}=\theta_{ij}+\theta_{i(j-1)}+\ldots \theta_{i(R_i-1)}+\varphi_{iR_i}$, wherein $M_i$ represents a quantity of symbols in the $i^{th}$ segment, $M_1+M_2+\ldots M_N=M$, M represents a total quantity of symbols in the N segments, j represents a sequence number of a symbol in each of the N segments, $\theta_{ij}$ represents a constellation phase of a $j^{th}$ symbol in the $i^{th}$ segment, $\varphi_{ij}$ represents a phase to which $\varphi_{ij}$ is adjusted according to a preset phase adjustment rule, i, j, $R_i$, and $M_i$ are positive integers, and $M_i \geq 2$;

for a symbol meeting $1 \leq i \leq N$ and $1 \leq j < R_i$ in the N segments, adjust a constellation phase of the symbol according to a formula $\varphi_{ij}=\theta_{ij}+\theta_{i(j+1)}+\ldots+\varphi_{iR_i}$; and for a symbol meeting $1 \leq i \leq N$ and $j=R_i$ n the N segments, adjust a phase of the symbol according to $\varphi_{ij}=\theta_{ij}$.

14. The sending device according to claim 8, wherein the adjust a constellation phase of a symbol in each of the N segments according to a preset phase adjustment rule comprises:

determine an in-segment reference symbol in each of the N segments, wherein the in-segment reference symbol meets $2 \leq R_i \leq M_i-1$;

for an in-segment reference symbol meeting $1 \leq i \leq N$ in the N segments, adjust a constellation phase of the in-segment reference symbol according to $\varphi_{iR_i}=\theta_{iR_i}+\theta_{(i-1)(R_{i-1})}+\ldots \theta_{2R_2}+\theta_{1R_1}$, wherein N represents a quantity of segments, i represents a sequence number of a segment, $R_i$ represents a sequence number of an in-segment reference symbol in an $i^{th}$ segment, $\theta_{iR_i}$ represents a constellation phase of the in-segment reference symbol in the $i^{th}$ segment, and $\varphi_{iR_i}$ represents a phase of the in-segment reference symbol into which $\theta_{iR_i}$ is adjusted;

for a symbol meeting $1 \leq i \leq N$, $1 \leq j \leq R_i$, and $j \neq R_i$ in the N segments, adjust a constellation phase of the symbol according to $\varphi_{ij}=\theta_{ij}+\varphi_{iR_i}$, wherein $M_i$ represents a quantity of symbols in the $i^{th}$ segment, $M_1+M_2+\ldots M_N=M$, j represents a sequence number of a symbol in each of the N segments, $\theta_{ij}$ represents a constellation phase of a $j^{th}$ symbol in the $i^{th}$ segment, $\varphi_{ij}$ represents a phase $\theta_{ij}$ to which is adjusted according to a preset phase adjustment rule, i, j, $R_i$, and $M_i$ are positive integers, and $M_i \geq 3$; and for a symbol meeting $1 \leq i \leq N$ and $j = R_i$ in the N segments, adjust a phase of the symbol according to $\varphi_{ij} = \theta_{ij}$.

15. A receiving device, comprising:
a memory storing instructions; and
a processor coupled to the memory to execute the instructions to:
receive a modulated signal and demodulate the modulated signal to obtain M symbols, wherein M is an integer greater than 1;
divide the M symbols into N segments, wherein N is an integer greater than 1;
obtain a phase of each symbol in the N segments;
adjust a phase of a symbol in each of the N segments according to a preset phase inverse-adjustment rule, wherein phase adjustments of the N segments are concurrently performed;
perform, based on a preset constellation diagram, constellation demapping on M symbols obtained through the phase adjustments, to obtain a coded sequence; and
perform decoding processing on the coded sequence to obtain raw data.

16. The receiving device according to claim 15, wherein the adjust a phase of a symbol in each of the N segments according to a preset phase inverse-adjustment rule comprises:
determine an in-segment reference symbol in each of the N segments, wherein the in-segment reference symbol meets $2 \leq R_i \leq M_i - 1$;
for a symbol meeting $1 \leq i \leq N$ and $R_i < j \leq M_i$ in the N segments, adjust a phase of the symbol according to $\theta_{ij} = \varphi_{ij} - \varphi_{i(j-1)}$, wherein N represents a quantity of segments, i represents a sequence number of a segment, $M_i$ represents a quantity of symbols in an $i^{th}$ segment, $M_1 + M_2 + \ldots M_N = M$, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, $\theta_{ij}$ represents a phase to which $\varphi_{ij}$ is adjusted, i, j, $R_i$, and $M_i$ are positive integers, and $M_i \geq 3$;
for a symbol meeting $1 \leq i \leq N$ and $1 \leq j < R_i$ in the N segments, adjust a phase of the symbol according to $\theta_{ij} = \varphi_{ij} - \varphi_{i(j+1)}$; and
for a symbol meeting $1 \leq i \leq N$ and $j = R_i$ in the N segments, adjust a phase of the symbol according to $\theta_{ij} = \varphi_{ij}$.

17. The receiving device according to claim 15, wherein the adjust a phase of a symbol in each of the N segments according to a preset phase inverse-adjustment rule comprises:
determine an in-segment reference symbol in each of the N segments, wherein the in-segment reference symbol meets $2 \leq R_i \leq M_i - 1$;
for a symbol meeting $1 \leq i \leq N$, $1 \leq j \leq M$, and $j \neq R_i$ in the N segments, adjust a phase of the symbol according to $\theta_{ij} = \varphi_{ij} - \varphi_{iR_i}$, wherein N represents a quantity of segments, i represents a sequence number of a segment, $M_i$ represents a quantity of symbols in an $i^{th}$ segment, $M_1 + M_2 + \ldots M_N = M$, $R_i$ represents a sequence number of an in-segment reference symbol in the $i^{th}$ segment, j represents a sequence number of a symbol, $\varphi_{ij}$ represents a phase of a $j^{th}$ symbol in the $i^{th}$ segment, u represents a phase to which $\varphi_{ij}$ is adjusted, i, j, $R_i$, and $M_i$ are positive integers, and $M_i \geq 2$; and
for a symbol meeting $1 \leq i \leq N$ and $j = R_i$ in the N segments, adjust a phase of the symbol according to $\theta_{ij} = \varphi_{ij}$.

18. The receiving device according to claim 15, wherein the adjust a phase of a symbol in each of the N segments according to a preset phase inverse-adjustment rule comprises:
determine an in-segment reference symbol in each of the N segments, wherein the in-segment reference symbol meets $2 \leq R_i \leq M_i - 1$;
for an in-segment reference symbol meeting $1 \leq i \leq N$ in the N segments, adjust a phase of the in-segment reference symbol according to $\theta_{iR_i} = \varphi_{iR_i} - \varphi_{(i-1)(R_{i-1})}$, wherein N represents a quantity of segments, i represents a sequence number of a segment, $R_i$ represents a sequence number of an in-segment reference symbol in an $i^{th}$ segment, $\varphi_{iR_i}$ represents a phase of the in-segment reference symbol in the $i^{th}$ segment, and $\theta_{iR_i}$ represents a phase to which $\varphi_{iR_i}$ is adjusted;
for a symbol meeting $R_i + 1 < j \leq M_i$ in the N segments, adjust a constellation phase of the symbol according to a formula $\theta_{ij} = \varphi_{ij} - \varphi_{i(j-1)}$, wherein $M_i$ represents a quantity of symbols in the $i^{th}$ segment, $M_1 + M_2 + \ldots M_N = M$, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are positive integers, and $M_i \geq 3$;
for a symbol meeting $1 \leq i \leq N$ and $j = R_i + 1$ in the N segments, adjust a phase of the symbol according to $\theta_{i(R_i+1)} = \varphi_{i(R_i+1)} - \theta_{iR_i}$;
for a symbol meeting $1 \leq i \leq N$ and $1 \leq j < R_i - 1$ in the N segments, adjust a phase of the symbol according to $\theta_{ij} = \varphi_{ij} - \varphi_{i(j+1)}$;
for a symbol meeting $1 \leq i \leq N$ and $j = R_i - 1$ in the N segments, adjust a phase of the symbol according to $\theta_{i(R_i-1)} = \varphi_{i(R_i-1)} - \theta_{iR_i}$; and
for a symbol meeting $1 \leq i \leq N$ and $j = R_i$ in the N segments, adjust a phase of the symbol according to $\theta_{ij} = \varphi_{ij}$.

19. The receiving device according to claim 15, wherein the adjust a phase of a symbol in each of the N segments according to a preset phase inverse-adjustment rule comprises:
determine an in-segment reference symbol in each symbol in the N segments, wherein the in-segment reference symbol meets $2 \leq R_i \leq M_i - 1$;
for an in-segment reference symbol meeting $1 \leq i \leq N$ in the N segments, adjust a phase of the in-segment reference symbol according to $\theta_{iR_i} = \varphi_{iR_i} - \varphi_{(i-1)(R_{i-1})}$, wherein N represents a quantity of segments, i represents a sequence number of a segment, $R_i$ represents a sequence number of an in-segment reference symbol in an $i^{th}$ segment, $\varphi_{iR_i}$ represents a constellation phase of the in-segment reference symbol in the $i^{th}$ segment, and $\theta_{iR_i}$ represents a phase of the in-segment reference symbol into which $\varphi_{iR_i}$ is adjusted;
for a symbol meeting $1 \leq i \leq N$, $1 \leq j \leq M_i$, and $j \neq R_i$ in the N segments, adjust a phase of the symbol according to $\theta_{ij} = \varphi_{ij} - \theta_{iR_i}$, wherein $M_i$ represents a quantity of symbols in the $i^{th}$ segment, $M_1 + M_2 + \ldots M_N = M$, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are positive integers, and $M_i \geq 3$; and
for a symbol meeting $1 \leq i \leq N$ and $j = R_i$ in the N segments, adjust a phase of the symbol according to $\theta_{ij} = \varphi_{ij}$.

20. The receiving device according to claim 15, wherein the adjust a phase of a symbol in each of the N segments according to a preset phase inverse-adjustment rule comprises:

determine an in-segment reference symbol in each symbol in the N segments, wherein the in-segment reference symbol meets $R_i=1$;

for an in-segment reference symbol meeting $1 \leq i \leq N$ in the N segments, adjust a phase of the in-segment reference symbol according to $\theta_{iR_i} = \varphi_{iR_i} - \varphi_{(i-1)(R_{i-1})}$, wherein N represents a quantity of segments, i represents a sequence number of a segment, $R_i$ represents a sequence number of an in-segment reference symbol in an $i^{th}$ segment, $\varphi_{iR_i}$ represents a constellation phase of the in-segment reference symbol in the $i^{th}$ segment, and $\theta_{iR_i}$ represents a phase of the in-segment reference symbol into which $\varphi_{iR_i}$ is adjusted;

for a symbol meeting $1 \leq i \leq N$ and $1 < j \leq M_i$ in the N segments, adjust a phase of the symbol according to $\theta_{ij} = \varphi_{ij} - \theta_{iR_i}$, wherein $M_i$ represents a quantity of symbols in the $i^{th}$ segment, $M_1 + M_2 + \ldots M_N = M$, j represents a sequence number of a symbol, $\varphi_{ij}$ represents a constellation phase of a $j^{th}$ symbol in the $i^{th}$ segment, $\theta_{ij}$ represents a phase to which $\varphi_{ij}$ is adjusted, i, j, $R_i$, and $M_i$ are positive integers, and $M_i \geq 2$; and for a symbol meeting $1 \leq i \leq N$ and $j=1$ in the N segments, adjust a phase of the system according to $\theta_{ij} = \varphi_{ij}$.

* * * * *

UNITED STATES PATENT AND TRADEMARK OFFICE
CERTIFICATE OF CORRECTION

PATENT NO. : 10,536,319 B2
APPLICATION NO. : 16/358207
DATED : January 14, 2020
INVENTOR(S) : Qingyong Chen et al.

It is certified that error appears in the above-identified patent and that said Letters Patent is hereby corrected as shown below:

In the Claims

Column 62, Line 57, Claim 3, delete "is $\theta_{ij}$" and insert -- $\theta_{ij}$ is --, therefor.

Column 63, Line 66, Claim 6, delete "i,j," and insert -- i, j, --, therefor.

Column 66, Line 44, Claim 13, delete "n" and insert -- in --, therefor.

Column 67, Line 67, Claim 17, delete "u" and insert -- $\theta_{ij}$ --, therefor.

Column 69, Line 27, Claim 20, delete "system" and insert -- symbol --, therefor.

Signed and Sealed this
Twenty-eighth Day of April, 2020

Andrei Iancu
*Director of the United States Patent and Trademark Office*